(12) United States Patent
Widmer

(10) Patent No.: US 10,324,226 B2
(45) Date of Patent: Jun. 18, 2019

(54) FOREIGN OBJECT DETECTION USING INFARED SENSING

(71) Applicant: WiTricity Corporation, Watertown, MA (US)

(72) Inventor: Hans Peter Widmer, Wohlenschwil (CH)

(73) Assignee: WiTricity Corporation, Watertown, MA (US)

( * ) Notice: Subject to any disclaimer, the term of this patent is extended or adjusted under 35 U.S.C. 154(b) by 207 days.

(21) Appl. No.: 15/440,516

(22) Filed: Feb. 23, 2017

(65) Prior Publication Data
US 2018/0239055 A1 Aug. 23, 2018

(51) Int. Cl.
| | |
|---|---|
| *G01J 5/02* | (2006.01) |
| *G01V 9/00* | (2006.01) |
| *G01V 8/10* | (2006.01) |
| *B60L 53/12* | (2019.01) |
| *H02J 7/02* | (2016.01) |
| *H02J 50/10* | (2016.01) |

(52) U.S. Cl.
CPC ............ *G01V 9/005* (2013.01); *B60L 53/12* (2019.02); *G01V 8/10* (2013.01); *H02J 7/025* (2013.01); *H02J 50/10* (2016.02); *Y02T 10/7005* (2013.01); *Y02T 10/7072* (2013.01); *Y02T 90/122* (2013.01); *Y02T 90/14* (2013.01)

(58) Field of Classification Search
CPC .............. G01N 21/35; G01N 21/3581; G01N 21/3586; G01N 21/359; G01N 21/39; G01N 23/00; G01N 25/00; G01N 21/25
See application file for complete search history.

(56) References Cited

U.S. PATENT DOCUMENTS

| | | | | |
|---|---|---|---|---|
| 4,245,911 A | * | 1/1981 | Steinbrenner | G01J 3/06 356/328 |
| 2004/0045340 A1 | * | 3/2004 | Steinert | G01N 27/74 73/25.02 |
| 2014/0084859 A1 | | 3/2014 | Hall et al. | |
| 2014/0111154 A1 | | 4/2014 | Roy et al. | |

(Continued)

OTHER PUBLICATIONS

International Search Report and Written Opinion—PCT/US2018/017437—ISA/EPO—dated May 14, 2018.

*Primary Examiner* — David P Porta
*Assistant Examiner* — Mamadou Faye
(74) *Attorney, Agent, or Firm* — Colby Nipper

(57) ABSTRACT

Certain aspects of the present disclosure provide methods and apparatuses for detecting foreign objects via infrared sensing. One example apparatus generally includes at least one infrared (IR) sensor configured to output a thermal signal indicative of a temperature of an area. The apparatus further includes at least one time differentiator coupled to the at least one IR sensor, the at least one time-differentiator being configured to generate a time-differentiated thermal signal based on the thermal signal. The apparatus further includes at least one correlation unit configured to correlate the time-differentiated thermal signal to a varying exposure level magnetic field. The apparatus further includes a determining unit configured to determine whether an object is present in the area based on the correlation of the time-differentiated thermal signal to the varying exposure level magnetic field.

30 Claims, 27 Drawing Sheets

(56) References Cited

U.S. PATENT DOCUMENTS

| | | | |
|---|---|---|---|
| 2014/0203629 A1 | 7/2014 | Hoffman et al. | |
| 2014/0239891 A1* | 8/2014 | Martin | B60L 11/182 320/108 |
| 2015/0104064 A1 | 4/2015 | Guissin et al. | |
| 2015/0255994 A1* | 9/2015 | Kesler | H02J 5/005 307/10.1 |
| 2015/0260835 A1* | 9/2015 | Widmer | G01S 13/04 342/27 |
| 2015/0323694 A1 | 11/2015 | Roy et al. | |
| 2016/0187519 A1* | 6/2016 | Widmer | G01V 3/10 324/222 |
| 2018/0219428 A1* | 8/2018 | Bae | H02J 50/12 |

* cited by examiner

FOREIGN OBJECT DETECTION USING INFARED SENSING

FIELD

The present disclosure relates generally to wireless power transfer, and more specifically to systems, methods and apparatuses for detecting foreign objects via infrared sensing.

BACKGROUND

Remote systems, such as vehicles, have been introduced that include locomotion power derived from electricity received from an energy storage device such as a battery. Such energy storage devices need to be periodically charged. For example, hybrid electric vehicles include on-board chargers that use power from vehicle braking and traditional motors to charge the vehicles. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via an electromagnetic field) to be used to charge electric vehicles may overcome some of the deficiencies of wired charging solutions. However, using electromagnetic fields may induce eddy currents in a well conducting (e.g., metallic or non-metallic) object located within the field, potentially causing the object to heat up, vibrate or cause a nearby object to melt or catch fire. As such, wireless charging systems and methods that efficiently and safely transfer power for charging electric vehicles are desirable.

SUMMARY

One aspect of the disclosure provides an apparatus for detecting an object. The apparatus generally includes at least one infrared (IR) sensor configured to output a thermal signal indicative of a temperature of an area. The apparatus further includes at least one time differentiator coupled to the at least one IR sensor, the at least one time-differentiator being configured to generate a time-differentiated thermal signal based on the thermal signal. The apparatus further includes at least one correlation unit configured to correlate the time-differentiated thermal signal to a varying exposure level magnetic field. The apparatus further includes a determining unit configured to determine whether an object is present in the area based on the correlation of the time-differentiated thermal signal to the varying exposure level magnetic field.

Another aspect of the disclosure provides a method for detecting an object. The method generally includes generating a time-differentiated thermal signal based on a thermal signal indicative of a temperature of an area. The method further includes correlating the time-differentiated thermal signal to a varying exposure level magnetic field. The method further includes determining whether an object is present in the area based on the correlation of the time-differentiated thermal signal to the varying exposure level magnetic field.

Another aspect of the disclosure provides an apparatus for detecting an object. The apparatus generally includes means for generating a time-differentiated thermal signal based on a thermal signal indicative of a temperature of an area. The apparatus further includes means for correlating the time-differentiated thermal signal to a varying exposure level magnetic field. The apparatus further includes means for determining whether an object is present in the area based on the correlation of the time-differentiated thermal signal to the varying exposure level magnetic field.

Another aspect of the disclosure provides a computer readable storage medium comprising instructions that when executed by a processing device cause the processing device to perform a method for detecting an object. The method generally includes generating a time-differentiated thermal signal based on a thermal signal indicative of a temperature of an area. The method further includes correlating the time-differentiated thermal signal to a varying exposure level magnetic field. The method further includes determining whether an object is present in the area based on the correlation of the time-differentiated thermal signal to the varying exposure level magnetic field.

Figure 1:
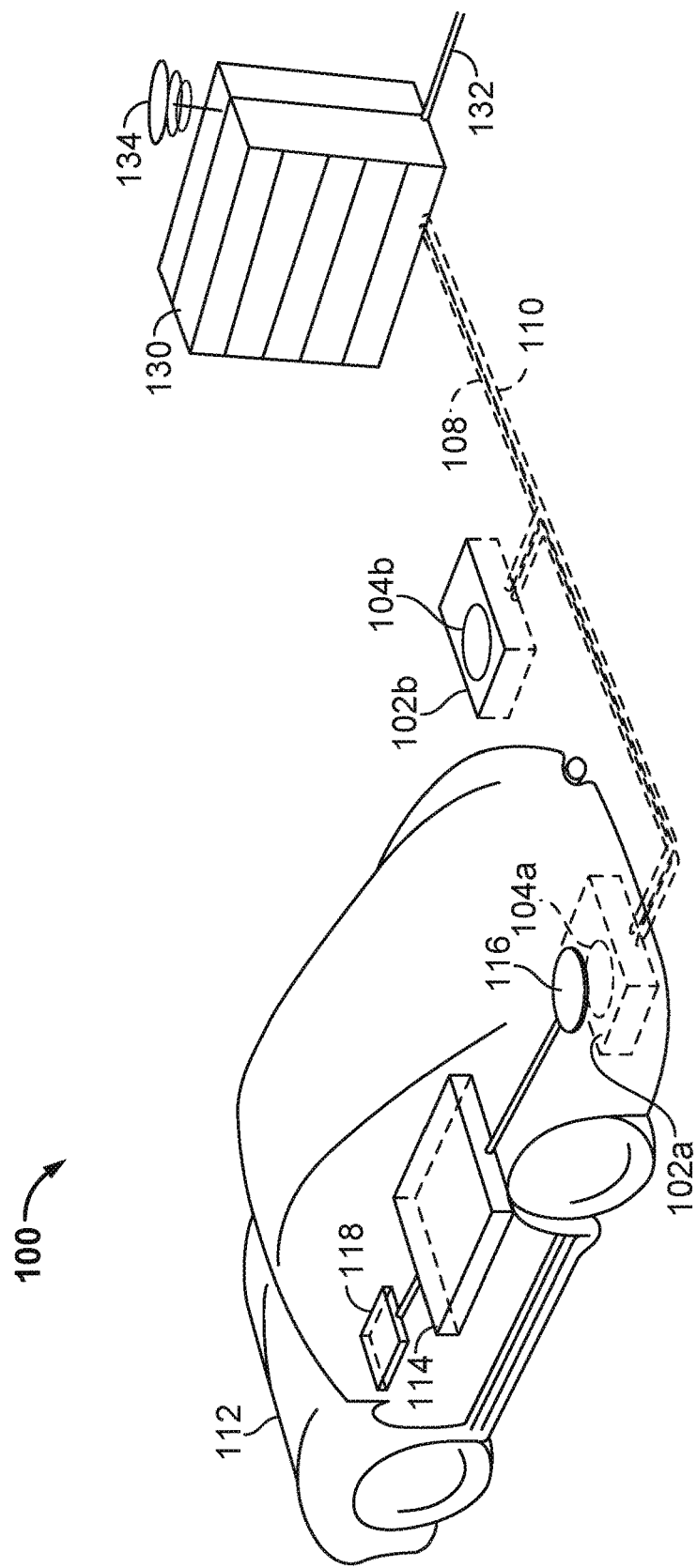
FIG. 1 is a diagram of a wireless charging system for electric vehicles, in accordance with some implementations.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of implementations and is not intended to represent the only implementations in which the invention may be practiced. The term "exemplary" used throughout this description means "serving as an example, instance, or illustration," and should not necessarily be construed as preferred or advantageous over other implementations. The detailed description includes specific details for the purpose of providing a thorough understanding of the implementations. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into an electro-magnetic field (e.g., a magnetic field) may be received, captured by, or coupled by a "receiving element" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

FIG. 1 is a diagram of a wireless charging system 100 for charging an electric vehicle 112, in accordance with some implementations. The wireless charging system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some implementations, a local power distribution 130 may be connected to a power backbone 132 and configured to provide an alternating current (AC) or a direct current (DC) supply through a power link 110 to the base wireless charging systems 102a and 102b. The base wireless charging system 102a includes a base power transfer element 104a for wirelessly transferring or receiving power. Likewise, the base wireless charging system 102 includes the base power transfer element 104b for wirelessly transferring power. In some implementations (not shown in FIG. 1), base power transfer elements 104a or 104b may be stand-alone physical units and are not part of the base wireless charging system 102a or 102b. An electric vehicle 112 may include a battery unit 118, an electric vehicle wireless charging system 114 including an electric vehicle power transfer element 116. In some implementations (not shown in FIG. 1), the vehicle power transfer element 116 may be part of the electric vehicle wireless charging system 114. In some implementations, the entity comprising the base power transfer element 104a and the entity comprising the vehicle power transfer element 116 is referred to as the base pad and the vehicle pad, respectively.

The electric vehicle power transfer element 116 may interact with the base power transfer element 104a for example, via a region of the wireless field generated by the base power transfer element 104a. In some implementations, the electric vehicle power transfer element 116 may receive power when the electric vehicle power transfer element 116 is located in an energy field produced by the base power transfer element 104a. The field corresponds to a region where energy output by the base power transfer element 104a may be captured by an electric vehicle power transfer element 116. For example, the energy output by the base power transfer element 104a may be at a level sufficient to charge or power the electric vehicle 112.

In some implementations, the field may correspond to the "near field" of the base power transfer element 104a. The near-field may correspond to a region in which there are strong reactive fields resulting from the currents and charges in the base power transfer element 104a that do not radiate power away from the base power transfer element 104a. In some implementations, the near-field may correspond to a region that is within about $\frac{1}{2}\pi$ of wavelength of the base power transfer element 104a (and vice versa for the electric vehicle power transfer element 116).

Local power distribution 130 may be configured to communicate with external entities (e.g., a power grid management system) via a communication backhaul 134, and with the base wireless charging system 102a via a communication link 108 (e.g., wired or wireless).

In some implementations, the electric vehicle power transfer element 116 may be aligned with the base power transfer element 104a and, therefore, disposed within a near-field region simply by the driver positioning the electric vehicle 112 correctly relative to the base power transfer element 104a. In other implementations, the driver may be given visual, auditory, or tactile feedback, or combinations thereof to determine when the electric vehicle 112 is properly placed for wireless power transfer. In yet other implementations, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other implementations, the electric vehicle power transfer element 116, the base power transfer element 104a, or a combination thereof may have functionality for displacing and moving the power transfer elements 116 and 104a relative to each other to more accurately position them and develop more efficient coupling there between.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless charging system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a convenient docking-to-grid solution may help to increase availability of vehicles for Vehicle-to-Grid (V2G) operation. A wireless charging system 100 as described with reference to FIG. 1 may also provide aesthetic and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power from the power distribution grid to the electric vehicle 112 via the electric vehicle charging system 114 and the electric vehicle charging system 114 transfers power from the electric vehicle 112 via base wireless charging system 102a to the grid, e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
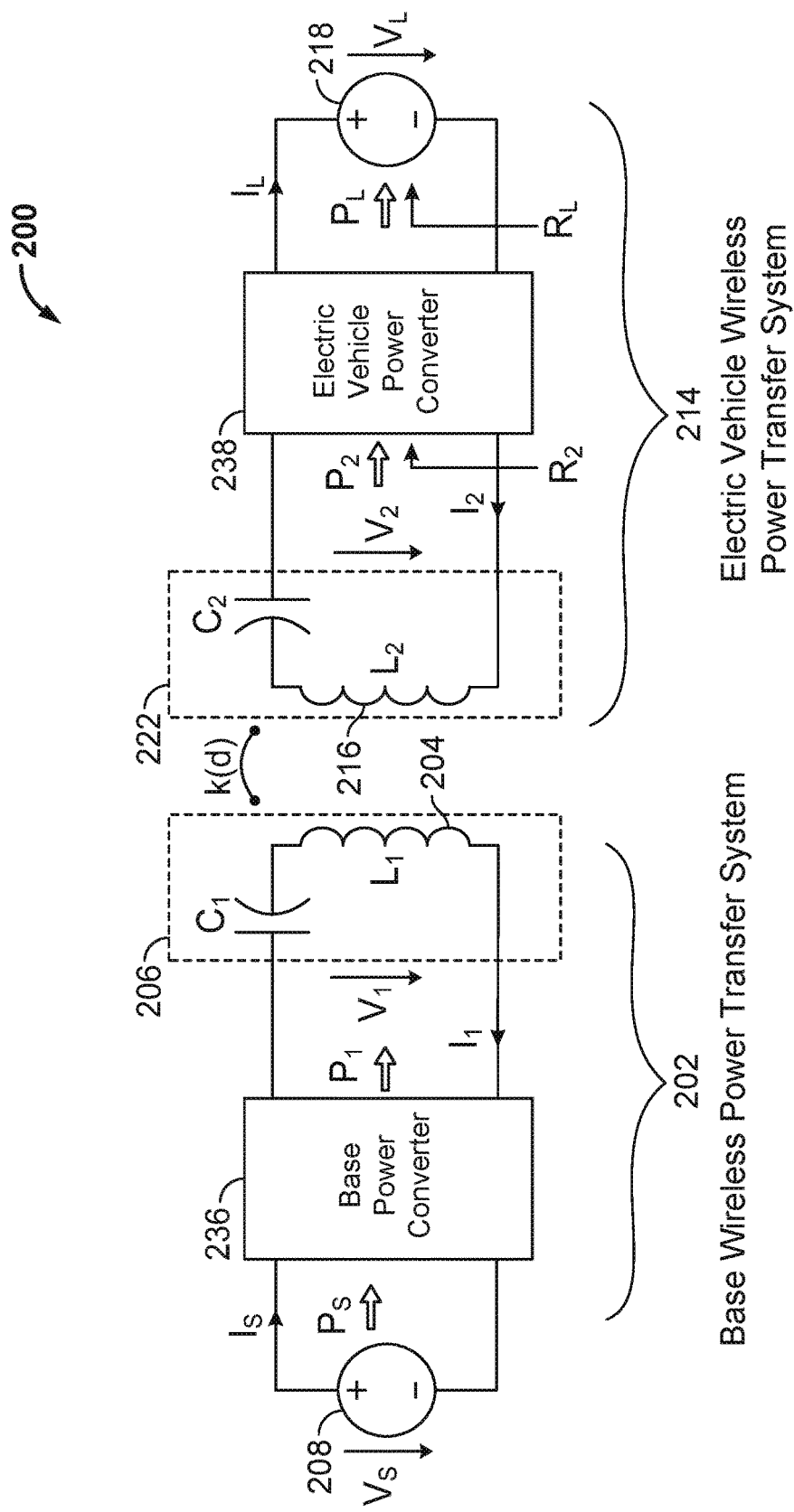
FIG. 2 is a schematic diagram of exemplary components of the wireless charging system of FIG. 1.

FIG. 2 is a schematic diagram of exemplary components of a wireless power transfer system 200 that may be used for inductive power transfer. As shown in FIG. 2, the wireless power transfer system may be comprised of a base wireless power transfer system 202 and an electric vehicle wireless power transfer system 214. The base wireless power transfer system 202 may include a base transmit circuit 206 including a base power transfer element 204 having an inductance $L_1$. Analogously, as shown in FIG. 2, the electric vehicle wireless power transfer system 214 may include an electric vehicle receive circuit 222 including an electric vehicle power transfer element 216 having an inductance $L_2$.

Implementations of the base transmit circuit 206 and the electric vehicle receive circuit 222 described herein may use capacitively loaded wire loops (i.e., multi-turn coils) forming a resonant circuit that is capable of efficiently coupling energy from a primary element (transmitter) to a secondary element (receiver) via a magnetic or electromagnetic near field if both primary and secondary elements are tuned to substantially a common resonant frequency. Using resonant circuits or structures for coupling energy may be referred to "magnetic coupled resonance," "electromagnetic coupled resonance," and/or "resonant induction." The operation of the wireless power transfer system 200 will be described based on power transfer from the power distribution grid via the base wireless power transfer system 202 and the electric vehicle wireless power transfer system 214 to an electric vehicle 112, but is not limited thereto. For example, as discussed above, the electric vehicle 112 may transfer power in the reverse direction via the electric vehicle wireless power transfer system 214 and the base wireless power transfer system 202 to the power distribution grid.

With reference to FIG. 2, a power supply 208 (e.g., AC or DC) supplies power $P_S$ to the base wireless power transfer system 202 to transfer energy to an electric vehicle 112 via an electric vehicle power transfer system 214. The base wireless power transfer system 202 includes a base power converter 236. The base power converter 236 may include circuitry such as an AC/DC converter configured to convert power from standard mains AC to DC power at a suitable voltage level, and a DC/AC converter configured to convert DC power to power at an operating frequency suitable for wireless high power transfer. The power converter 236 supplies power $P_1$ to the base transmit circuit 206 including the base power transfer element 204 to emit a field at a desired frequency. The base transmit circuit 206 may include capacitor $C_1$ coupled in series to the coil of the base power transfer element 204 as shown in FIG. 2 by example. Alternatively, the base transmit circuit 206 may be formed with the capacitor $C_1$ coupled in parallel to the coil, or may be formed of several reactive elements in any combination of parallel or series topology. The capacitor $C_1$ or the reactive elements may be provided to form a resonant circuit with the base power transfer element 204 near or at the operating frequency defined by the base wireless power transfer system 202. The base power transfer element 204 receives the power $P_1$ and wirelessly transmits power at a level sufficient to charge or power the electric vehicle 112. For example, the power level provided wirelessly by the base power transfer element 204 may be on the order of kilowatts (kW) (e.g., anywhere from 1 kW to 110 kW, higher, or lower).

The electric vehicle power transfer element 216 may be positioned within the near-field of a primary electromagnetic field transmitted by the base power transfer element 204. In this case, the base power transfer element 204 and electric vehicle power transfer element 116 may become coupled to one another such that power may be transferred to the electric vehicle receive circuit 222. Element k(d) represents the coupling coefficient resulting at coil separation d. The electric vehicle receive circuit 222 may include capacitor $C_2$ coupled in series to the coil of the electric vehicle power transfer element 204 as shown in FIG. 2 by example. Alternatively, the electric vehicle receive circuit 222 may be formed with the capacitor $C_2$ coupled in parallel to the coil, or may be formed of several reactive elements in any combination of parallel or series topology. The capacitor $C_2$ or the reactive elements may be provided to form a resonant circuit with the electric vehicle power transfer element 204 near or at the operating frequency as defined by the base wireless power transfer system 202. Due to the resonance of the electric vehicle receive circuit, the electric vehicle power transfer element 116 may generate a secondary electromagnetic field. The electric vehicle receive circuit 222 receives power $P_2$ and provides the power $P_2$ to an electric vehicle power converter 238 of an electric vehicle wireless power transfer system 214.

As just described, the resonant frequency may be based on the inductance and capacitance. As shown in FIG. 2, inductance may generally be the inductance of the power transfer element (e.g., a coil), whereas, capacitance may be added to the power transfer element to create a resonant structure at a desired resonant frequency.

The electric vehicle power converter 238 may include, among other things, an AC/DC converter configured to convert power at an operating frequency back to DC power at a voltage level matched to the voltage level of an electric vehicle load 218 (e.g. battery 118). The electric vehicle power converter 238 may provide the converted power $P_L$ to charge the electric vehicle load 218.

The power supply 208, base power converter 236, and base power transfer element 204 may be stationary and located at a variety of locations as discussed above. The electric vehicle power converter 238, and the electric vehicle power transfer element 216 may be onboard of the electric vehicle 112. In some implementations, both electric vehicle power converter 238, and the electric vehicle power transfer element 216 are integrated in the battery pack 118. The electric vehicle wireless power transfer system 214 may also be configured to provide power wirelessly through the electric vehicle power transfer element 216 and base power transfer element 204 to the base wireless power transfer system 202 to feed power back to the grid. In some implementations, each of the electric vehicle power transfer element 216 and the base power transfer element 204 may act as transmit or receive elements based on the mode of operation.

While not shown in FIG. 2, the wireless power transfer system 200 may include a vehicle side load disconnect unit (LDU) to safely disconnect the electric vehicle load 218 (e.g. battery 118) from the wireless power transfer system 200. In some implementations, supporting reverse mode operation, a LDU may be also base side (not shown) to safely disconnect the power supply 208 (acting as load) from the wireless power transfer system 200. For example, in case of an emergency or system failure, the LDU may be triggered to disconnect the load from the wireless power transfer system 200. The LDU may be provided in addition to a battery management system (not shown) for managing charging to a battery, or it may be part of the battery management system.

Further, the electric vehicle wireless power transfer system 214 may include switching circuitry (not shown) for selectively connecting and disconnecting the electric vehicle power transfer element 216 to the electric vehicle power converter 238. Disconnecting the electric vehicle power transfer element 216 may suspend charging and also may change the "load" as "seen" by the base wireless power transfer system 202 (acting as a power transmitter), which may be used to "cloak" the electric vehicle wireless power transfer system 214 (acting as the receiver) from the base wireless power transfer system 202. The load changes may be detected if the base wireless power transfer system 202 includes a load sensing circuit (not shown). Accordingly, the electric vehicle wireless power transfer system 214 (acting as a power transmitter) may include a mechanism for determining when a base power transfer element 204 connected to a base wireless power transfer system 202 (acting as a power receiver), is present in the near-field of the electric vehicle power transfer element 216.

As described above, in operation, assuming energy transfer towards the vehicle 112 (battery 118), input power is provided from the power supply 208 such that the base power transfer element 204 generates an electromagnetic field for providing the energy transfer. The electromagnetic field in turn may induce power into the electric vehicle power transfer element 216 that is sufficient for storage or consumption by the electric vehicle 112. As described above, in some implementations, the base transmit circuit 206 and electric vehicle receive circuit 222 are configured according to a mutual resonant relationship. In some implementations, the resonant frequencies of the base transmit circuit 206 and the electric vehicle receive circuit 222 are very close or substantially the same. Transmission losses between the input of the base wireless power transfer system 202 and the output of the electric vehicle power transfer system 214 may be reduced when the electric vehicle power transfer element 216 is located in the near-field of the base power transfer element 204.

While not shown, the base wireless power transfer system 202 and the electric vehicle wireless power transfer system 214 may both include an oscillator, a driver circuit such as a power amplifier, a filter, and a matching circuit for efficient power transfer via the power transfer elements. The oscillator may be configured to generate a desired operating frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance as "seen" at the base power transfer element 204 to the base power converter 236. In some implementations, the base power converter 236 may include solid state switching circuitry to generate a suitable power output as needed to charge an electric vehicle battery (e.g. battery 118). Analogously, filter and matching circuits may be used to match the impedance as "seen" at the electric vehicle power transfer element 216 to the electric vehicle power converter 238. In some implementations, the electric vehicle power converter 238 may also include a rectifier and switching circuitry to generate a suitable DC power output to charge the battery.

The electric vehicle power transfer element 216 and base power transfer element 204 as described throughout the disclosed implementations may be referred to or configured as "loop" antennas, and more specifically, multi-turn loop antennas. The elements 204 and 216 may also be referred to herein or be configured as "magnetic" antennas. The term "power transfer element" is intended to refer to a component that may wirelessly output or receive energy for coupling to another "power transfer element." The power transfer element may also be referred to as an "antenna" or a "coupler" of a type that is configured to wirelessly output or receive power. As used herein, power transfer elements 204 and 216 are examples of "power transfer components" of a type that are configured to wirelessly output, wirelessly receive, and/ or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferrimagnetic materials may allow development of a stronger electromagnetic field and improved coupling.

The base power transfer element 204 and the electric vehicle power transfer element 216 may be one of a so-called "circular"-type coils (using a "circular" coil), a "Double D"-type coil (using a double coil arrangement), a "Solenoid"-type coil (using a solenoid coil wound around a core), a "Bi-polar"-type coil (using a double coil arrangement with virtually zero coupling between the coils) or any other type of coil structure based on a single or multi-coil arrangement. In some implementations of a wireless power transfer system 200, different power transfer element types may be used for the base power transfer element 204 and the electric vehicle power transfer element 216.

Figure 3:
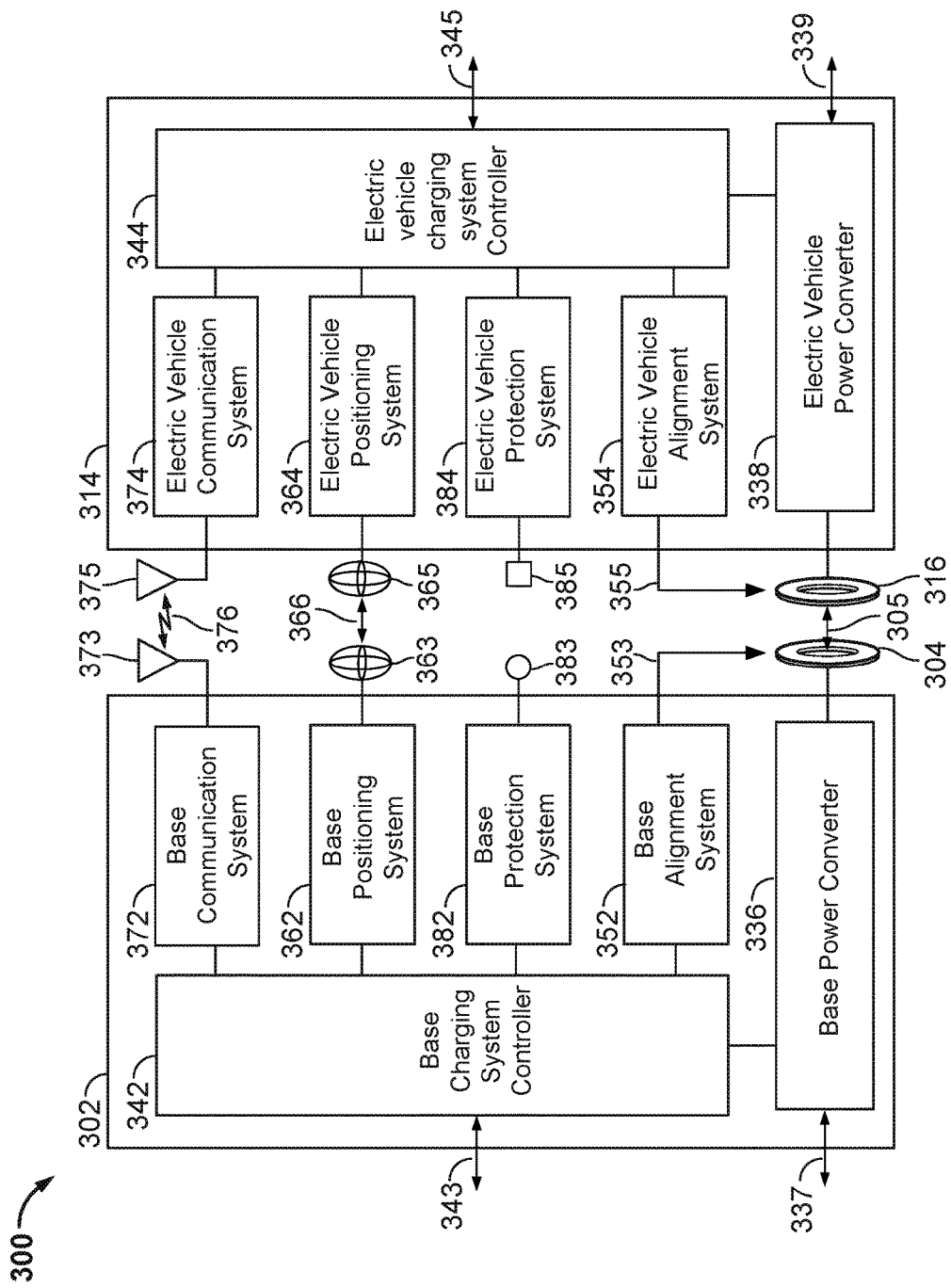
FIG. 3 is a block diagram showing further exemplary components of the wireless charging system of FIG. 1.

FIG. 3 is another block diagram showing further exemplary components of a wireless charging system e.g. wireless charging system 100 of FIG. 1 and/or that wireless power transfer system 200 of FIG. 2 may be part of. The wireless charging system 300 may be split into the base charging system 302 and the electric vehicle charging system 314. It should be noted that one or more additional components may be included and/or one or more described components may not be included in base charging system 302 and/or the electric vehicle charging system 314. The base charging system 302 may include a base power converter 336 (e.g. base power converter 236 of FIG. 2) operationally connected to base power transfer element 304 (e.g. base power transfer element 204 of FIG. 2). Further, it may include a base charging system controller 342 operationally connected to the base power converter 336 and to various ancillary systems such as the base communication system 372 operationally connected to base communication antennas 373, the base positioning system 362 operationally connected to base positioning antennas 363, the base protection system 382 operationally connected to base protection sensors 383, and the base alignment system 352 operationally connected to a base alignment mechanism 353. As mentioned above, one or more of the base alignment system 352, base protection system 382, base positioning system 362, and base communication system 372 may be optional or may use one or more components of the other system (e.g., the base communication system 372 may provide communication via the base power transfer element 304 through modulation of the magnetic field used for power transfer).

Analogously, the electric vehicle charging system 314 may include an electric vehicle power converter 338 (e.g. electric vehicle power converter 238 of FIG. 2) operationally connected to electric vehicle power transfer element 316 (e.g. electric vehicle element 216 of FIG. 2). Further, it may include an electric vehicle charging system controller 344 operationally connected to the electric vehicle power converter 338 and to various ancillary systems such as the electric vehicle communications system 374 operationally connected to the electric vehicle communication antenna 375, the electric vehicle positioning system 363 operationally connected to electric vehicle positioning antennas 365, the electric vehicle protection system 384 operationally connected to the electric vehicle protection sensors 385, the electric vehicle alignment system 354 operationally connected to an electric vehicle alignment mechanism 355. As mentioned above, one or more of the electric vehicle alignment system 354, electric vehicle protection system 384, electric vehicle positioning system 364, and electric vehicle communication system 374 may be optional or may use one or more components of the other system (e.g., the electric vehicle communication system 374 may receive communications via the electric vehicle power transfer element 304 through detection of modulation of the magnetic field used for power transfer). It is further noted that any of the systems shown may be provided one side but not the other (e.g., the electric vehicle protection system 384 may be absent while the base protection system 328 may be present and vice versa).

FIG. 3 also illustrates a wireless power link 305, a communication link 376, and a positioning link 366. Furthermore, FIG. 3 illustrates a base charging system power interface 337 and an electric vehicle charging system power interface 339 as well as a base charging system communication interface 343 and an electric vehicle charging system communication interface 345.

As described above with reference to FIG. 2, and assuming energy flow towards the electric vehicle 112, in FIG. 3 the base charging system power interface 337 may be configured to provide power to a base power converter 336 from a power source, such as an AC or DC power supply, e.g. local power distribution 130 as shown in FIG. 1. The base power converter 336 may receive AC or DC power via the base charging system power interface 337 to excite the base power transfer element 304. The electric vehicle power transfer element 316, when in the near field coupling-mode region, may receive energy in form of an oscillating signal. The electric vehicle power converter 338 converts the oscillating signal from the electric vehicle power transfer element 316 to a power signal suitable for charging a battery 118 via the electric vehicle charging system power interface 339.

In some implementations, the base wireless charging system 302 and all its subsystems and modules are centrally controlled by the base charging system controller 342 that handles and relays control and status information exchanged between the different subsystems. The base charging system controller 342 may include a base charging system communication interface 343 to other systems (not shown) such as, for example, a computer, and a control center, or a smart power grid communications network (not shown). Analogously, the electric vehicle wireless charging system 314 may be centrally controlled by the electric vehicle charging system controller 344 that may include an electric vehicle charging system communication interface 345 to other systems (not shown) such as, for example, an computer onboard the vehicle 112, a battery management system that manages charge and discharge of the electric vehicle principal battery 118, other electronic systems within the vehicle 112, and remote electronic systems. The electric vehicle charging system controller 344 may communicate via the electric vehicle charging system communication interface 345 with a park assistance system by providing position data determined in the electric vehicle positioning system 364 and/or the base positioning system 362. In some implementations, it may communicate with a semi-automatic parking system configured to perform an automatic braking when the vehicle 112 has reached the final position for charging. In other implementations, it may communicate with an autonomous driving system configured to perform a largely automated parking that may provide higher parking accuracy, thus reducing or eliminating the need for mechanical alignment in any of the base wireless charging system 302 and the electric vehicle wireless charging system 314. Further, the electric vehicle charging system controller 344 may be configured to communicate with other electric vehicle 112 onboard electronics. For example, electric vehicle charging system controller 344 may be configured to communicate with visual output devices (e.g., a dashboard display), acoustic/audio output devices (e.g., buzzer, speakers) e.g., for purposes of guidance and alignment. It may be also configured to receive commands from mechanical input devices (e.g., keyboard, touch screen, and pointing devices such as joystick, trackball, etc.), and from audio input devices (e.g., microphones of an electronic voice recognition system).

The base communication system 372 and the electric vehicle communication system 375 may include subsystems or circuits for specific application with separate communication channels. These communications channels may be separate physical channels or separate logical channels. In some implementations, communications are performed over communication link 376 at radio frequencies (RF) using a RF communications standard such as Bluetooth, Zigbee, Dedicated Short Range Communications (DSRC), WLAN, etc. operating in an unlicensed band. In some other implementations, a cellular radio network is used. As non-limiting examples, a base alignment system 352 may communicate with an electric vehicle alignment system 354 through communication link 376 to provide a feedback mechanism for more closely aligning the base power transfer element 304 with the electric vehicle power transfer element 316 via mechanical (kinematic) alignment. Similarly, a base positioning system 362 may communicate with an electric vehicle positioning system 364 through communication link 376 to provide a feedback mechanism to guide an operator to the charging spot and in aligning the base power transfer element 304 with the electric vehicle power transfer element 316. In addition, there may be separate general-purpose communication links (e.g., channels) supported by the base communication system 372 and the electric vehicle communication system 374 for communicating other information between the base wireless charging system 302 and the electric vehicle wireless charging system 314 e.g., using an Ethernet over radio protocol. This information may include information about electric vehicle characteristics, battery characteristics and charging status, power capabilities and other characteristics of both the base wireless charging system 302 and the electric vehicle wireless charging system 314, as well as maintenance and diagnostic data for the electric vehicle 112. Some implementations may provide sufficient bandwidth even for the allocation of value-add services to the vehicle user/owner.

In some implementations, the base positioning system 362 and/or the electric vehicle positioning system 364 are configured to determine the position of the electric vehicle 112 with respect to the charging spot by transmitting suitable signals via the positioning link 366. The positioning link 366 may be bi-directional, meaning that positioning signals may be emitted by the base positioning system 362 or the electric vehicle positioning system 364 or by both.

In some implementations relying on mechanical (kinematic) alignment by physically (mechanically) moving the base power transfer element 304 and/or the electric vehicle power transfer element 316, the base alignment system 352 and/or the electric vehicle alignment system controls the alignment of the base power transfer element 304 and/or the electric vehicle power transfer element 316 via alignment mechanism 353 and/or 355, respectively. In some implementations, information on an alignment offset between base power transfer element 304 and electric vehicle power transfer element 316 is provided to the base alignment system 352 and/or to the electric vehicle alignment system 354 by the base positioning system 362 and/or electric vehicle positioning system 364. In other implementations, information on an alignment offset is determined by the base alignment system 352 and/or by the electric vehicle alignment system 354.

Furthermore, the wireless charging system 300 may include detection and/or sensor systems to protect the wireless charging system 300. For example, the wireless charging system 300 may include a base protection system 382 and an electric vehicle protection system 384. These protection systems 382 and 384 may be configured to detect foreign objects in the space near and/or between the base power transfer element 304 and/or the electric vehicle power transfer element 316. As non-limiting examples, this may include detection of foreign (e.g. metallic) objects that may be heated up (e.g., through induction heating and/or hysteresis losses) (e.g., to critical temperatures) during the wireless charging operation, detection of hazardous events such as they may be produced by metallic objects in connection with incandescent materials, and/or temperature monitoring of the base power transfer element 304 and/or electric vehicle power transfer element 316 and/or of any other part of the wireless charging system 300 and the electric vehicle 112. Further, the protection systems 382 and 384 may be configured to detect living objects approaching the power transfer elements 304 and 316 beyond a radius. In some implementations, the protection systems 382 and 384 may also be configured to detect objects based on mechanical alignment of the power transfer elements 304 and/or 316 e.g., mechanical alignment may be sensed as differing from an expected height and/or position based on a foreign object obstructing movement of a power transfer element.

The wireless charging system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle wireless charging system 314, the wireless charging system 300 may use in-band signaling and/or out-of-band signaling. Out-of-band signaling may be performed via communications link 376 e.g., using a RF technology as previously described. For in-band signaling, a low depth amplitude or phase modulation of the wireless power carrier signal that may be transmitted on the wireless power link 305.

To enable wireless high power transfer, some implementations may be configured to transfer power at a frequency, as one example, in the range from 20-150 kHz. This low operating frequency may allow higher efficiency power conversion that may be achieved using solid state devices. In addition, there may be less coexistence issues with radio systems compared to other bands. However, other frequencies of operation in other ranges may also be used (e.g. frequencies in the 6.28 MHz or 13.56 MHz ISM bands).

With respect to induction charging, depending on the energy transfer rate (e.g., power level), operating frequency, size, design and type of the base power transfer element 304 and the electric vehicle power transfer element 316 and the distance (air gap) between them, the flux density in the air gap at some locations may exceed 0.5 mT and may reach several Millitesla. If a foreign object that includes a certain amount of conductive material (e.g., such as metal) is exposed to a time-varying (e.g. alternating) magnetic field, eddy currents may be generated in this object (e.g., based on Faraday's and Lenz's law), that may lead to power dissipation and subsequent heating effects of the foreign object. This inductive Joule heating effect may depend on the magnetic flux density, the rate of change or the frequency of the time-varying magnetic field, and the size, shape, orientation, conductivity and magnetic permeability of the object's conducting structure. When the foreign object is exposed to the magnetic field with a flux density above a certain critical level and for a sufficiently long time, it may heat up to temperatures that may be considered hazardous in several regards. One hazard may be self-ignition if the foreign object includes inflammable materials or if it is in direct contact with such materials, e.g., a cigarette package including a thin metallic foil or metallic film. A hazardous temperature for self-ignition may be, for example, 200° C. (473 K). Another hazard may be burning another object (e.g., a person) that may come in contact with such a hot object, e.g., a coin or a key. A critical temperature for burning a person may be, for example, 80° C. (353 K). Another hazard may be damaging the plastic enclosure of the primary or secondary structure of the power transfer elements 304 and/or 316, e.g., a foreign object melting into the plastic. A critical temperature for melting a plastic may be, for example, 150° C. (423 K). In another aspect, foreign objects including combustible materials or in direct contact with combustible materials may produce smoke emissions. Though not imposing a real hazard, smoke may damage the general perception of safety of wireless charging of electric vehicles.

A temperature increase may also occur in foreign objects including metallic materials that may be substantially non-conducting but that exhibit a pronounced hysteresis effect or in materials that generate both hysteresis and eddy current losses (e.g. ferromagnetic steel). As such, detecting such foreign objects in a magnetic field (e.g., between power transfer elements 304 and 316) may be beneficial to avoid the discussed issues. Accordingly, certain aspects discussed herein relate to object detection systems (e.g., protection systems 382 and 384) that are configured to detect foreign objects. In some aspects, if the object detection system is integrated within a system for providing wireless power (e.g., between power transfer elements 304 and 316), in response to detecting a foreign object, the wireless power system may be configured to reduce a power level or shut down until measures may be taken to remove the foreign object (e.g., manually or automatically).

In certain applications of inductive power transfer such as charging of electric vehicles in domestic and public zones, it may be compulsory for reasons of safety of persons, equipment and the environment to be able to detect foreign objects that have the potential to heat up to critical temperatures when exposed to the magnetic fields of the inductive power transfer system. This may be particularly true in systems where the space around and between a base power transfer element (e.g., base power transfer element 104a, 204, 304, etc.) and a vehicle power transfer element (e.g., vehicle power transfer element 116, 216, 316, etc.) is open and accessible such that foreign objects may accidentally or intentionally (e.g., in case of sabotage) be positioned in this space. Herein, the space where objects can potentially heat up to critical temperatures may be generally referred to as the critical space of an inductive power transfer system. In some implementations, this space may be defined as the space where the flux density exceeds 0.5 mT (r.m.s).

In some other aspects, it may be a requirement of a standard to detect living objects in the critical space, e.g., extremities of humans such as a hand and animals entering this space, to protect them from exposure to magnetic fields at levels exceeding the limits as recommended, e.g., by the International Commission on Non-Ionizing Radiation Protection (ICNIRP).

Descriptions and drawings herein may assume the presence of a single foreign object in a predetermined space for the sake of simplicity. However, methods and apparatuses disclosed herein may generally be configured to detect more than one foreign object within a predetermined space.

In certain aspects, the methods and concepts disclosed herein enable foreign object detection (FOD) in a predetermined space by contactless thermal sensing using at least one infrared (IR) optical sensor that may be also referred to as an IR detector. In certain aspects, the predetermined space includes the entire critical space as defined above. In some aspects, the predetermined space may exclude portions of the critical space, e.g., where foreign objects are unlikely to occur, or may include portions outside of the critical space. In certain aspects, the methods and concepts may be used to detect potential foreign objects before they have reached a critical temperature. In certain aspects, such FOD before the foreign object reaches a critical temperature may be performed through excitation of the base power transfer element 304 and/or electric vehicle element 316 with a large enough current so that the temperature of a foreign object starts raising. In certain aspects, the described methods and concepts may include provisions to protect the at least one IR optical sensor from mechanical impact and pollution as typically encountered in the harsh automotive environment as described further below.

In some implementations, FOD is accomplished using one or more IR optical sensors. The one or more IR optical sensors may be part of at least one thermal imager (e.g., IR camera) for thermal imaging. For example, an IR camera may include an array of IR sensors disposed in the focal plane of the camera (focal plane array), at least one lens, and an enclosure. In some implementations of an IR camera, the array is a two-dimensional array with IR sensors arranged in rows and columns. In some other implementations, the IR camera includes a mechano-optical scanner and at least one IR sensor disposed in the focal plane of the mechano-optical scanner system. In some implementations, the scanner system uses a linear array of IR sensors.

In some other implementations, a plurality of IR sensors may be disposed at different locations rather than concentrated in a camera.

In certain aspects, contactless thermal sensing of a foreign object may be based on the object's thermal radiation. For example, according to well-known laws of physics, the spectral intensity of electromagnetic radiation (spectral radiance) of a body (e.g., foreign object) is some function of its surface temperature $\vartheta_{obj}$ and its radiation properties (spectral emissivity $\varepsilon_{obj}$) that may be dependent on the wavelength of the emitted radiation.

At the output of an IR sensor, a so-called black body ($\varepsilon_{obj}=1$) at temperature $\vartheta_{obj}$ may appear hotter than a so-called gray body ($\varepsilon_{obj}<1$) with the same surface temperature $\vartheta_{obj}$. Therefore, the temperature that is sensed by an IR sensor may be referred to as the apparent temperature of an object. In certain aspects, an IR sensor may be calibrated for a black body radiator. For a gray body, the IR sensor may measure a substantially lower apparent temperature than its true temperature $\vartheta_{obj}$. Many metallic objects exhibit an emissivity $\varepsilon_{obj}<1$ and even $\varepsilon_{obj}<0.2$.

The apparent temperature of an object as seen by an IR sensor may depend not only on the object's emissivity but may also be a function of the optical resolution (e.g., solid or dihedral angle) of the IR sensor. For example, if the solid angle of a hot object as seen by the sensor is smaller than the resolution solid angle of the sensor, meaning insufficient optical resolution, the apparent temperature as sensed by the IR sensor may also be considerably lower than the object's true temperature though the object may have an emissivity $\varepsilon_{obj}$ close to one. This may be particularly true, if the background (ambient) of the object is at a lower temperature than the object.

The effect of an emissivity $\varepsilon_{obj}<1$ and an insufficient optical resolution at the same time can be illustrated using the following simple numerical example. The apparent absolute temperature $\vartheta_{app}$ of an object may be expressed according to the Stefan-Boltzmann thermal radiation law as $$\vartheta_{app} = \vartheta_{obj}\left(\frac{\Omega_{obj}}{\Omega_s}\varepsilon_{obj} + \frac{(\Omega_s - \Omega_{obj})}{\Omega_s}\varepsilon_0\left(\frac{\vartheta_0}{\vartheta_{obj}}\right)^4\right)^{1/4}. \quad (1)$$

where $\vartheta_{obj}$ denotes the absolute true temperature in Kelvin of the object, $\vartheta_0$ the absolute temperature of the ambient, $\Omega_{obj}$ the solid angle of the object as seen by the IR sensor, $\Omega_s$ the solid angle of the IR sensor, and $\varepsilon_{obj}$ and $\varepsilon_0$ the emissivity of the object and the ambient, respectively. For the numerical example $\Omega_{obj}/\Omega_s=0.1$ (typical for a small object and a low cost low resolution IR camera), $\varepsilon_{obj}=0.1$ (typical for metals), $\varepsilon_0=1$, $\vartheta_{obj}=400$ K, $\vartheta_0=300$ K, Equation (1) yields $$\vartheta_{app}=0.74\ \vartheta_{obj}=295\ K,$$

which is even 5 K lower than the temperature of the ambient $\vartheta_0$.

An apparent temperature $\vartheta_{app}<\vartheta_{obj}$ may also result, if the line-of-sight path between object and sensor is obstructed by another object that is opaque or only partially transparent for infrared.

The methods and concepts for FOD disclosed herein may use diverse IR sensing technologies based on diverse physical effects. In certain aspects, technologies providing sufficient sensitivity in the medium and long wave range 5-14 µm (MWIR, LWIR) may be used for sensing objects with a surface temperature $\vartheta_{obj}$ in the range from 350 to 900 K. Technologies with a peak sensitive at shorter wavelengths e.g. $\lambda<5$ µm may be also used in some specific implementations. According to Wien's displacement law, the maximum of the spectral radiance of an ideal blackbody with a temperature of 300 K occurs at 8.3 µm. At 900 K, it can be found at 3.2 µm. Wien's law also applies to the so-called "grey body" radiator that exhibits a flat spectral emissivity $\varepsilon_{obj}<1$.

A figure of merit commonly applied to IR sensors is the Noise Equivalent Power (NEP) or the detectivity that is the reciprocal of the NEP of the IR sensor. The NEP is the incident IR power t in Watts on the sensor required to generate a signal output $V_s$, e.g., in Volts, equal to the r.m.s. noise output $V_n$, e.g., in Volts. Stated another way, the NEP is the incident IR power required to produce a signal-to-noise ratio (SNR) of one. The NEP may be defined as $$NEP = V_n \frac{\Phi}{V_s}\ [W], \quad (2)$$

Many IR sensors exhibit a NEP that is proportional to the square root of the sensor area $A_s$ and the bandwidth $\Delta f$ used to measure the SNR at the sensors' output. Therefore, the NEP may also be quoted as power per unit area and bandwidth in W Hz$^{-1/2}$cm$^{-1/2}$. Correspondingly, the normalized detectivity $$D^* = \frac{\sqrt{A_s \Delta f}}{NEP}\ [cm^{1/2}Hz^{1/2}/W], \quad (3)$$

may be used to compare different IR sensor technologies. Published values of D* for IR sensor technologies may refer to a sensor surrounding (background) radiating at 300 K and a field of view (FoV) of 2 π steradian (hemisphere). This convention may also apply to cooled IR sensor devices. If D* is limited by the background radiation, it may be referred to a background limited infrared photo-sensor (BLIP).

Some IR sensing technologies may require cooling down to temperatures considerably below ambient for achieving the required detectivity in the LWIR wavelength range. Cooling may be accomplished cryogenically, e.g., using liquid Nitrogen (77 K). Further, cooling to higher temperatures, e.g., 250 K, may be accomplished using thermoelectric (Peltier) elements. In certain aspects, for an FOD application as disclosed herein, cryogenic, thermoelectric, or other cooling technologies may be used.

Another figure of merit that may be relevant for FOD may be the Noise Equivalent Temperature Difference (NETD). The NETD characterizes the temperature resolution capability of an IR optical sensor. The NETD may be defined as the required change of temperature $\Delta\vartheta$ of a blackbody as seen by the sensor to produce a change in the signal output $\Delta V_s$ equal to the r.m.s. noise output $V_n$ of the sensor ($\Delta V_s = V_n$). Mathematically, the NETD may be expressed as $$NETD = V_n \frac{\Delta\vartheta}{\Delta V_s} \ [K], \tag{4}$$

In some implementations of the methods and concepts disclosed herein, the infrared sensor functions based on a thermal effect using a two-step process or even a three-step process. In the first step, infrared photons as received from a hot object's thermal radiation are absorbed by a thermally isolated detector element (device) resulting in a temperature increase of the detector element. This temperature increase of the device is related to the photon irradiance E [W/m²] that may be in turn related to the object's temperature. In the second or even in a third step, the temperature increase of the device may be measured using at least one of the following physical effects, which may be subdivided into the following categories:

1. An electrical characteristic (e.g. resistivity $\rho$ or conductivity $\sigma$, resistance R, permittivity $\varepsilon$, capacitance C, electric field E, voltage V, current I) is a function of the device temperature $\vartheta_D$
2. A magnetic characteristic (e.g. permeability $\mu$, inductance L, magnetic field H, magnetic flux $\Phi$) is a function of the device temperature $\vartheta_D$
3. An electric characteristic (e.g. voltage V, current I) is a function of a rate of change of the device temperature ($d\vartheta_D/dt$)
4. A magnetic characteristic (e.g. magnetic flux $\Phi$) is a function of a rate of change of the device temperature ($d\vartheta_D/dt$)
5. A mechanical characteristic (e.g. length l, pressure p, force F, torque T, strain p, resonant frequency $f_0$) is a function of the device temperature $\vartheta_D$
6. A mechanical characteristic (e.g. length l, pressure p, force F, torque T, strain p, resonant frequency $f_0$) is a function of the rate of change of the device temperature ($d\vartheta_D/dt$)

In some implementations, the IR sensor is one of a bolometer that functions based on a thermal effect of the first category (conductivity $\sigma$ is a function of temperature $\vartheta_D$) providing a normalized detectivity on the order of 4 $10^8$ cm$^{1/2}$Hz$^{1/2}$/W, or a thermopile (thermocouple) that functions based on the Seebeck effect also belonging to the first category providing a detectivity 2 $10^8$ cm$^{1/2}$ Hz$^{1/2}$/W. In other implementations, the sensor functions based on a pyroelectric effect according to the third category of thermal effects yielding a detectivity in the order of $10^9$ cm$^{1/2}$ Hz$^{1/2}$/W. In further implementations, the sensor functions based on one of the fifth category thermal effects, e.g., by measuring a mechanical resonance frequency, e.g., of a Micro Electro-Mechanical System (MEMS) device, that is a function of the device temperature $\vartheta_D$ or by measuring a gas pressure p that is a function of the device temperature $\vartheta_D$ also referred as to a Golay cell exhibiting a detectivity in the order of 2 $10^9$ cm$^{1/2}$ Hz$^{1/2}$/W. In yet other implementations, the sensor functions based on a three step process using some of the first and fifth category physical effects, e.g., by measuring the capacitance of a MEMS device (e.g. a cantilever) that is a function of a mechanical strain that is in turn a function of the device temperature $\vartheta_D$. Thermal effect IR sensors may generally exhibit a relatively flat spectral detectivity.

In other implementations of the methods and concepts disclosed herein, the IR sensor functions based on a quantum effect converting infrared photons as received from a hot object's thermal radiation into charge carriers. As opposed to thermal effect sensors, quantum effect sensors may be wavelength selective and may show a sharp cut-off wavelength typically below 5 um. Uncooled quantum effect sensors may provide limited detectivity in the MWIR range <5 um. However, their detectivity may be improved by cooling, e.g., using a Peltier element. The quantum effect is principally a single step process and may not require an intermediate step process. It may be subdivided into the following categories of physical effects:

1. Photoconductive effect, where conductivity a is a function of the thermal (photon) irradiance E
2. Photovoltaic effect, where a voltage V or current I is a function of the thermal (photon) irradiance E In some implementations, the sensor is a PbSe photoresistor that functions according to the first category of quantum effects yielding un uncooled peak detectivity of $10^{10}$ cm$^{1/2}$ Hz$^{1/2}$/W at $\lambda=4$ um. In some implementations, the sensor is a "multicolor" photoconductive Quantum Well IR Photosensor (QWIP) that functions according to the first category of quantum effects and is capable of sensing IR selectively and concurrently at different wavelengths. In yet other implementations, the sensor is a p-n junction photodiode operating according to the second category of quantum effects. In further implementations based on the second category (photovoltaic) quantum effects, the sensor is one of a n-p-n phototransistor, a p-i-n heterostructure photodiode providing an uncooled peak detectivity of 5 $10^{10}$ cm$^{1/2}$ Hz$^{1/2}$/W at $\lambda=4.5$ um and 300 K, an avalanche photodiode, a photoemissive detector e.g. a Schottky-Barrier photodiode, a metal-semiconductor-metal (MSM) photodiode, a metal-insulator-semiconductor (MIS) photodiode, and a nonequilibrium photodiode. In yet other implementations based on the second category quantum effects, the sensor is one of a nBn-detector, a photoelectromagnetic (PEM) detector using a static magnetic field, a magneto-concentration detector, a Dember effect detector, and a photon-drag detector.

In some alternative implementations, wavelength selective sensing of IR radiation is accomplished by applying optical heterodyne detection principles. In some implementations of a heterodyne IR sensor, a quantum effect-type detector, e.g., a photodiode, is used for non-linear mixing of an IR radiation input with radiation from a local (e.g. monochromatic) IR source (the local oscillator). In some implementations, the two radiation signals are superimposed using an optical combiner. As with classical RF heterodyne receivers, non-linear mixing of the two radiation signals yields a mixing product at the difference (intermediate) frequency. Depending on the frequency of the local IR source, the intermediate frequency may fall into the microwave range. If the local IR source is monochromatic, the heterodyne concept can provide a frequency selective IR sensor. An optical heterodyne detector may be also considered as a down-converter converting the radiation signal at IR frequencies down to a suitable intermediate frequency where the signal can be filtered, amplified and eventually detected using standard RF electronics circuitry. In some implementations using a plurality of IR sensors (e.g. an IR camera), a common local oscillator IR source is used for the plurality of IR sensors. The concept of optical heterodyne detection may be also expanded to a "multicolor" IR sensor by providing each IR sensor with multiple intermediate frequency outputs. These outputs may be indicative for the IR radiation intensity at different wavelengths.

A FOD system may be based on different types of sensors exploiting their characteristics and strengths. In some implementations, a thermal effect sensor, e.g., a bolometer-type sensor, may be used in conjunction with a quantum effect sensor, e.g., a photodiode. In some other implementations IR sensitive sensors are used in combination with sensors sensitive in the visible light spectrum. In yet other implementations, IR sensors sensitive at different wavelengths may be used in combination.

Some IR sensing technologies, e.g., those that function based on a third, fourth or sixth category thermal effect, may use an optical chopper for sensing an object with a static or slowly time varying temperature. The optical chopper may convert a quasi-static IR radiation input into radiation pulses, which then can be detected with a sensor only responsive on temperature changes ($d\vartheta_D/dt$). In some implementations, an optical chopper is accomplished using a mechanically rotating perforated disk. In other implementations, chopping is performed by a rotating blade. In further implementations, a liquid crystal, e.g., a ferroelectric liquid crystal, is used for modulating the IR radiation incident on the sensor device.

In some implementation, an optical chopper or shutter is used for the purposes of sensor calibration. In an IR camera an electro-mechanical shutter may be used to calibrate a plurality of IR sensors (e.g. a focal plane array). In some implementations, a sensor calibration is accomplished as follows: In the calibration mode, the output signal of each sensor is measured and values are stored as reference values when the shutter is closed. In the normal operating mode, when the shutter is open, the stored reference values are subtracted from the corresponding sensor outputs on a per sensor (pixel) basis.

IR sensor calibration may distinguish absolute temperature calibration from relative temperature calibration. Absolute temperature calibration of an IR sensor may be required if objects are detected based upon their apparent temperature as previously described. Relative temperature calibration may apply if FOD is based on differential detection, e.g., time differential detection or space differential detection (difference of at least two sensor outputs). Relative calibration enables equal or substantially equal output for an equal apparent temperature. Relative calibration of the plurality of sensors of an IR camera may improve uniformity of the IR image when viewing a uniform-temperature scene.

In implementations using a shutter with defined emissivity, absolute temperature calibration may be accomplished by controlling the shutter temperature. In some other implementations, the entire IR sensor including the shutter is temperature controlled. In further implementations, absolute temperature calibration is performed by using a local IR radiation source with a controlled radiance and a beam combiner deflecting the radiation to the IR sensor. This local calibration source may be part of an IR sensor assembly. In yet further implementations, the calibration source is disposed external and remote to the IR sensor assembly, e.g., integrated into the base wireless charging system 102a. In such implementations, absolute calibration may be accomplished by first performing a relative calibration with the shutter closed providing uniformity, second by an absolute calibration upon those IR sensors viewing the calibration source, and third by applying this calibration (correction) to the plurality of IR sensors.

In some implementations, calibration of the at least one IR sensor is performed periodically, e.g., to compensate for temperature drift effects, however, reducing the blind time of the IR sensor, e.g., when the shutter is closed for calibration.

In some implementations, a controlled remote calibration source is also used as test object for performing self-tests of an FOD system. In some implementations, the controlled remote calibration source may also be used as reference for detecting objects on a differential basis.

Some implementations use an optical filter, e.g., an optical filter transparent in the wavelength range of interest, rejecting photons with wavelength in undesired spectral ranges, e.g., visible light. In some implementations, such an optical filter may be disposed in front of the lens of an IR camera. In other implementations, an optical filter may be a micro structure that is part of the IR detector device.

Furthermore, an optical polarization filter may be used, e.g., to attenuate reflections of potential IR sources located outside of the predetermined space as further described below.

In some implementations, the output signal of an IR sensor is analogue and continuous-time, e.g., a voltage or a current signal. In some other implementations using a digital-to-analogue converter, the output is discrete time and digital (sequence of digital samples). The ensemble of outputs of a plurality of IR sensors (e.g., IR camera 402) may be referred to as an image frame. The number of image frames produced by a plurality of IR sensors (e.g., IR camera 402) per unit time may be referred to as the frame rate.

Another aspect that may be relevant to an IR camera is the field of view (FoV). A vertical FoV and a horizontal FoV may be specified for an IR camera. In some implementations using a rectangular focal plane sensor array, the vertical FoV and the horizontal FoV may be determined by the focal length of the lens and the width and length of the focal plane sensor array, respectively. In some IR camera implementations, the vertical FoV is smaller than the horizontal FoV as exemplarily shown in FIGS. 8 and 9. In some implementations, the IR camera is designed for a medium FoV, e.g., 60° C. In other implementations, the IR camera uses a wide angle objective (lens) providing a wide FoV, e.g., 90° C.

Table 1 provides technical data of an exemplary selection of commercial-off-the-shelf IR sensor products, which may be used for an IR-based FOD system. The technical data comprises product/brand name, the sensor type (technology), package size, number of pixels in the horizontal and vertical dimension (rows and columns), the sensitive wave length range, the operating temperature range, the NETD at 25° C. and at specified frame rate, the supported frame rates, and the horizontal FoV. The choice of a particular sensor product may be the result of a trade-off between performance (optical resolution, NETD, etc.) and cost.

TABLE 1

| IR sensor product | IR sensor type | Package size [mm] | No of pixels (H × V) | Wave length range [um] | Operating temp. range [° C.] | NETD @ 25° C. [K] | Frame rate [Hz] [fps] | Horiz. FoV [1] [°] |
|---|---|---|---|---|---|---|---|---|
| InfraTec PIR uc 180 | Uncooled ASi microbolometer 2D focal plane array | 51 × 51 × 65 | 160 × 120 | 7.5 . . . 13 | −20 . . . 85 | 0.08 @9 Hz | <100 | 30 × 23 |
| Electro-physics Atom 80 | Uncooled ASi microbolmeter 2D focal plane array | 31.8 × 38.1 × 35.6 | 80 × 80 | 8 . . . 14 | −40 . . . 85 | <0.04 @8 Hz | 1 . . . 50 | 23 × 23 |
| FLIR Lepton | Uncooled VOx microbolometer 2D focal plane array | 8.5 × 11.7 × 5.6 | 80 × 60 | 8 . . . 14 | −10 . . . 65 | 0.05 @8.6 Hz | 8.6 | 64 × 51 |
| Omron D6T-1616L | MEMS thermopile 2D focal plane array | 3.75 × Ø8.3 | 16 × 16 | 5 . . . 14 | 0 . . . 50 | 0.14 @4 Hz | ≤4 | 63 × 44 |
| Melexis MLX90621 | Thermopile 2D focal plane array | TO-39 | 16 × 4 | 5 . . . 14 | −40 . . . 85 | 0.28 @8 Hz | 0.5 . . . 512 | 60 × 15 |
| Heimann HTPA 16 × 4 | Thermopile 2D focal plane array | TO-39 | 16 × 4 | 5 . . . 14 | −40 . . . 85 | 0.28 @8 Hz | 0.5 . . . 512 | 63 × 18 |
| Panasonic AMG8832 | MEMS (SMT) thermopile array | 4.3 × 7.8 × 10.9 | 8 × 8 | 5 . . . 14 | −20 . . . 80 | 0.25 @10 Hz | 1, 10 | 60 × 80 |
| Heimann HTPA 8 × 8 | Thermopile 2D focal plane array | TO-39 | 8 × 8 | 5 . . . 14 | −40 . . . 85 | <0.28 @8 Hz | 0.5 . . . 512 | 46 × 46 |
| Omron D6T-44L-06 | MEMS thermopile 2D focal plane array | 3.75 × Ø8.3 | 4 × 4 | 5 . . . 14 | 0 . . . 50 | 0.14 @4 Hz | ≤4 | 63 × 44 |
| Texas Instruments TMP007 | Thermopile | 1.9 × 1.9 | 1 × 1 | 4 . . . 16 | −40 . . . 125 | 0.09 @ 1 Hz | 0.25 . . . 4 | ~60 |

Note
[1] For some products, options providing other FoV angles may be available

The concepts and methods disclosed herein may be utilized, for example, with IR optical sensors installed either at the underbody of the electric vehicle 112 or on the ground, e.g., mounted at or near the base wireless charging system 102a. In some implementations, e.g., in a garage, IR optical sensors (e.g., an IR camera) may be mounted at a wall at a height suitable for monitoring the predetermined space beneath a vehicle. In some other implementations, IR optical sensors (e.g., an IR camera) may be housed in a floor mount dome of suitable height and disposed at a suitable distance from the base power transfer element, e.g., base power transfer element 104a. In yet other implementations, IR optical sensors are integrated into or packaged with a power transfer element, e.g., base power transfer element 104a or electric vehicle power transfer element 116 of FIG. 1. However, in some preferred implementations, e.g., using an IR camera, the IR camera is disposed external of the power transfer elements at a location suitable to match the predetermined space to be monitored with the camera's field of view.

In certain aspects, special provisions for protecting the camera from dirt, water, and mechanical impact may be used for an IR camera at the electric vehicle's 112 underbody or on the floor. For example, when not in use, a vehicle underbody mount IR camera may be configured to not protrude from the underbody to avoid compromising the vehicle's ground clearance. In some aspects, the camera may be above a validation line as typically defined for a vehicle with a specified minimum vehicle-to-ground clearance.

Figure 4A:
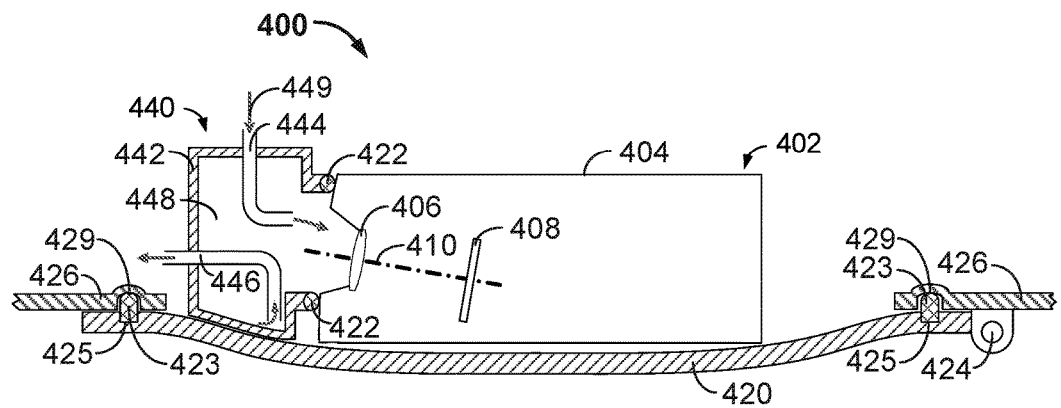
FIG. 4A is a diagram illustrating an electric vehicle underbody mounted infrared camera assembly with the camera stowed in the vehicle's underbody, in accordance with an exemplary implementation.
Figure 4B:
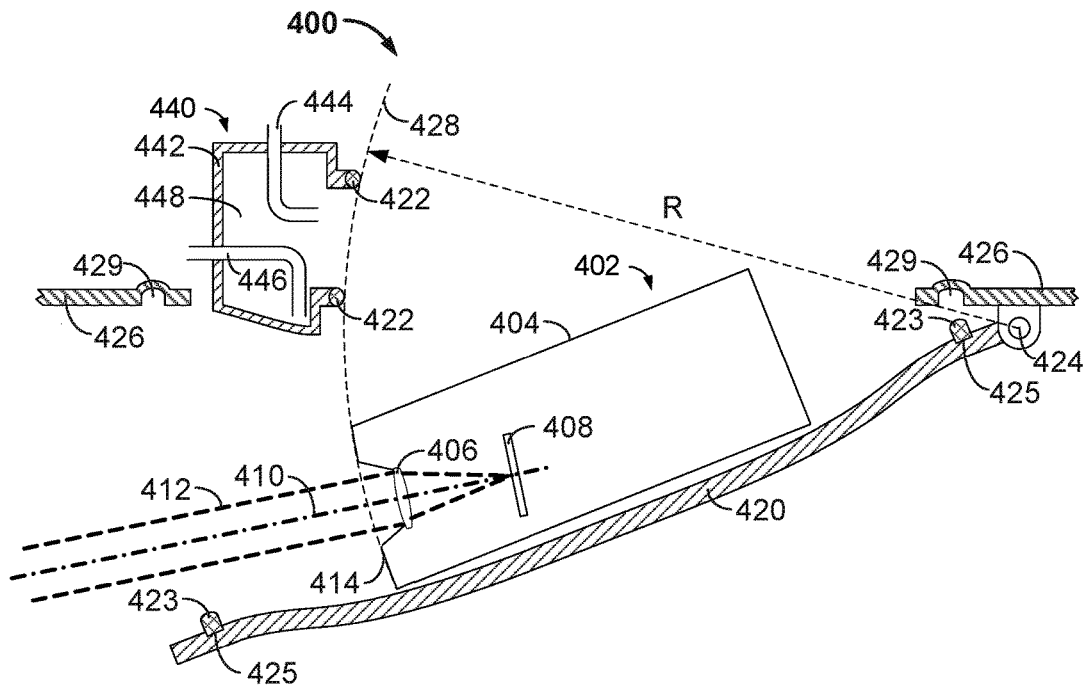
FIG. 4B is a diagram illustrating the electric vehicle underbody mounted infrared camera assembly of FIG. 4A with the camera in the deployed position, in accordance with an exemplary implementation.

In some implementations, the IR camera, when not in use, is stowed in a recess in the electric vehicle's 112 underbody and is deployed (e.g., lowered) to a height suitable for monitoring the predetermined space when FOD is activated. FIG. 4A and FIG. 4B are cut views to illustrate a vehicle underbody-mounted deployable IR camera assembly 400 in accordance with an exemplary implementation in the stowed position and the deployed position, respectively. The IR camera assembly 400 as shown includes an IR camera 402, optional lens cleaner 440, and protective cowl 420. The IR camera 402 is attached to the protecting cowl 420. In the stowed position (see FIG. 4A), the IR camera assembly 400 is practically non-protrusive and the IR camera 402 is also protected from dirt, water, icing and mechanical impact. The lens cleaner 440 may be included because lens 406 of IR camera 402 in the deployed position (see FIG. 4B) may be exposed and therefore subjected to some pollution caused by, e.g., polluted air, splash water as typically encountered in an automotive environment. For the sake of simplicity, FIGS. 4A and 4B do not show the actuator (motor) and any gear to open and close the protecting cowl by means of a rotational motion about the axis of hinge 424.

FIGS. 4A and 4B show the front face 414 of the camera's enclosure 404 curved. The curvature corresponds to a circle 428 (dashed line in FIG. 4B) centered on the axis of hinge 424 with radius R equal to the distance between camera's 402 front face 414 and the axis of hinge 424 so that the lens cleaner 440 forms a closed lens cleaning chamber 448 when the IR camera 402 is in its stowed position. The curved front face 414 also allows unimpeded rotation of the IR camera 402 about the axis of hinge 424.

The lens cleaner 440 as illustrated by FIG. 4A includes an enclosure 442 forming together with the curved front face 414 of camera 402 the lens cleaning chamber 448, cleaning liquid inlet 444, and liquid outlet 446, as well as gasket 422 for a liquid proof cleaning chamber 448. FIG. 4A also indicates directions of the cleaning liquid flow by arrows 449 but does not show the cleaning liquid reservoir and any connecting hose that may be used in a practical implementation.

FIGS. 4A and 4B show the protecting cowl 420 furnished with a gasket 423 made of, e.g., rubber, silicon, or another suitable material. The gasket 423 may insert into a groove 425 along the perimeter but somewhat set back from the edge of the cowl so that it does not get in contact with dirt, e.g., in case the cowl was completely covered with mud when the IR camera 402 is deployed. The gasket 423 fits into a groove 429 as part of the vehicle's underbody structure 426 and may provide full hermetic sealing when the IR camera 402 is stowed in the recess of the vehicle's underbody.

Furthermore, the protecting cowl 420 may be reinforced against mechanical impact, e.g., by a slight cambering as shown in FIGS. 4A and 4B.

The IR camera 402 as illustrated in FIG. 4A is comprised of camera enclosure 404, lens 406 and IR sensor array 408 disposed in the camera's 402 focal plane and centered on the optical axis 410. Dashed lines represent incident IR rays 412 that focus on the IR sensor array 408 by the lens 406. To partially compensate for the camera's 402 rotation angle in the deployed position, the camera's optical axis 410 may be oblique with respect to the camera housing 404 as shown in FIGS. 4A and 4B.

In certain aspects, the implementation of FIGS. 4A and 4B has the potential to be minimally protrusive and also to provide protection for the IR camera 402 from pollution and mechanical impact. More specifically, it can be designed to be water and dirt resistant and such that dirt adhering at the vehicles underbody does not propagate towards the camera's lens 404, e.g., when the protecting cowl 420 is repeatedly opened and closed. These features may be helpful for an optical camera used in the harsh environment beneath a vehicle. Other state-of-the-art automotive camera solutions as in use today, e.g., for vehicle rear mount cameras may be simpler and used in some aspects, but may not provide all these features as described above in the context of FIGS. 4A and 4B.

Figure 5A:
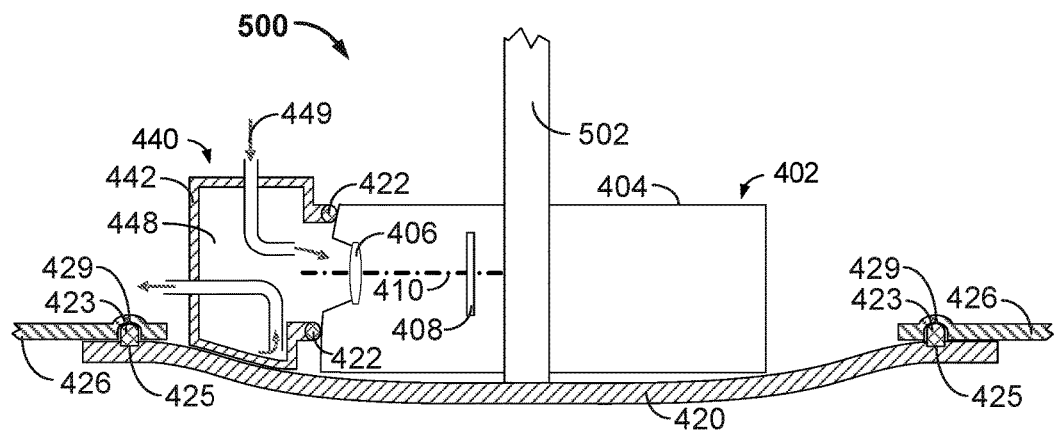
FIG. 5A is a diagram illustrating an electric vehicle underbody mounted infrared camera assembly with the camera stowed in the vehicle's underbody, in accordance with another exemplary implementation.
Figure 5B:
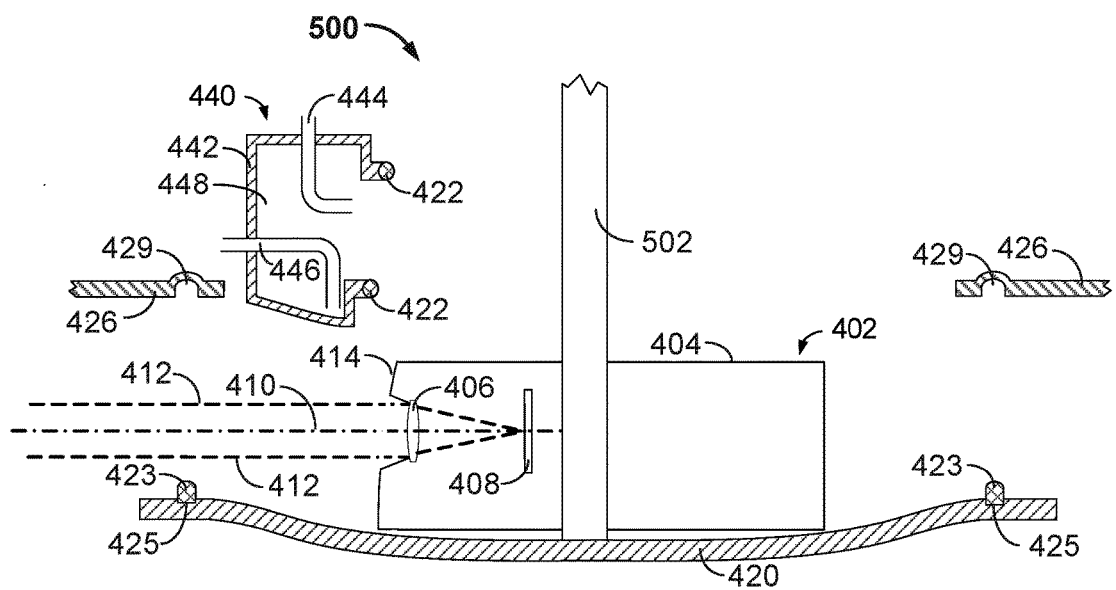
FIG. 5B is a diagram illustrating the electric vehicle underbody mounted infrared camera assembly of FIG. 5A with the camera in the deployed position, in accordance with another implementation.

FIG. 5A and FIG. 5B are cut views to illustrate a vehicle underbody-mounted deployable IR camera assembly 500 in the stowed and in the deployed position, respectively, in accordance with another exemplary implementation. Here, the IR camera 402 carried by protecting cowl 420 and at least one shaft 502 is deployed by a translational motion rather than by a rotational motion as shown in FIGS. 4A and 4B. Again, for the sake of simplicity, FIGS. 5A and 5B do not show the actuator (motor) and any gear that may be used to open and close the protecting cowl by means of a translational motion. The camera 402 may be deployed and lowered to a height where the camera's 402 field of view optimally covers the predetermined space to be monitored as illustrated in FIG. 5B.

Figure 6:
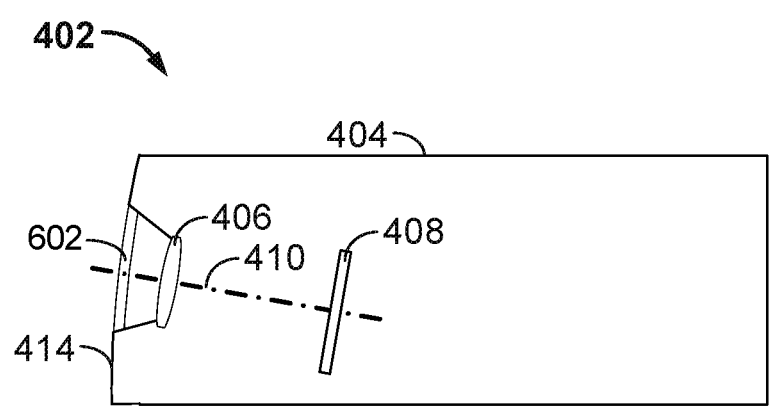
FIG. 6 is a diagram illustrating an infrared camera in accordance with an exemplary implementation.

In some implementations, the IR camera 402 of FIGS. 4A, 4B, 5A, and 5B may additionally use an IR transparent lens protecting shield 602 in front of the lens as illustrated in FIG. 6. This transparent shield 602 may be curved with a radius equal to the radius of the camera's front face 414. The shield 602 may also have the function of a wavelength filter as previously described. In some implementations, the lens protecting shield 602 may be washed by lens cleaner 440, e.g., when the IR camera 402 is in its stowed position.

In some other implementations, the lens protecting shield 602 is self-cleaning or partially self-cleaning, e.g., using ultrasonic waves that may be generated by a piezoelectric transducer built into the IR camera 402 (not shown in FIG. 6). Ultrasonic surface waves (micro-vibrations) may have a dirt and water repelling effect. Such implementations may not use a lens cleaner 440. In further implementations, an ultrasound self-cleaning is directly applied to the lens 406. In yet other implementations, ultrasound waves are generated in the cleaning liquid inside the cleaning chamber 448 of lens cleaner 440 in order to improve the cleaning effect of the liquid.

Figure 7A:
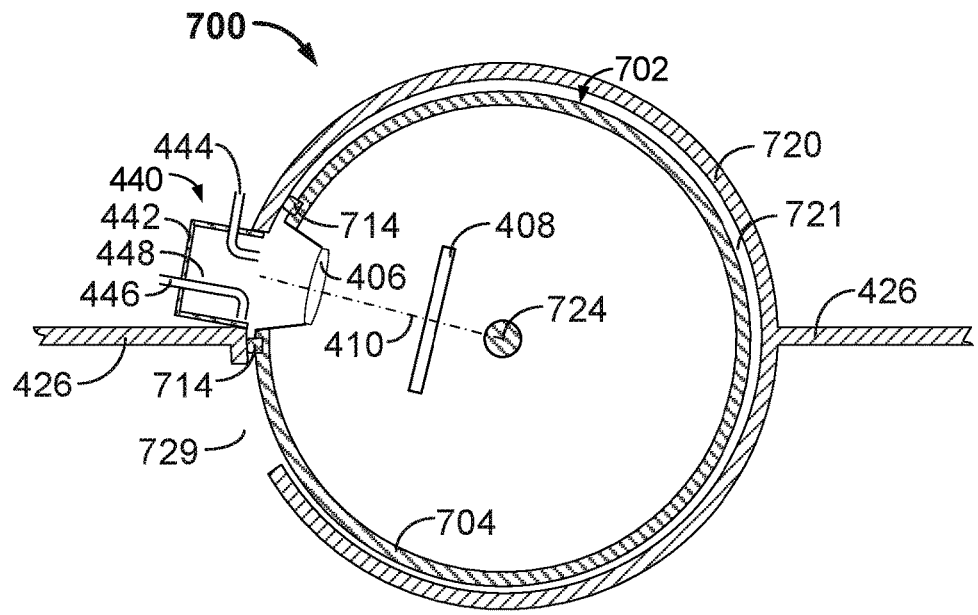
FIG. 7A is a diagram illustrating an electric vehicle underbody mounted infrared camera assembly with a rotatable camera in the non-operational position, in accordance with another exemplary implementation.
Figure 7B:
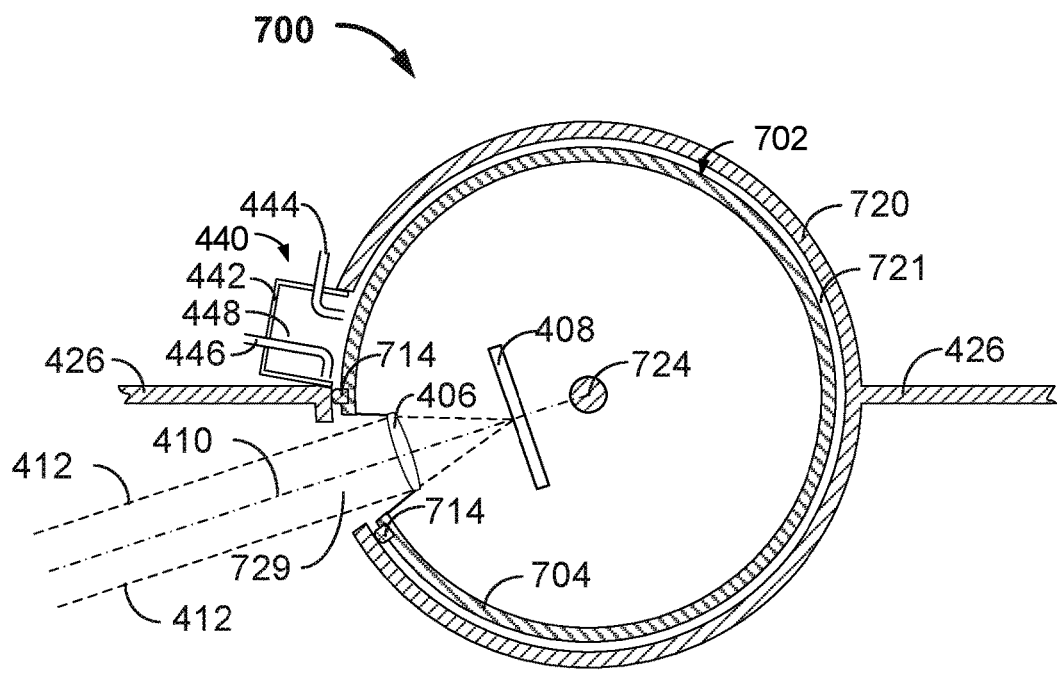
FIG. 7B is a diagram illustrating the electric vehicle underbody mounted infrared camera assembly of FIG. 7A with the rotatable camera in the operational position, in accordance with another implementation.

FIGS. 7A and 7B are cut views to illustrate a vehicle underbody mounted camera assembly 700 in the non-operational and operational position, respectively, in accordance with an alternative implementation. Here, the IR camera 702 is round shaped (e.g., cylindrical or ball shaped) and rotatable about an axis 724. The IR camera 702 is accommodated inside a similarly shaped outer housing 720 leaving some clearance 721 between camera housing 704 and inner surface of outer housing 720. The outer housing is fixed and mounted at the vehicle underbody structure 426 so that a lower portion of the outer housing 720 is protrusive below the plane of the underbody 426 and an upper portion is above that plane. The outer housing also integrates a lens cleaner 440 suitably disposed and a window 729 (hole) at respective position as shown in FIGS. 7A and 7B. Moreover, the outer housing 720 provides bearings (not shown in FIGS. 7A and 7B) as needed to rotate the IR camera 702 about its axis 724. In the non-operational position, the IR camera 702 is positioned at a first angle so that the lens 406 faces the cleaning chamber 440 as illustrated by FIG. 7A. In the operational position, illustrated in FIG. 7B, the IR camera 702 is positioned at a second angle so that IR camera 702 faces window 729 and thus gets view to the predetermined space. Again, for the sake of simplicity, FIGS. 7A and 7B do not show the actuator (motor) and any gear that may be used to rotate the IR camera 702 about its axis 724. The rotatable IR camera 702 includes an enclosure 704, lens 406, and the IR sensor array 708 disposed in the camera's focal plane, and rotation axis 724. Axis 724 may also serve as wire conduit for the camera's power supply and video data read out. The enclosure 704 is furnished with a gasket 714 disposed approximately along the perimeter of the camera's 702 aperture for proofing cleaning chamber 448 when the camera 702 is in the non-operational position (see FIG. 7A). Again, the cleaning chamber may comprise housing 442, cleaning liquid inlet 444, and liquid outlet. In analogy to FIG. 6, the IR camera 702 may provide an IR transparent shield, e.g., conformal with the outer shape of the camera 702 to protect the lens 406. In some other implementations, the IR camera 702 uses lens cleaning based on ultrasonic vibration as previously described in connection with FIG. 6, and thus may not need a liquid-based lens cleaner 440 at all.

In comparison to the implementation of FIGS. 4A and 4B, the camera assembly 700 may be protrusive from the underbody structure 426 representing a potential risk for mechanical impact. Accordingly, in certain aspects, the size of the IR camera 702 may be minimized and a recess may be added in the underbody structure 426 to accommodate camera assembly 770. For example, IR sensors (IR cameras) with a volume of less than 1 $cm^3$ may be used (see Table 1). The recess (not shown in FIGS. 7A and 7B) may be shaped to provide a widely unobstructed view onto the predetermined space and at the same time requiring a minimum of space.

In some implementations, the lens cleaner 440 may be also used to rinse the clearance 721, e.g., when the camera is in the operational position (see FIG. 7B) or in any other position (angle) differing from the non-operational position so that cleaning liquid injected through cleaning inlet 444 reaches clearance 721. For draining the clearance from sewage liquid, the outer housing 720 may provide a second hole at the bottom (lowest point) (not shown in FIGS. 7A and 7B).

In some further implementations, the outer housing 720 is omitted, except lens cleaner 440. This implementation may include a reinforced camera enclosure 704 and a suspension (bearing) designed to sustain significant mechanical impact.

The mechanical implementations as illustrated in FIGS. 4A, 4B, 5A, 5B, 6, 7A, and 7B should be construed as exemplary and non-limiting. They do not represent the only implementations in which the invention may be practiced. Any implementation that fulfills the requirements as stated above may be useful for a vehicle underbody mounted IR sensor or plurality of sensors (e.g. IR camera).

Figure 8:
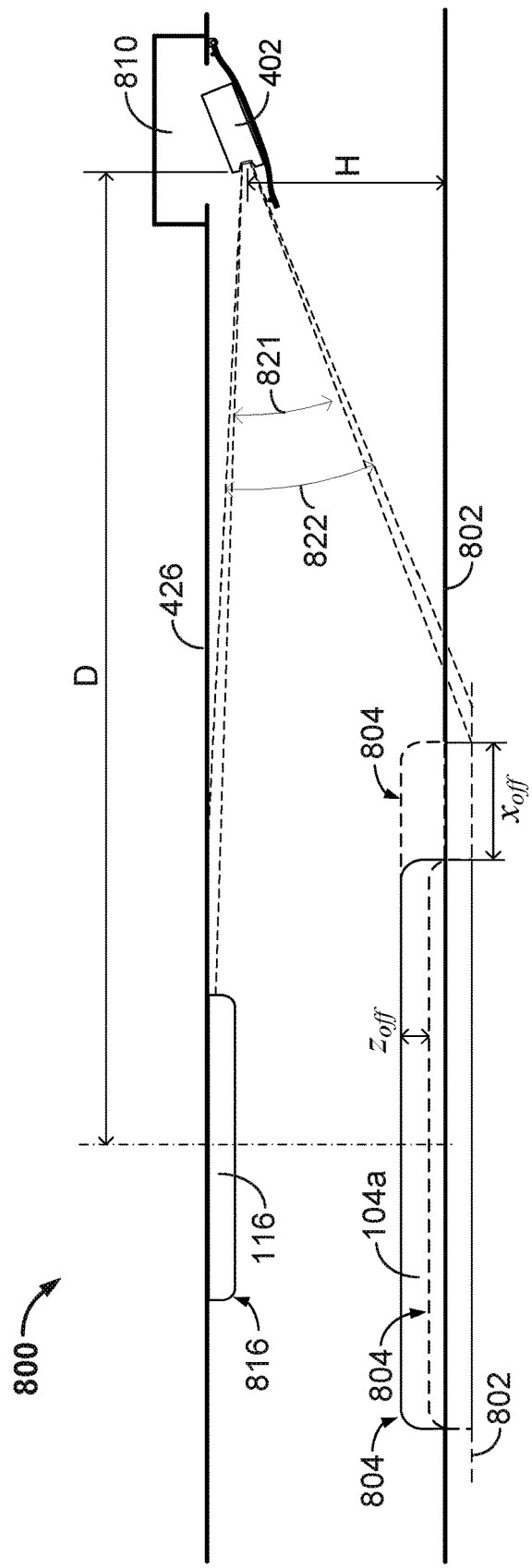
FIG. 8 is a schematic side view to illustrate placement of an infrared camera at the underbody of an electric vehicle, in accordance with an exemplary implementation.
Figure 9:
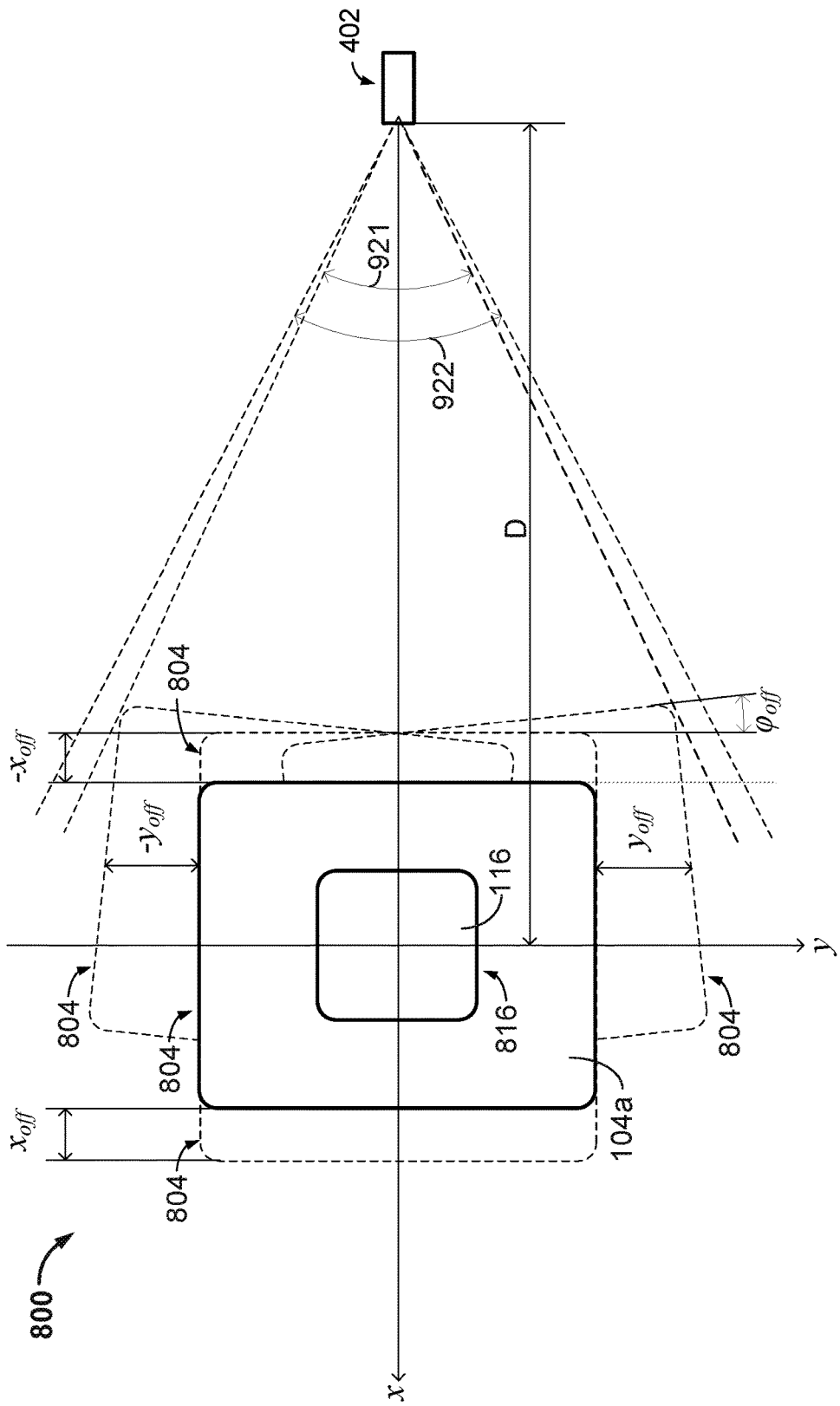
FIG. 9 is a schematic top-down view to illustrate placement of an infrared camera at the underbody of an electric vehicle, in accordance with an exemplary implementation.

FIG. 8 and FIG. 9 are schematic diagrams to illustrate placement of the IR camera, e.g. IR camera 402, at the vehicle underbody 426 such that the camera's field of view (FoV) covers the predetermined space. FIG. 8 represents a side view of a scenario 800 comprised of base pad 804 integrating base power transfer element 104a placed on the ground (floor) 802, a vehicle pad 816 integrating vehicle power transfer element 116 mounted at the vehicle underbody 426, the IR camera 402 in the deployed position, as well as recess 810 to stow the IR camera 402 when not in use, e.g., in accordance with the implementation of FIGS. 4A and 4B. FIG. 9 is a top down view of the same scenario 800 showing a rectangular shaped vehicle pad 816, the IR camera 402, and a rectangular shaped base pad 804 in various positions and rotations (dashed line) relative to the vehicle pad 816. These positions/rotations may represent specific scenarios 800 with a maximum vehicle alignment error, e.g., as tolerable by the wireless power transfer system 300 as previously described. In addition, FIG. 8 indicates the distance D and height H of the IR camera 402 optics from the center of the vehicle pad 816 and from the ground, respectively, the vertical angle of view 821 of the predetermined space as seen by the IR camera 402, and the actual vertical FoV 822 of the IR camera 402, which may differ in general as previously described. Analogously, FIG. 9 indicates the distance D, the horizontal angle of view 921, and the actual horizontal FoV 922 of the IR camera 402.

The vertical angle of view 821 may be determined in essence by the projected nominal height of the vehicle underbody 426 above ground 802 and may include a margin for alignment tolerance $\pm x_{off}$ in x-direction and height tolerance $\pm z_{off}$ in z-direction, while the horizontal angle 921 may result from the projected length of the base pad 804 plus margin for accommodating alignment tolerance $\pm x_{off}$ in x-direction, $\pm y_{off}$ in y-direction, and $\pm \varphi_{off}$ in rotation angle as illustrated by FIG. 9. An example base pad length may be 700 mm. Example alignment tolerances of a wireless power transfer system 200 may be $\pm x_{off}$=75 mm, $\pm y_{off}$=100 mm, $\pm z_{off}$=20 mm, $\pm \varphi_{off}$=50°.

In some implementations, the vertical FoV 822 and the horizontal FoV 922 of the IR camera 402 are designed or customized to match a specified vertical view angle 821 and a horizontal view angle 921, respectively. A customized FoV may provide more flexibility in the placement and installation of the IR camera 402 and may also result in a minimum number of IR sensors (pixels) for a given camera resolution and possibly lower cost. In other implementations, the camera's vertical FoV 822 and horizontal FoV 922 may be given by a commercial-of-the-shelf product. In this case, the IR camera 402 may be mounted at a distance D where both the vertical angle 821 and the horizontal angle 921 are covered by the camera's FoV and where the camera's sensor array 408 is efficiently exploited (e.g., the least number of wasted pixels). In some implementations using a medium angle IR camera 402, e.g., with a horizontal FoV of 60° installed on or near the vehicle's 112 longer axis (the longitudinal axis), the distance D may be in the range from 130 to 170 cm.

Figure 10:
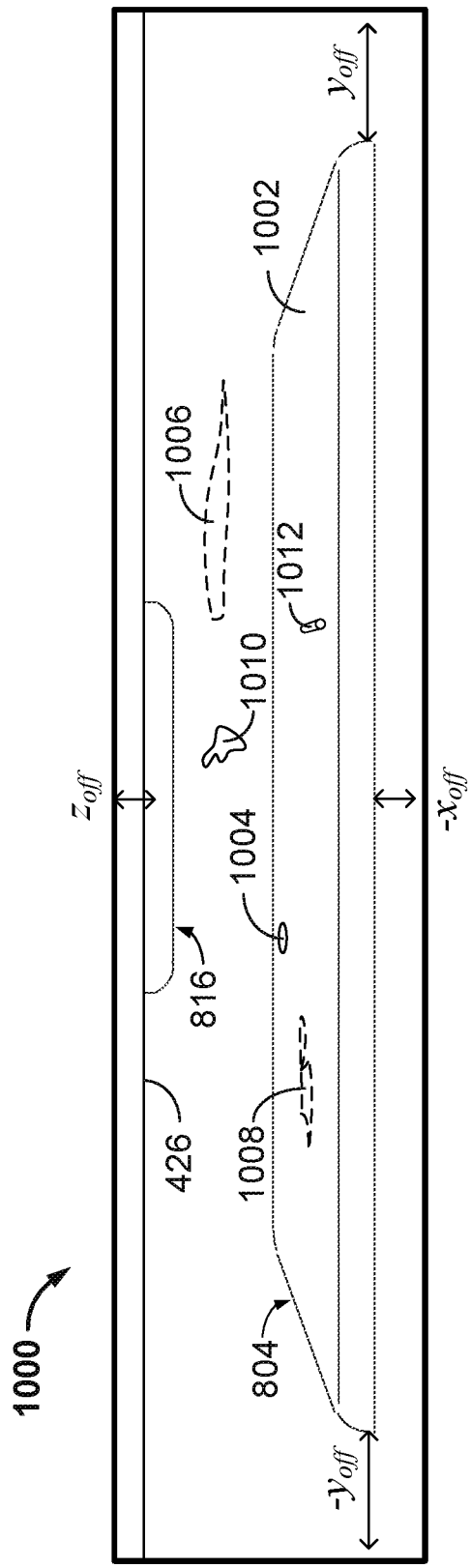
FIG. 10 is a diagram illustrating an image of a scene as it may be viewed by an electric vehicle underbody mounted infrared camera.

FIG. 10 illustrates an image 1000 of a scene as it may be viewed by an IR camera 402 positioned at a distance D, in accordance with an exemplary implementation of an FOD system. The image 1000 of the scene comprises vehicle pad 816 and base pad 804 as well as objects 1004, 1006, 1008, 1010, and 1012. In some implementations, the vertical and horizontal dimension of the image 1000 of the scene corresponds to the vertical view angle 821 and horizontal view angle 921, respectively, of the predetermined space. In other implementations, it corresponds to the vertical FoV 822 and horizontal FoV 922, respectively, of the IR camera 402. The vertical view angle 821 and the horizontal view angle 921 of the predetermined space (dimensions of image 1000) may include a margin in each dimension to accommodate alignment tolerance $x_{off}$, $y_{off}$, and $z_{off}$ as previously described and illustrated in connection with FIG. 10.

The scene as seen by the IR camera 402 may be distorted in perspective as illustrated in FIG. 10, depending on the height H of the IR camera 402 above ground. This perspective distortion may be unfavorable for detecting some categories of foreign objects, e.g., foreign objects having at least one dimension much smaller than another dimension such as coins, nails, pins, wire pieces, screws, etc. and which may be resting on the surface 1002 of the base pad 804 typically with their at least one smaller dimension substantially perpendicular to the surface 1002 of base pad 804. The effect of a perspective distortion is illustrated in FIG. 10 by example of a round shaped object 1004 (e.g. a coin) that may appear with strong ellipticity and thus with a reduced solid angle. Moreover, the solid angle of some objects as seen by the IR camera may depend on the object's orientation relative the IR camera. This may be particularly true for objects having one dimension much larger than the other two dimensions such as nails, pins, wire pieces, screws, etc. as illustrated by object 1012 in FIG. 10.

Perspective distortion and orientation effects may be inherent to any optical system regardless of its FoV (narrow angle, wide angle, fish eye).

In real scenarios, foreign objects having the potential to heat up to critical temperatures may also be found at locations above the surface 1002 of the base pad 804, e.g., somewhere in the space between base pad 804 and vehicle pad 816. This is illustrated by object 1010 in FIG. 10.

As shown in the scene of FIG. 10, the image 1000 may also include objects in the background outside of the predetermined space to be monitored. For example, object 1006 (dashed contour line) may represent a hot exhaust pipe from a vehicle parked adjacent, a road puddle reflecting IR radiation, e.g., from the sun, pedestrians (e.g., legs at human body temperature) passing by, etc. Such false objects may also appear to be inside the predetermined space, e.g., through reflection on the base pad's 804 surface as illustrated in FIG. 10 by object 1008 (dashed contour line).

In some implementations of a FOD system based on at least one IR sensor (e.g. IR camera 402), the at least one IR sensor is calibrated in an absolute sense in a manner such that the output level (e.g., a voltage) of the sensor is indicative for the temperature of a black body radiator. This absolute calibration may be performed using one of a method previously described. In certain aspects, an object is detected, if the output of the at least one IR sensor exceeds a threshold that corresponds to a critical temperature e.g., 80° C. (353 K). This detector is referred to as an absolute detector.

Figure 11:
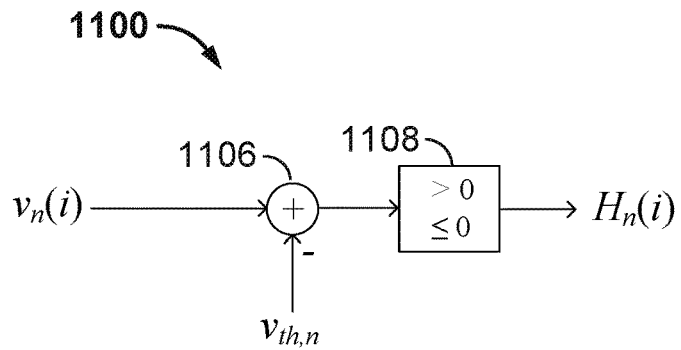
FIG. 11 is a functional block diagram of an absolute threshold detector, in accordance with an exemplary implementation.

An exemplary discrete-time, implementation of an absolute threshold detector 1100 on a per IR sensor basis is illustrated by the functional block diagram of FIG. 11. It may apply to a FOD system using one or more IR sensors (e.g., IR camera 402). In implementations using a plurality of IR sensors, the FOD system may employ a dedicated absolute threshold detector 1100 for each of the plurality of IR sensors. FIG. 11 shows the absolute threshold detector 1100 comprised of subtractor 1106 operationally connected to the output of the n-th IR sensor (not shown) of a plurality N of IR sensors (e.g. IR camera 402), and a decision function 1108. The subtractor 1106 subtracts the threshold $v_{th,n}$ from detector input $v_n(i)$ as received at the i-th time step from the n-th IR sensor. In some implementations based on a plurality of calibrated IR sensors, the threshold $v_{th,n}$ may be common for the plurality of IR detectors, meaning that $v_{th,n}=v_{th}$. In some other implementations, threshold values $v_{th,n}$ may be specific to an IR sensor. The difference $v_n(i)-v_{th,n}$ is input to the decision function 1108 that produces at every time step i a logical output $H_n(i)$ indicative for the detection hypothesis. In some implementations, the decision function 1108 outputs $H_n(i)=1$, if $v_n(i)-v_{th,n}>0$ for at least one time step i, else it outputs $H_n(i)=0$. In some other implementations, the decision function 1108 outputs $H_n(i)=1$, if $v_n(i)-v_{th,n}>0$ holds for a defined number of consecutive time steps i. The FOD system may determine presence of a foreign object and trigger an alarm, if at least one of the plurality N of absolute detector 1100 outputs $H_n(i)$, $n \in [0, 1, \ldots N-1]$ equals one.

Absolute detection as described above may have the following issues: an object in the background, e.g., object 1006 with an apparent temperature>80° C. may trigger a false detection, while a true hot object, e.g., object 1004 placed on the base pad 804 may remain undetected because its emissivity $\varepsilon_{obj} \ll 1$ and/or its size (solid angle) is lower than the IR sensor's (e.g. IR camera's 402) resolution as previously described.

In some further implementations of an FOD system, a time-differential (TD) detection scheme is employed. The TD approach relies on detecting a foreign object based on a temporal change of its apparent temperature and may need neither absolute calibration nor relative calibration as previously described. A temporal change of the apparent temperature is may occur when a metallic object is exposed to the inductive power transfer magnetic field and also when the inductive power transfer magnetic field is turned off, regardless of its emissivity and size. A temporal change of the apparent temperature may also occur when a foreign object is introduced into the predetermined space at any time after the inductive power transfer magnetic field has been activated. Therefore, a TD-based approach may be advantageous over absolute detection. On the other hand, objects not exceeding a critical temperature thus not imposing a particular hazard may trigger an alarm, which may be seen disadvantageous.

Figure 12:
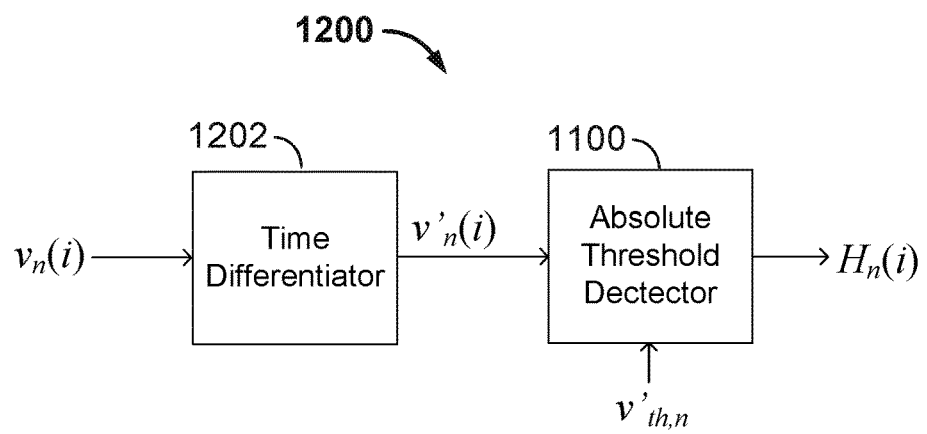
FIG. 12 is a functional block diagram of a time-differential detector, in accordance with an exemplary implementation.

The functional block diagram of an exemplary discrete-time, digital implementation of a TD detector on a per IR sensor basis is shown in FIG. 12. It may apply to a FOD system using one or more IR sensors (e.g., IR camera 402). In implementations using a plurality of IR sensors, the FOD system may employ a dedicated TD detector 1200 for each of the plurality of IR sensors. FIG. 12 shows the input of TD detector 1200 operationally connected to the n-th IR sensor (not shown) of a plurality N of IR sensors (e.g. IR camera 402) delivering outputs $v_n(i)$. The TD detector 1200 may be comprised of a cascade of time differentiator 1202 delivering outputs $v'_n(i)$ and a threshold detector 1100 with a threshold set to producing a logical output $H''(i)$ at each time step i as previously described in connection with FIG. 11.

Figure 13:
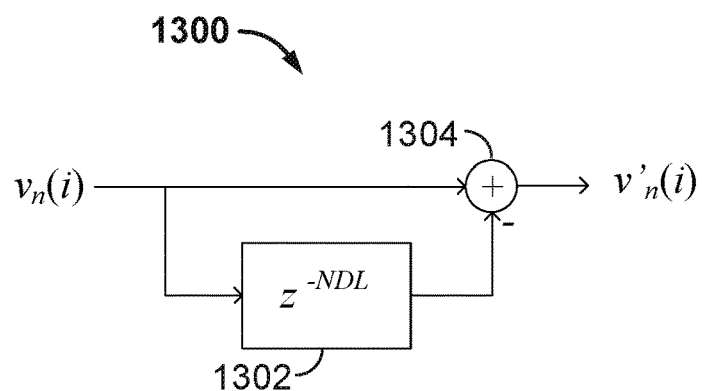
FIG. 13 is a functional block diagram of a delay line filter, in accordance with an exemplary implementation.

In some aspects, the time differentiator 1202 outputs non-zero values $v'_n(i)$, if there are temporal changes in inputs $v_n(i)$, else it outputs values that are substantially zero. In some implementations, the time differentiator 1202 is a digital delay line filter. A functional block diagram of a digital delay line filter 1300 is shown in FIG. 13. The digital delay line filter 1300 may include of a digital delay line (shift register) with a plurality of NDL delay units 1302 and subtractor 1304 that subtracts a NDL time steps delayed input $v_n(i-NDL)$ from input $v_n(i)$ at each time step i. Shifting a sequence in time by NDL steps corresponds to a multiplication by $z^{-NDL}$ in the z-transform domain as indicated in FIG. 13.

In some implementations referring to as the classical time differentiator, the digital delay line 1302 is comprised of only one delay unit (NDL=1). Using a classical time differentiator 1202, the output $v'_n(i)$ may be positive when the object is heating up and negative when the object is cooling down and its level may be indicative for the rate of change of the object's apparent temperature.

Some implementations may use longer delay lines comprised of, e.g., NDL=32 delay units or even more than that. In presence of IR sensor noise, a time differentiator 1202 with a longer delay line may provide higher detection sensitivity but also more retardation in its output $v'_n(i)$. For a constantly rising object temperature, the mean of outputs $v'_n(i)$ is proportional to the delay line length NDL. On the other hand, a too long delay line may introduce unacceptable detection latency and/or may be counterproductive when the rate of temperature change is varying faster than acceptable for a given NDL. Therefore, in some implementations, there may be an efficient NDL as will be discussed further below. A delay line filter 1300 with NDL>1 may also be referred to as a "comb" filter because of its periodic frequency response in the z-transform domain. The delay line filter 1300 exhibits a "zero" at zero frequency, meaning that it cancels out any DC component in sequences $v_n(i)$, thus the time differentiator 1202 output $v'_n$, may be invariant to a DC component in the inputs $v_n(i)$.

In some further implementations, the time differentiator 1200 is a digital high pass filter with a suitable cut-off (−3 dB) frequency. This filter attenuates frequency components in the input sequence $v_n(i)$, which are lower than the cut-off frequency and let pass components higher than the cut-off frequency. The generic implementation of a high pass filter may be composed of finite impulse response (FIR) and infinite impulse response (IIR) filter structures as known in the art.

In yet another implementation, the at least one IR sensor functions based on one of a third, fourth, and sixth category thermal effect as previously defined so that the time differentiator function is inherent to the IR sensor. In some implementations, the at least IR sensor (e.g. IR camera 402) is based on a pyroelectric effect.

Figure 14:
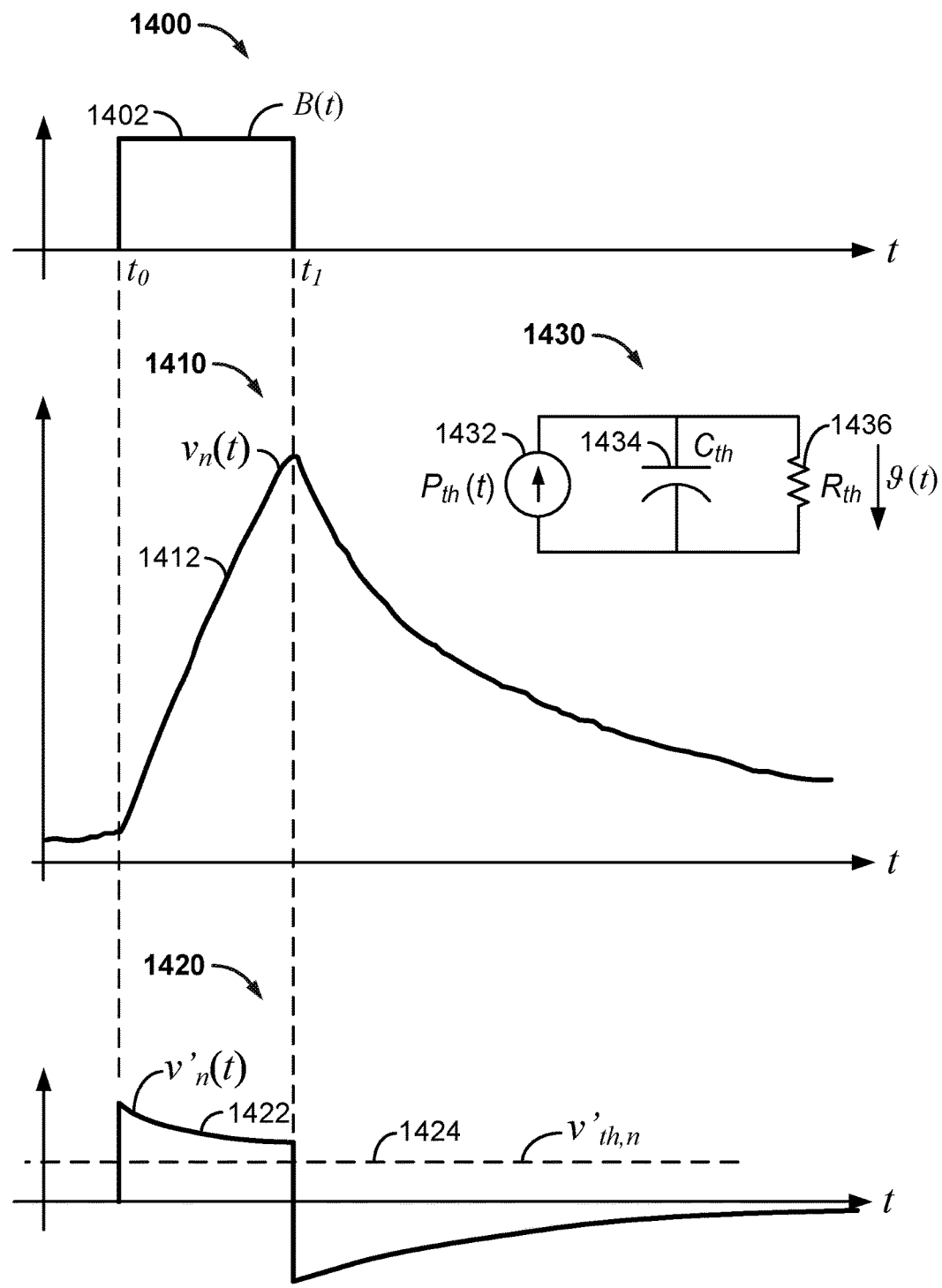
FIG. 14 illustrates time diagrams and an equivalent thermal circuit model illustrating the effect of a magnetic field exposure of a foreign object on the signal output of an infrared sensor and on the signal output of a time differentiator, in accordance with an exemplary implementation.

The TD approach using a time differentiator 1202 is illustrated in FIG. 14 by means of three time diagrams displaying exemplary signals using continuous-time representation and an equivalent circuit model 1430. Diagram 1400 displays a signal B(t) 1402 indicative for an exemplary inductive power transfer magnetic field exposure cycle lasting over the time interval $[t_0, t_1]$, while diagrams 1410 displays a corresponding output $v_n(t)$ 1412 of the n-th IR sensor, e.g., of IR camera 402. Further, diagram 1420 displays the corresponding output $v'_n(t)$ 1420 of the n-th time differentiator 1202 as well as an exemplary detection threshold $v'_{th,n}$ (horizontal dashed line). Correspondences in the various signals 1402, 1412, and 1422 are indicated by the vertical dashed lines.

The IR sensor output signal $v_n(t)$ 1412 may be indicative for an object's (e.g. object 1004) temperature response that may start rising when the inductive power transfer magnetic field exposure is switched on at time $t_0$ and decreasing when the field exposure is ceased at time $t_1$. The signal $v_n(t)$ 1412 resembles the response of an electrical RC-circuit and suggests that the thermal dynamics of a foreign object may be modelled in analogy by the equivalent circuit shown in the diagram 1430 of FIG. 14. In this model "current" refers to thermal power and "voltage" to temperature. The "current" source 1432 represents the Joule heating power $P_{th}(t)$ that is produced in the object, e.g., by the eddy currents. The "capacitance" 1434 represents the object's thermal capacity $C_{th}$, and the "resistance" 1436 the thermal resistance $R_{th}$ of the heat dissipation to the environment, which may include heat conduction, heat convection, and heat radiation. In analogy to electrical RC-circuits, a thermal time constant τ may be attributed to an object. The time constant τ may be defined as the required time to reach (1−1/e)·100%=63.2% of a final (saturation) temperature when heating the object with a constant power $P_{th}$. The time constant r of different objects may vary in a wide range from seconds to several minutes, depending on an object's size, shape, and structure. A piece of metallized paper may have a time constant in the seconds range, while a coin may require two minutes to reach 63.2% of its final (saturation) temperature.

As previously discussed, a positive time differentiator output $v'_n(t)$ may be indicative for a rising temperature. A rising temperature upon turning the inductive power transfer magnetic field on may indicate presence of a true foreign object (e.g. object 1004). However, a sudden temperature rise at a later time may indicate a true foreign object (e.g. object 1004) that has entered the predetermined space at a later time but may also indicate a false object, e.g., object 1006 located somewhere outside of the predetermined space and that may be heated by a different power source. Therefore, in some cases TD detection alone may not unambiguously detect foreign objects.

Therefore, in some implementations, the FOD system determines presence of an object, e.g., object 1004 based on a correlation between a sequence of outputs $v'_n(i)$ of the time differentiator 1202 indicative for a rate of change of an object's temperature and a sequence of samples B(i) indicative for the level of an inductive power transfer magnetic field exposure. For determining a correlation, the wireless power transfer system 300 may activate and deactivate the inductive power transfer magnetic field exposure for purposes of FOD at least once at time $t_0$ and $t_1$, respectively, as illustrated in the diagram 1400 of FIG. 14 (e.g., to generate an alternating magnetic field with a varying level, the level going between activated (e.g., any level or percent of power output greater than 0) and deactivated (e.g., 0% power output)). A time differentiator 1202 output $v'_n(i)$ that is essentially positive during the active cycle and negative after the field exposure is ceased may indicate presence of a true foreign object (e.g., object 1004) (e.g., the sign component of the output of the time differentiator relates to variations in the level of the alternating magnetic field). The temperature change of a false object (e.g., object 1006) heated by a different source may not correlate with the exposure cycles as applied to the base power transfer element 304.

Therefore, determining a correlation may be useful to discriminate between false and true foreign objects.

In some implementations, the wireless charging system 300 applies an inductive power transfer magnetic field for determining a correlation prior to starting regular charging of an electric vehicle 112. In some implementations, a correlation may also be determined at some time after regular charging is started, e.g., to verify (substantiate) a detection hypothesis $H_n(i)=1$ that may have been determined by a different detection method, e.g., TD detection as previously described. If no foreign object is determined by correlation, the wireless charging system 300 may decide to start or resume regular charging, respectively.

In other implementations, determining a correlation may be a continuously running process during regular charging. For purposes of determining a correlation during regular charging, the wireless power transfer system 300 may change the inductive power transfer magnetic field exposure level, e.g., from a higher level to a lower level and back to the higher level, or vice versa, at least once. In some implementations, the lower level may be 80%, 50%, 20% of the higher level, or it may be substantially zero. In certain aspect, a change in exposure level may not compromise the performance of the wireless charging system 300 and the average power transferred towards the electric vehicle 112. In some implementations, a temporary change of the field exposure level at the location of a true foreign object (e.g., object 1004) is accomplished by temporarily reducing the (primary) current in the base power transfer element 304 and instead increasing the (secondary) current in the electric vehicle power transfer element 316 or vice versa, maintaining the product of primary and secondary current substantially constant. It should be appreciated that the power wirelessly transferred towards the electric vehicle 112 may be related to the product of the primary and secondary current (e.g., based on an inductive transformer equation).

In some implementations, the base power transfer element 304 is excited to generate at least one inductive power transfer magnetic field exposure cycle for the purpose of determining a correlation but there may be no active power transfer towards the electric vehicle 112. In other implementations, power may be transferred to the electric vehicle 112 during the at least one exposure cycle. In further implementations of a wireless charging system 300 supporting bi-directional power transfer as previously described, the electric vehicle power transfer element 316 may be excited for determining a correlation.

In some implementations, the excitation of a power transfer element (e.g., base power transfer element 304) for determining a correlation may be at or near the operating frequency of the wireless power transfer system 300. In some other implementations, the power transfer element may be excited at another frequency suitable for inductive heating of foreign objects. In some implementations, a correlation is determined for different frequencies, which may have different heating effects in certain objects.

Figure 15:
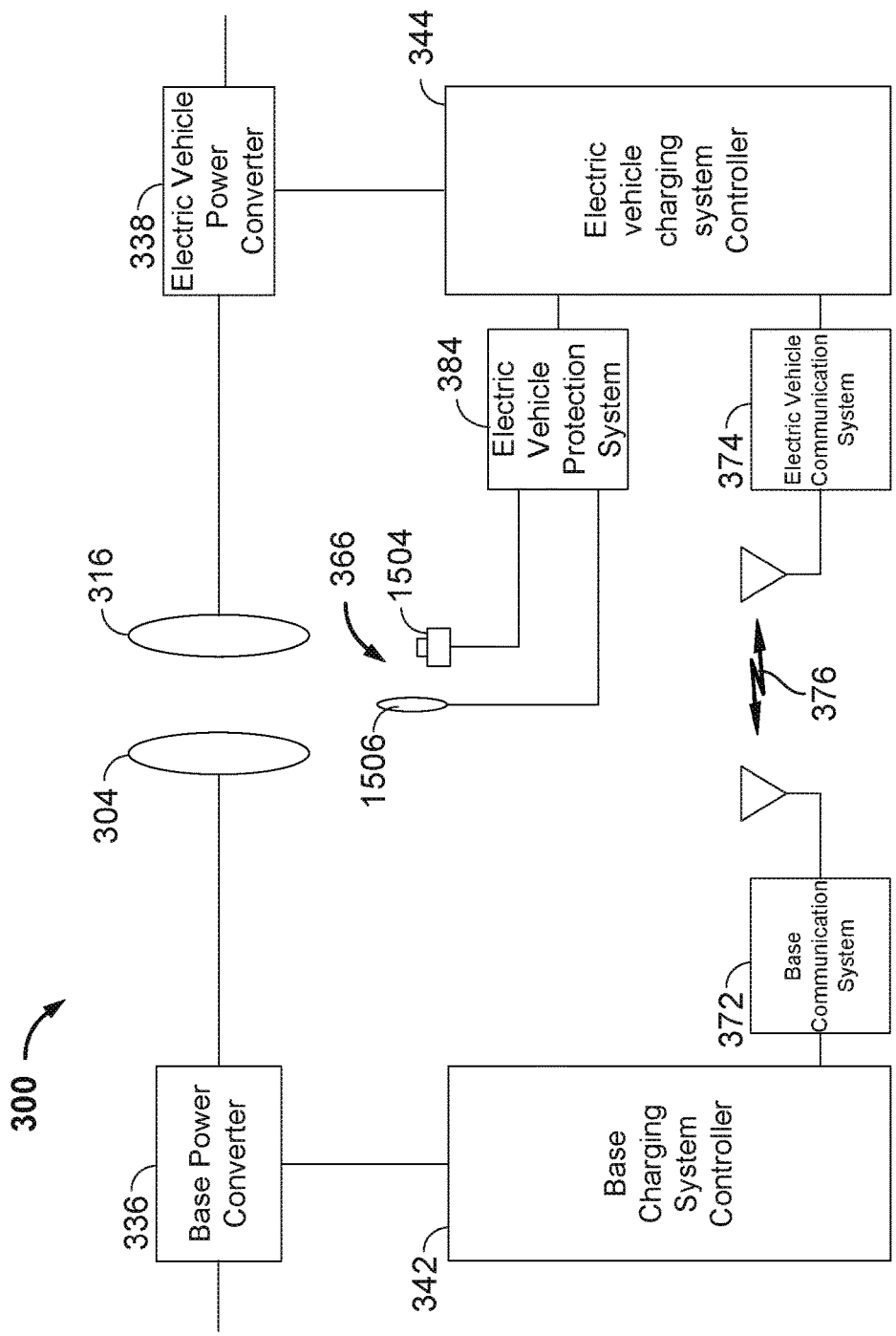
FIG. 15 is a functional block diagram of a portion of a wireless charging system including some exemplary system components, in accordance with an exemplary implementation.

FIG. 15 is a functional block diagram of a portion of a wireless charging system 300 including some exemplary system components. These components may be relevant for an IR-based FOD ancillary system that interacts with components of the wireless charging system 300 (FIG. 3), e.g., via communications link 376. The block diagram of FIG. 15 also shows an IR sensor 1504 (e.g., IR camera 402) and a magnetic field sensor 1506 as part of the electric vehicle protection sensors 385.

In some implementations, the FOD system as part of the electric vehicle protection system 384 may command the base wireless charging system 302 via communications link 376 to generate an intermittent inductive power transfer magnetic field exposure, e.g., as illustrated in FIG. 14, with a suitable level for determining a correlation. The base wireless charging system 302 including the base power converter 336 may be configured to intermittently excite the base power transfer element 304 with the required current at a suitable frequency. In some implementations, the FOD system may also receive feedback signals from the base wireless charging system 302 transmitted via communications link 376. These feedback signals may be indicative for the effective times when the inductive power transfer magnetic field is switched on and off. These signals may be used for determining a correlation. In some other implementations, the FOD system uses a dedicated magnetic field sensor, e.g., magnetic field sensor 1506, for determining these time instances. This field sensor 1506 may be mounted at a suitable place at the underbody 426 of the electric vehicle 112. In some implementations, the magnetic field sensor 1506 is an integrated part of the IR sensor assembly, e.g., IR camera assembly 400.

Figure 16:
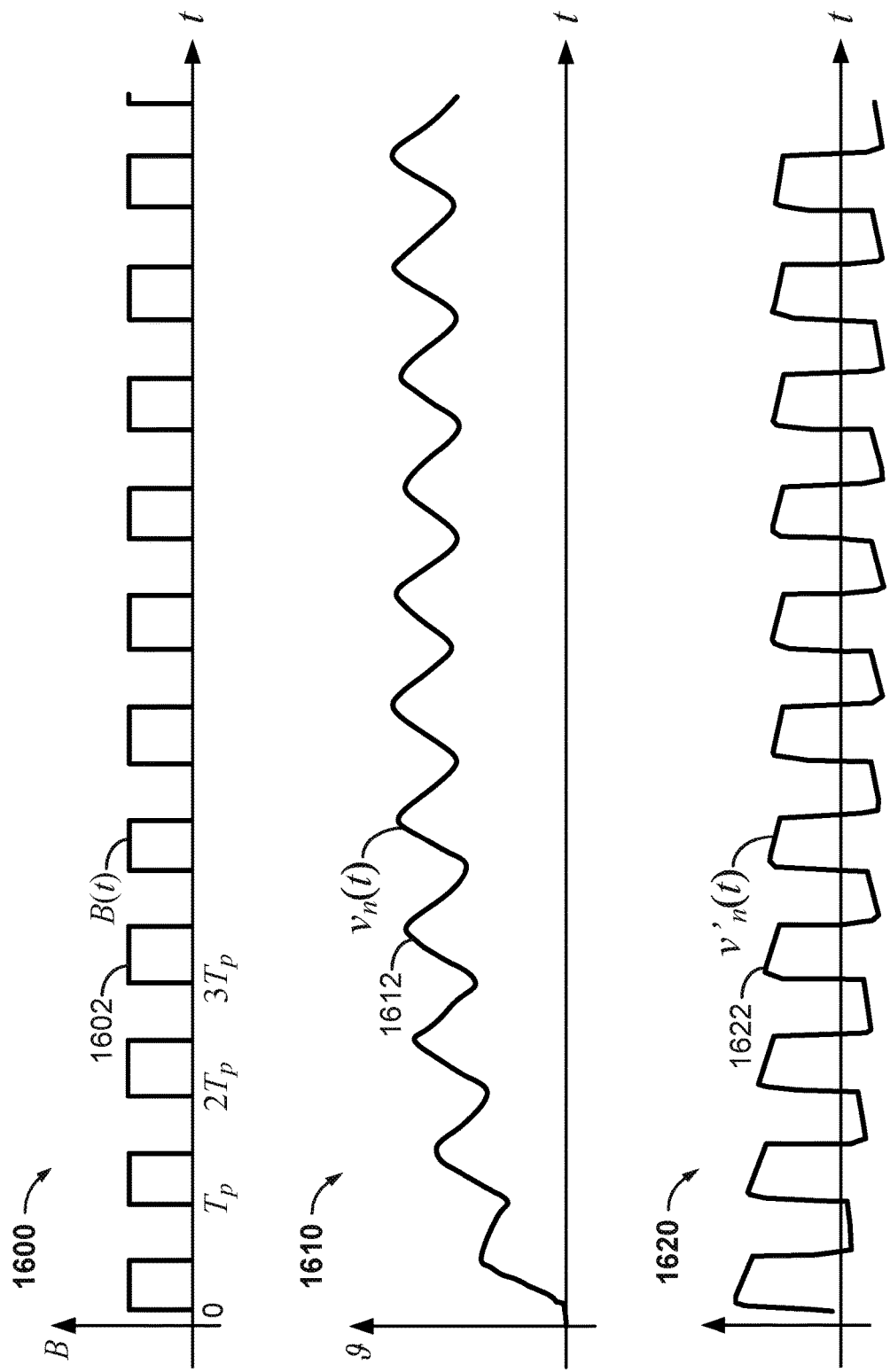
FIG. 16 shows time diagrams illustrating the effect of a periodic intermittent magnetic field exposure of a foreign object on the signal output of an infrared sensor and on the signal output of a time differentiator, in accordance with an exemplary implementation.

FIG. 16 illustrates the effect of an intermittent inductive power transfer magnetic field exposure on various signals using continuous-time representation. In some aspects, an intermittent inductive power transfer magnetic field is generated by sequentially switching on and off a signal that may be itself an alternating signal, resulting in a sequence of bursts of an AC signal. Diagram 1600 displays an exemplary signal B(t) 1602 that may be indicative for the intermittent field exposure starting at time t=0 with ON and OFF cycles (e.g., activated and deactivated cycles) of equal duration and period $T_p$. Diagram 1610 displays the corresponding output $v_n(t)$ 1612 of the n-th IR sensor, e.g., of IR camera 402. The signal $v_n(t)$ 1612 may be indicative for an object's temperature response. It indicates an average temperature increase superimposed by warm-up and cool-down cycles with period $T_p$ in response to the intermittent field exposure as illustrated by signal 1602 in diagram 1600. The average temperature increase may be attributed to the step response of the intermittent field exposure starting at t=0. The signal $v_n(t)$ 1612 appears to converge after about 5 periods $T_p$ into a stationary periodic process indicating that some sort of a thermodynamic equilibrium is reached. Further, diagram 1620 displays the corresponding output $v'_n(t)$ 1622 of a classical time differentiator operationally connected to the n-th IR sensor (not shown) of a plurality N of IR sensors (e.g. IR camera 402). The signal $v_n(t)$ 1622 may be characterized by a reduced DC component and by a waveform that better matches the field exposure signal B(t) 1602 if compared with the signal $n_n(t)$ 1612, showing that $v'_n(t)$ 1622 may better correlate with B(t) 1602 than $v_n(t)$ 1612.

In certain aspects, the FOD system may also determine presence of an object, e.g., object 1004 based on a correlation between discrete-time IR sensor outputs $v_n(i)$ indicative for an object's temperature course and samples B(i) indicative for the time course of an intermittent inductive power transfer magnetic field exposure. Detecting objects based on a correlation between $v_n(i)$ and B(i) may use a period $T_p$ considerably longer than an object's thermal time constant $\tau$ to overcome the integration (low pass filter) effect due to the object's thermal dynamics as previously described. Therefore, implementations using time differentiator 1202 outputs $v'_n(i)$ for determining a correlation may provide improved performance if, e.g., for reasons of practicality, an exposure cycle period $T_p < \tau$ is chosen.

Figure 17:
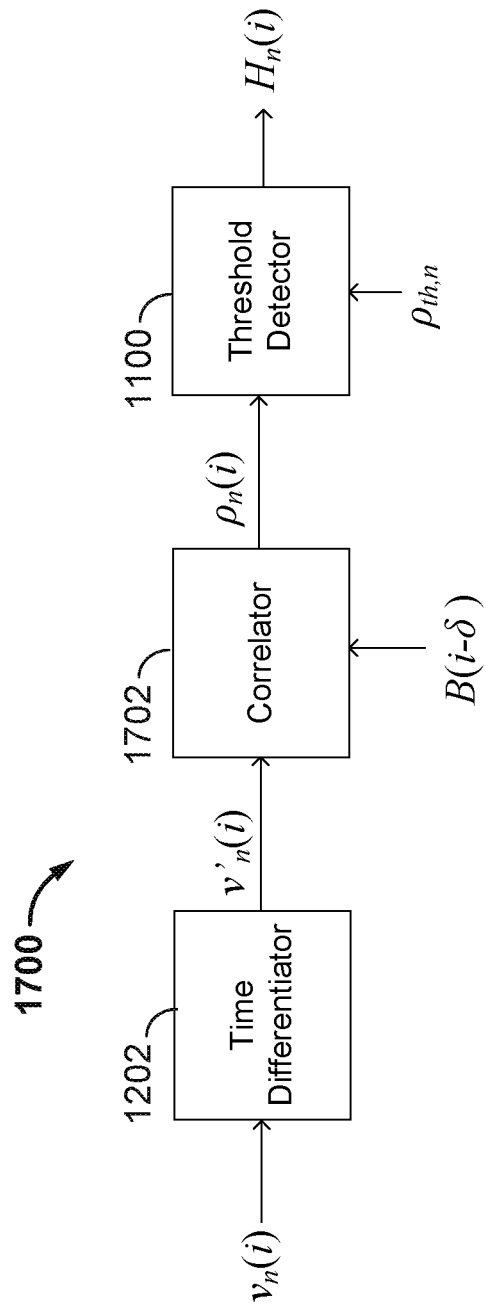
FIG. 17 is a functional block diagram of a time differentiator correlator detector, in accordance with an exemplary implementation.

The functional block diagram of an exemplary discrete-time, digital implementation of a time differentiator correlator detector on a per IR sensor basis is shown by FIG. 17. It may apply to a FOD system using one or more IR sensors, e.g., IR camera 402, in the way as previously discussed, e.g., in connection with FIGS. 11 and 12. FIG. 17 shows the time differentiator correlator detector 1700 comprised of a cascade of time differentiator 1202 operationally connected to the output $v_n(i)$ of the n-th IR sensor (not shown) of a plurality of N IR sensors (e.g., IR camera 402), correlator 1702 correlating a sequence of time differentiator 1202 outputs $v'_n(i)$ with a sequence of samples B(i) indicative for the inductive power transfer magnetic field exposure, and threshold detector 1100 with threshold $\rho_{th,n}$, producing a logical output H″(i) at each time step i as previously described in connection with FIG. 11.

In some implementations in accordance with FIG. 17, the time differentiator 1202 is a digital delay line filter 1300 as illustrated in FIG. 13, configured with a delay line length NDL in a range corresponding to the range in time from $T_p/8$ to $5T_p/8$. In some other implementations, the delay line filter 1300 is configured with a length NDL corresponding to $T_p/4$ or larger or smaller than that by 20%.

In some implementations, the correlator 1702 output $\rho_n(i)$ is determined by successive summation over successively computed products $v'_n(j) \cdot B(j)$ as follows:

$$\rho_n(i) = \sum_{j=1}^{i} v'_n(j) \cdot B(j-\delta), \tag{5}$$

where j stands for a correlator internal counter needed for the summation and δ for a time offset applied to the samples B(j). In implementations using a classical time differentiator 1202 (NDL=1), δ may be zero, while implementations using a time differentiator 1202 with NDL>1, may use a time offset δ>1 to compensate for a delay introduced by the time differentiator 1202.

In some other implementations, the correlator 1702 determines a correlation coefficient $\rho_n(i)$ successively first by computing the successive arithmetic means of $v'_n(j)$ and B(j−δ) as follows $$\overline{v}'_n(i) = \frac{1}{i}\sum_{j=1}^{i} v'_n(j), \tag{6}$$

$$\overline{B}(i-\delta) = \frac{1}{i}\sum_{j=1}^{i} B(j-\delta), \tag{7}$$

and second by subtracting the normalizing successive arithmetic means $\overline{v}'_n$, and $\overline{B}(i-\delta)$ from inputs $v'_n(j)$ and B(j−δ), respectively, and third by normalizing the correlation product on the geometric mean of the successively computed mean squares of the differences $v'_n(j)-\overline{v}'_n(i)$ and B(j−δ)−$\overline{B}(i-\delta)$, respectively. The entire operation of successively computing a correlation coefficient $\rho_n(i)$ may be expressed as $$\rho_n(i) = \frac{\sum_{j=1}^{i} [v'_n(j) - \overline{v}'_n(i)] \cdot [B(j-\delta) - \overline{B}(i-\delta)]}{\sqrt{\sum_{j=1}^{i} [v'_n(j) - \overline{v}'_n(i)]^2 \cdot \sum_{j=1}^{i} [B(j-\delta) - \overline{B}(i-\delta)]^2}}. \quad (8)$$

Figure 18A:
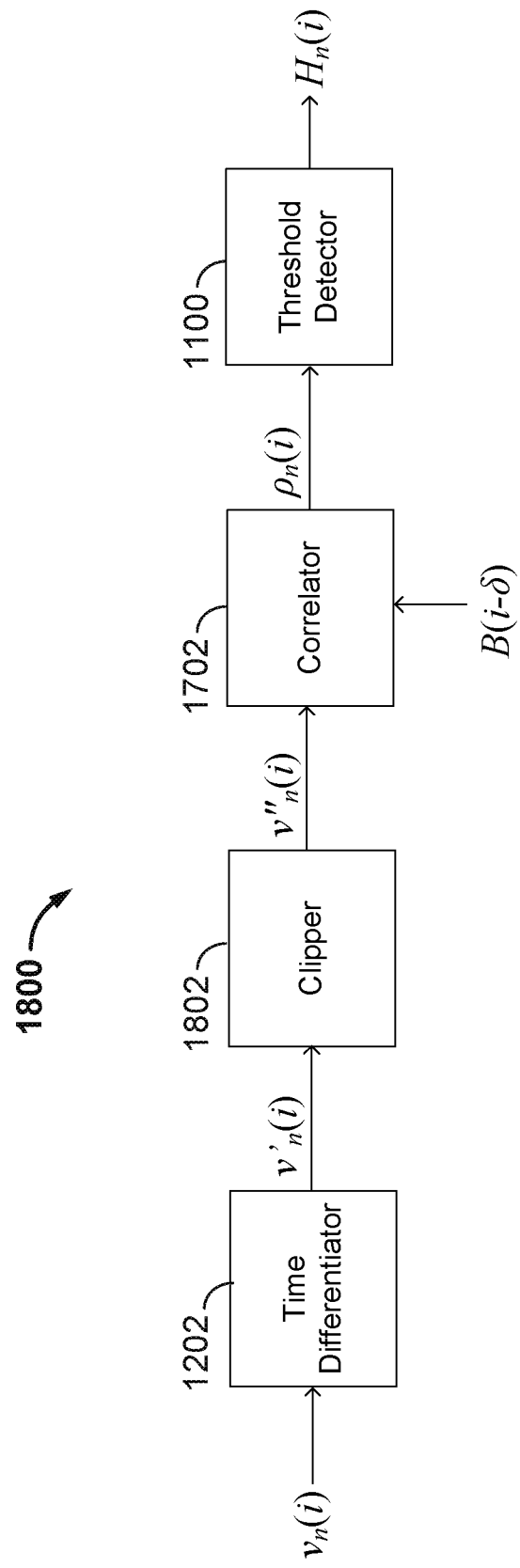
FIG. 18A is a functional block diagram of a time differentiator correlator detector including a non-linearity, in accordance with an exemplary implementation.
Figure 18B:
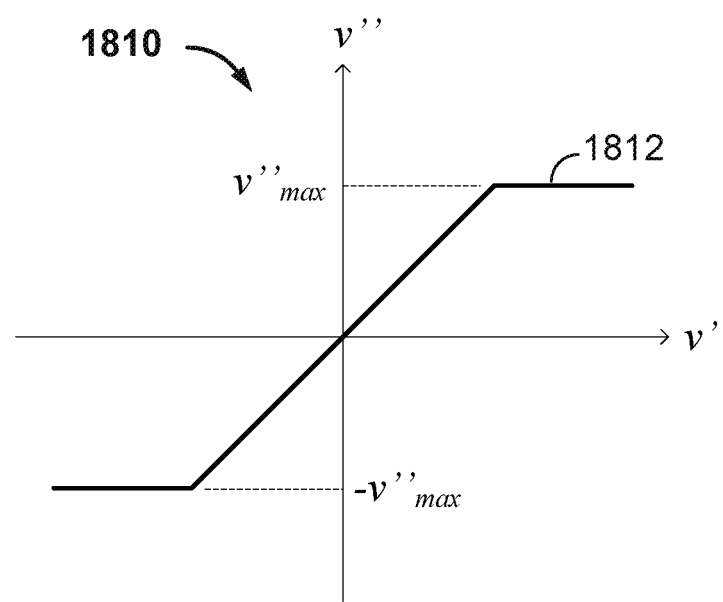
FIG. 18B is a diagram illustrating an input-output characteristic of the non-linearity of the time differentiator correlator detector of FIG. 18A, in accordance with an exemplary implementation.

In a further aspect, the cascade of the time differentiator correlator detector 1700 may be extended by inserting a non-linearity 1802 between time differentiator 1202 and correlator 1702. FIG. 18A shows a functional block diagram of an exemplary discrete-time, digital implementation of a non-linear time differentiator correlator detector 1800. In some implementations, the non-linearity 1802 is a clipper that may be also referred to as a limiter. More specifically, the clipper 1802 may output $v''_n(i)=v'_n(i)$ if the absolute value of an input $|v'_n(i)|$ is smaller than a defined limit (clipping level) $v'_{max}$, else it may output $v''_n(i)=+v'_{max}$ or $-v'_{max}$, if $v'_n(i)$ is positive or negative, respectively. In other words, in some implementations, the clipper 1802 is configured to clip or limit an input value such that any value above an upper threshold is set to the upper threshold value and any value below a lower threshold is set to the lower threshold value thereby limiting the range of values to values between the upper threshold and the lower threshold. Limiting the range of values may reduce the affects that a temporary large value would have on the overall detection system so as reduce the chance of a false or missed detection. An exemplary non-linear input-to-output characteristic 1812 is illustrated by the diagram 1810 of FIG. 18B. In certain scenarios, the non-linearity 1802 may reduce jamming of the correlation process, e.g., by temporary strong IR radiation sources passing by in the background as illustrated by object 1006 in FIG. 10 as previously discussed. A non-linearity 1802 may be particularly useful for detecting true foreign objects with low apparent temperature located somewhere in the space between the base pad 804 and the vehicle pad 816 or vehicle underbody 426 as illustrated by object 1010 in FIG. 10. The apparent temperature of some background IR radiation sources as seen by an IR sensor (e.g., IR camera 402) may exceed that of a foreign object (e.g., an object of low emissivity and small solid angle) by orders of magnitude. The non-linearity 1802 may also be useful for detecting true foreign objects (e.g., objects 1004 and 1012) located on the base pad's 804 surface, e.g., in presence of reflections of IR radiation on the base pad's surface 1002, emanating from objects passing by outside of the predetermined space as illustrated by false object 1008 in FIG. 10.

In certain aspects, the non-linearity (e.g., a clipper) 1802 may have a compromising effect on the correlation process and thus on the detection of a foreign object, e.g., in case of an object producing more pronounced outputs at time differentiator 1202. Therefore, in some implementations, the FOD system includes a plurality (e.g. 2, 3, or more) non-linear correlator detector branches 1902 in parallel as illustrated by the functional block diagram 1900 of FIG. 19. Each branch 1902 may be configured with a different non-linearity 1802 (e.g., with a different clipping level $V'_{max}$). The implementation 1900 shows the time differentiator 1202 in common for the plurality of non-linear correlator detector branches 1902. The FOD system may evaluate the outputs $H_{k,n}(i)$, $k \in [0, 1, \ldots K-1]$ of the plurality of non-linear correlator detector branches 1902 for producing a decision on the presence of a true foreign object. For example, in some aspects, if any output indicates a true foreign object is detected, the decision is made that a true foreign object is detected. Further, in some aspects, if no output indicates a true foreign object is detected, the decision is made that a true foreign object is not detected.

Figure 20:
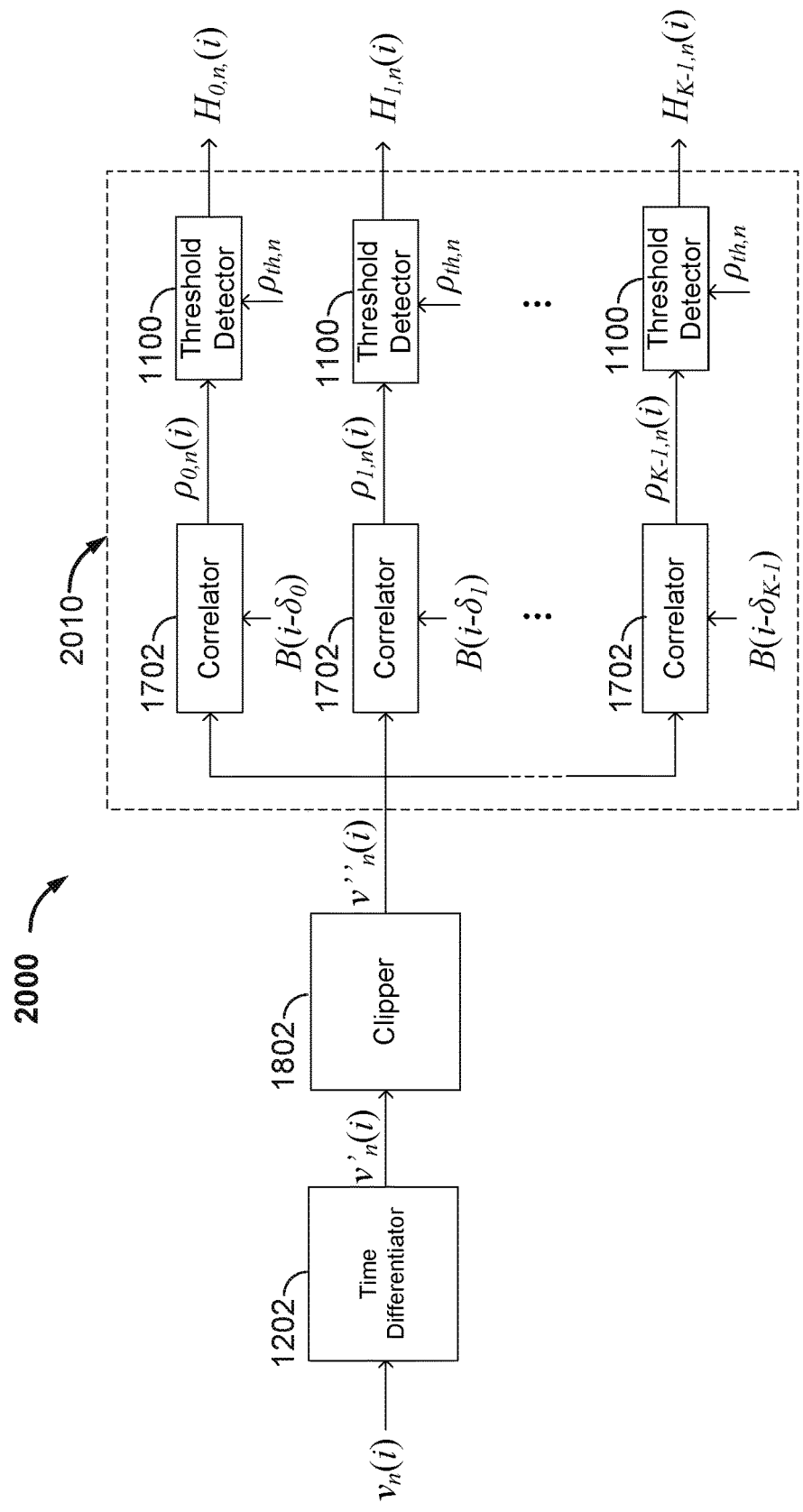
FIG. 20 is a functional block diagram of a time-staggered time differentiator correlator detector including a non-linearity and a plurality of correlators offset in time, in accordance with an exemplary implementation.

In a further aspect, the FOD system may employ a plurality of time-staggered correlator detectors as illustrated by the functional block diagram of FIG. 20. A time-staggered time differentiator correlator detector bank 2010 may include a plurality K of correlators 1702, each configured for a different time shift $\delta_k$, $k \in [0, 1, \ldots K-1]$. The plurality K of correlators 1702 may be operationally connected to a plurality K of threshold detectors 1100 producing a plurality K of logical outputs $H_{k,n}(i)$, $k \in [0, 1, \ldots K-1]$ at each time step i. A FOD system may determine presence of a foreign object and trigger an alarm, if at least one of the plurality K·N of outputs $H_{k,n}(i)$, $k \in [0, 1, \ldots K-1]$, $n \in [0, 1, \ldots N-1]$ equals one. In some implementations, the different time shifts $\delta_k$ are accomplished by delaying the samples B(i) as input to the correlators 1702 and as indicated by $B(i-\delta_k)$, $k \in [0, 1, \ldots K-1]$ in FIG. 20. In some implementations, the plurality of time shifts $\delta_k$ may include a component to compensate for a delay introduced by the time differentiator 1202 as previously discussed in connection with FIGS. 12, 13 and 17. The time-staggered time differentiator correlator detector 2000 may be useful in implementations where the ON and OFF (e.g., activated and deactivated) times of magnetic field exposure are not precisely known to the FOD system. Such implementations may include but not be limited to communications link 376 with latency or latency jitter so that feedback signals received, e.g., from the base wireless charging system 302, involve some uncertainty on the exposure times. In another aspect, a time-staggered time differentiator correlator detector 2000 may be useful for detecting objects with low apparent temperature (e.g., because of low emissivity and/or small solid angle) that are in direct contact with other materials of high emissivity. In such scenarios, heat produced in a metallic foreign object (e.g., object 1004) may propagate to the contacting material resulting in a higher apparent temperature but with some delay with respect to the duty cycles of the magnetic field exposure. Object 1004 (e.g., a coin) as illustrated in FIG. 10 is an example of such an object that may be in direct contact, e.g., with the surface 1002 of base pad 804.

In yet a further aspect, the FOD system may employ a narrowband filter detector for detecting foreign objects, e.g., by means of a periodic intermittent inductive power transfer magnetic field exposure as illustrated by diagram 1600 of FIG. 16. A functional block diagram of an exemplary implementation of a discrete-time, digital narrow-band filter detector 2100 on a per IR sensor basis is shown in FIG. 20. In some implementations, the narrow-band filter detector 2100 is operationally connected to the n-th IR sensor (not shown) of a plurality of N IR sensors (e.g., IR camera 402) and receives samples $v_n(i)$ every time step i. It may be comprised of a cascade of a delay line (comb) filter 2120, a digital resonator down-converter 2140 with complex number (phasor) output $\underline{V}_n(i)$, a magnitude function 2146 with a real output $|\underline{V}_n(i)| \geq 0$, and a threshold detector 1100 with a logical output $H_n(i)$ as described in connection with FIG. 11. The delay line filter 2120 may be of the same structure as the delay line filter 1300 illustrated in FIG. 13, but may be configured for a delay line length NNF that is an integer multiple k of the exposure cycle period $T_p$. Therefore, the delay line filter 2120 should not be confused with the delay line filter 1300 implementation of time differentiator 1202 described in connection with FIGS. 12 and 13. The resonator down-converter 2140 may include an adder 2142 with a complex input and a complex output (phasor), complex multiplier 2146 that rotates the phasor as output by adder 2142 by an angle $2\pi k/NNF$, and a feedback delay unit 2144. The delay line filter 2120 together with the resonator down-converter 2140 performs narrow-band filtering and down-conversion. More specifically, it filters out components with a frequency $1/T_p$ as produced by the periodic intermittent field exposure in sequences of inputs $v_n(i)$ and converts these components into a substantially zero frequency component (DC). The output of the digital resonator down-converter 2140 may be a complex number (phasor) with an arbitrary angle, depending on the lead or lag of the intermittent field exposure with respect to the timing of the digital resonator down-converter 2140. Therefore, in some implementations, the narrow-band filter detector 2100 cascade includes a magnitude function 2146 that extracts the magnitude $|\underline{V}_n(i)|$ from the phasor $\underline{V}_n(i)$. The magnitude $|\underline{V}_n(i)|$ may be substantially invariant to the timing of the intermittent field exposure.

Figure 21:
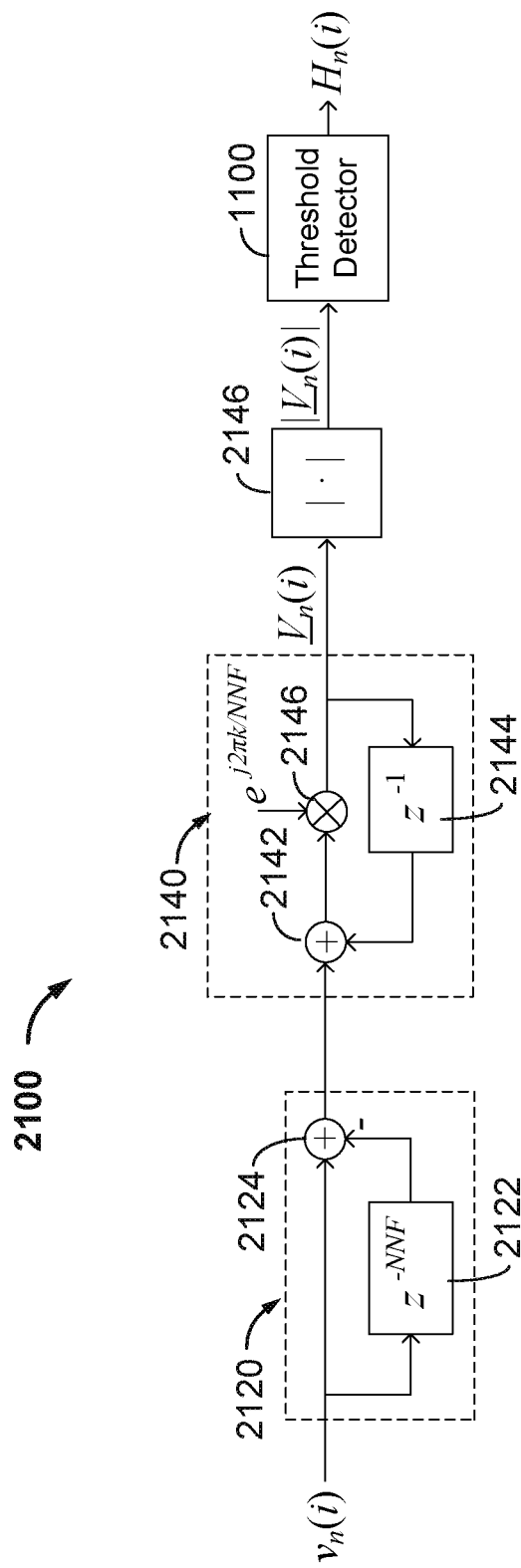
FIG. 21 is a functional block diagram of a narrowband filter detector, in accordance with an exemplary implementation.

In certain aspects, the narrowband filter detector approach as illustrated in FIG. 21 may be substantially agnostic to the timing of the intermittent inductive power transfer magnetic field exposure and may require neither tight control of the base wireless charging system 302 for generating an intermittent field exposure, nor feedback from the base wireless charging system 302 via communications link 376, nor a dedicated magnetic field sensor 1506. However, it may use knowledge of the repetition period $T_p$ (or frequency $1/T_p$) of the field exposure cycles, depending on the bandwidth of the narrowband filter detector, which is determined by the parameter NNF. Therefore in some aspect, the narrowband filter detector approach may also be considered as correlation in the frequency domain.

In some other aspects, the wireless power transfer system 300 may change the inductive power transfer magnetic field exposure level periodically from a higher level to a lower level as previously described in connection with FIG. 17.

In some aspects, the narrowband filter detector approach may also be described as modulating the temperature of a potential foreign object using a periodically varying magnetic field exposure level and detecting the object via its periodically varying IR radiation using a narrow-band filter detector 2100 tuned to the modulation frequency. The narrow-band filter may attenuate temperature signals emanating from other IR sources and reduce a noise component, e.g., as produced in the IR sensor. Modulating the temperature of a potential foreign object may be also considered as marking an object for detection.

In some further aspects, the frequency of the periodically varying magnetic field exposure level (e.g., modulation frequency) may be changed to increase detection sensitivity for a variety of object categories (e.g., with different thermal time constants as previously discussed in the context of FIG. 14). In some implementations, narrowband filtering is performed first with a higher modulation frequency (e.g., period) and afterwards with a lower modulation frequency more suitable for objects with a larger time constant.

In some implementations, the wireless charging system 300 applies a periodic intermittent inductive power transfer magnetic field and a narrowband filter detection approach for marking and detection of true foreign objects (e.g., object 1004) prior to starting regular charging of an electric vehicle 112. In some implementations, narrowband filter detection is used at some time after regular charging is started to verify (substantiate) a detection hypothesis $H_n(i)=1$ that may have been determined by a different detection method, e.g., TD detection as previously described. If no foreign object is determined with narrowband filter detection, the wireless charging system 300 may decide to start or resume regular charging, respectively.

In other implementations, narrowband filter detection may be applied during regular charging without substantially compromising the performance of the wireless charging system 300 as previously discussed in connection with FIG. 17.

In implementations where information on the timing of the magnetic field exposure cycles is available to the FOD system, the magnitude function 2146 may be replaced by a complex multiplier (not shown). In some exemplary implementations, the complex multiplier rotates the phasor V (i) as output by the resonator down-converter 2140 by an angle so that its imaginary part substantially vanishes $(\text{Im}[\underline{V}_n(i)]\cong 0)$. The rotation angle may be indicative for the timing (e.g., phase) of the narrowband filter detector 2100 with respect to the timing (e.g., phase) of the magnetic field exposure duty cycles. This implementation may be considered as an alternative to the time domain correlation approach as illustrated in FIGS. 17 and 18.

Figure 22:
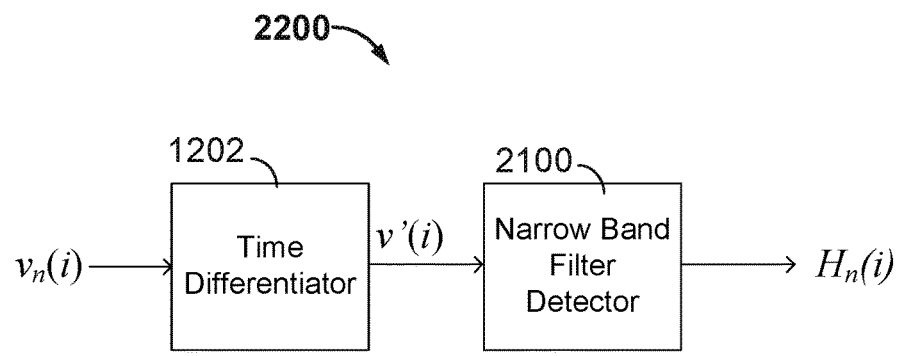
FIG. 22 is a functional block diagram of a time differentiator narrowband filter detector, in accordance with an exemplary implementation.

FIG. 22 is a functional block diagram illustrating a time differentiator 1202 and a narrowband filter detector 2100 in cascade 2200 on a per IR sensor basis, in accordance with a further discrete time, digital implementation as part of a FOD system. The time differentiator 1202 input may be operationally connected to the n-th IR sensor (not shown) of a plurality of e.g., of N IR sensors (e.g. IR camera 402) and receives samples $v_n(i)$ every time step i. The time differentiator's output $v'_n(i)$ may be indicative for a rate of change of an object's (e.g. object 1004) temperature as exemplary illustrated by continuous-time signal 1622 in FIG. 16 for a periodic intermittent field exposure as it may be applied for marking and detecting a true foreign object by means of a narrowband filtering process. In some implementations, the time differentiator 1202 is configured as digital delay line filter 1300 as illustrated in FIG. 13 with a delay line length NDL in a range corresponding to the range in time from $T_p/8$ to $5T_p/8$. In some implementations, the delay line filter 1300 is configured with NDL corresponding to $T_p/2$ or larger or smaller than that by 20%.

Figure 19:
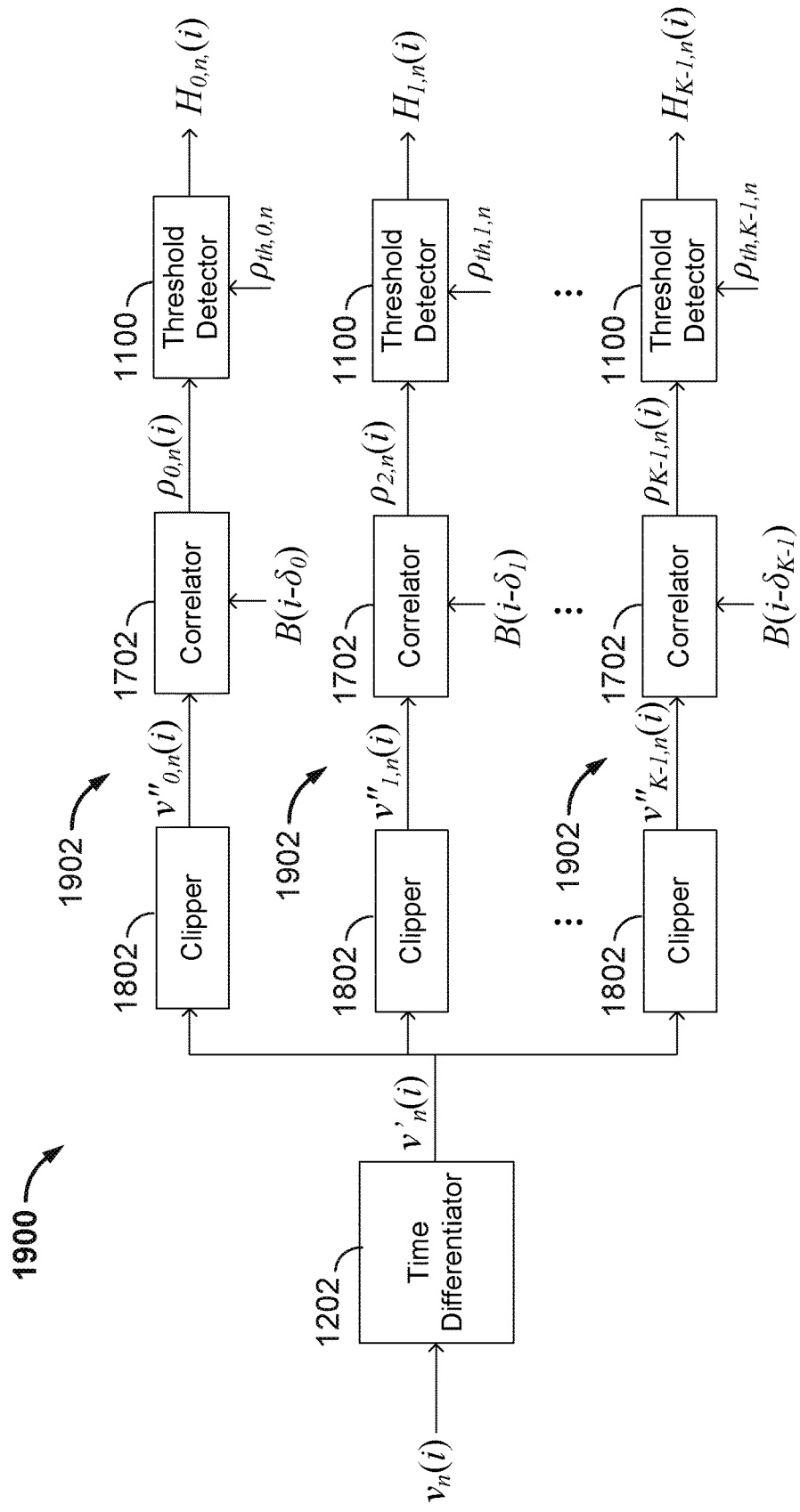
FIG. 19 is a functional block diagram of a time differentiator correlator detector including a plurality of non-linear correlator branches, in accordance with an exemplary implementation.
Figure 23:
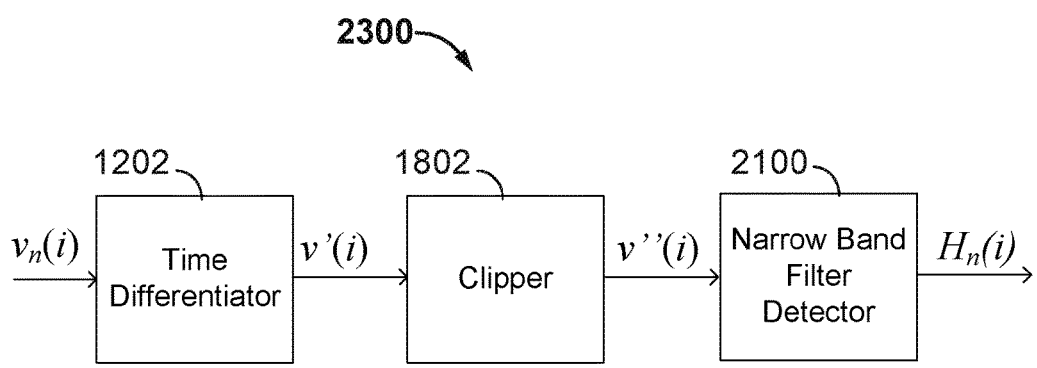
FIG. 23 is a functional block diagram of a time differentiator narrowband filter detector including a non-linearity, in accordance with an exemplary implementation.

In analogy to the implementation 1800 of FIG. 18A, FIG. 23 shows a functional block diagram illustrating a cascade 2300 of time differentiator 1202, non-linearity 1802, and narrowband filter detector 2100, in accordance with some implementations of a FOD system. As for the correlator approach (FIG. 18A), the non-linearity 1802 may be useful to reduce jamming of the narrowband filtering process e.g. in presence of temporary strong IR radiation sources passing by in the background as illustrated by object 1006 in FIG. 10 as previously discussed. In some implementations, the non-linearity 1802 is a clipper as previously discussed. In some other aspects as previously discussed in connection with FIG. 19, the FOD system may include a plurality K (e.g. 2, 3, or more) of non-linear time differentiator narrowband filter detectors branches with clippers 1802 configured to different clipping levels and having the time differentiator 1202 in common as illustrated in FIG. 19. The FOD system may evaluate the outputs $H_{k,n}(i)$, $k \in [0, 1, \ldots K-1]$ of the plurality of non-linear correlator detector branches for producing a decision on the presence of a true foreign object.

Figure 24:
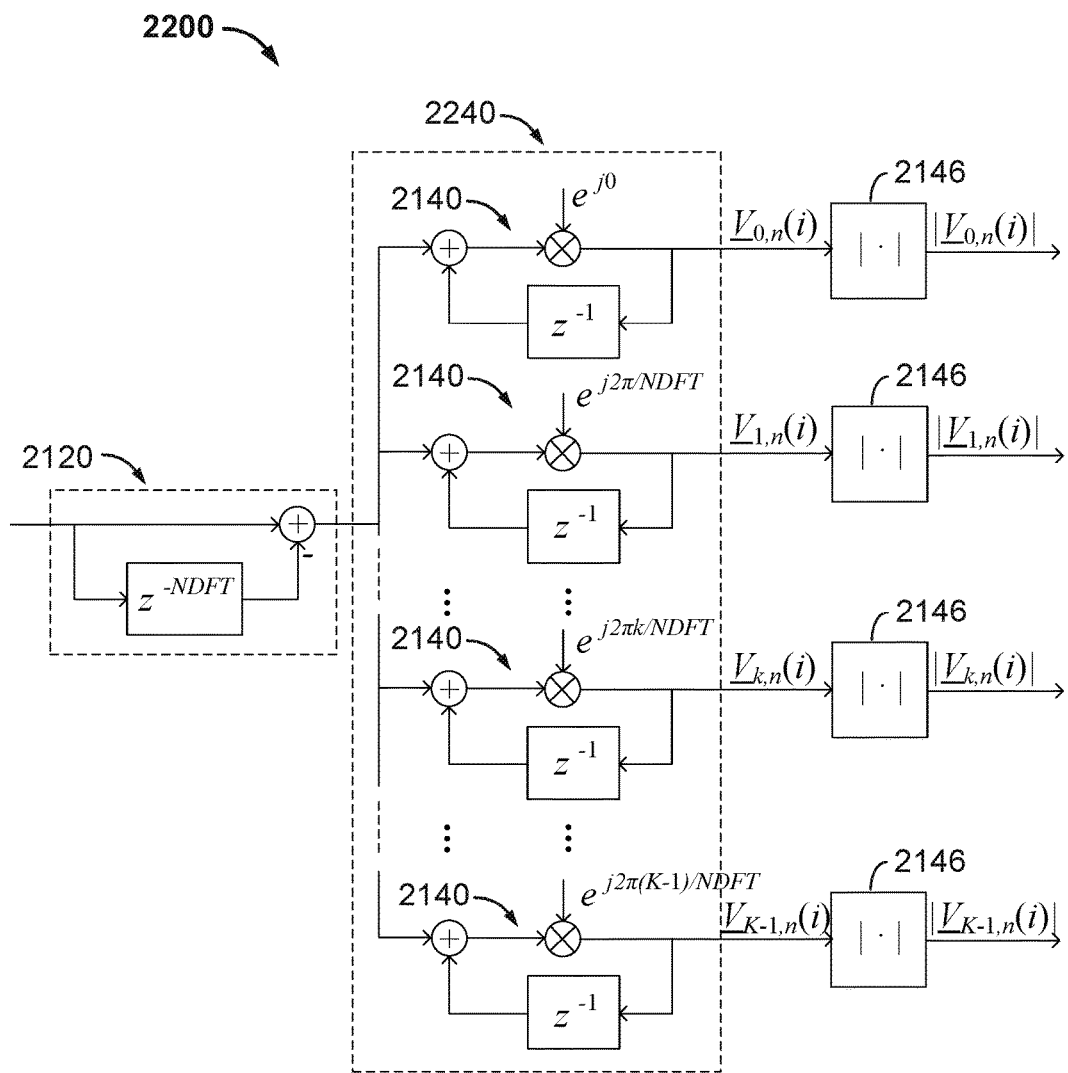
FIG. 24 is a functional block diagram of a portion of a narrowband filter detector based on a sliding DFT, in accordance with an exemplary implementation.

FIG. 24 is a functional block diagram illustrating a portion of a further discrete-time, digital implementation based on the narrowband filter detection approach as previously described in connection with FIG. 21. This portion (block 2200) includes a plurality K of resonator down-converters 2140 forming a resonator down-converter bank 2240 that is operationally connected to the output of a digital delay line ("comb") filter 2120 as previously described in connection with FIG. 21. Here, the length of the delay line 2122 is denoted by NDFT. In some implementations, NDFT corresponds to a time duration that is an integer multiple of the field exposure period $T_p$. Each resonator down-converter 2140 of the bank of resonator down-converters 2240 may be tuned to a different resonant frequency by rotating each adder's 2142 output phasor by a different angle $2\pi k/NDFT$, $k \in [0, 1, \ldots K-1]$ as previously described in connection with FIG. 21. Each of the complex outputs $\underline{V}_{k,n}(i)$, $k \in [0, 1, \ldots K-1]$ of the resonator down-converter bank 2240 is operationally connected to an individual magnitude function 2146 that determines the magnitude $|\underline{V}_{k,n}(i)|$ of $\underline{V}_{k,n}(i)$. The cascade of delay line ("comb") filter 2120 and resonator down-converter bank 2240 as shown in FIG. 24 is also known as an implementation of a sliding discrete Fourier transform (sliding DFT) of length NDFT samples. A sliding DFT may produce for each time step i a plurality K of complex outputs $\underline{V}_{k,n}(i)$ also referred to as complex frequency bins.

In certain aspects, the sliding DFT composed of blocks 2120, 2240 as illustrated in FIG. 24 may be considered as a bank of frequency domain correlators staggered in frequency.

Figure 25:
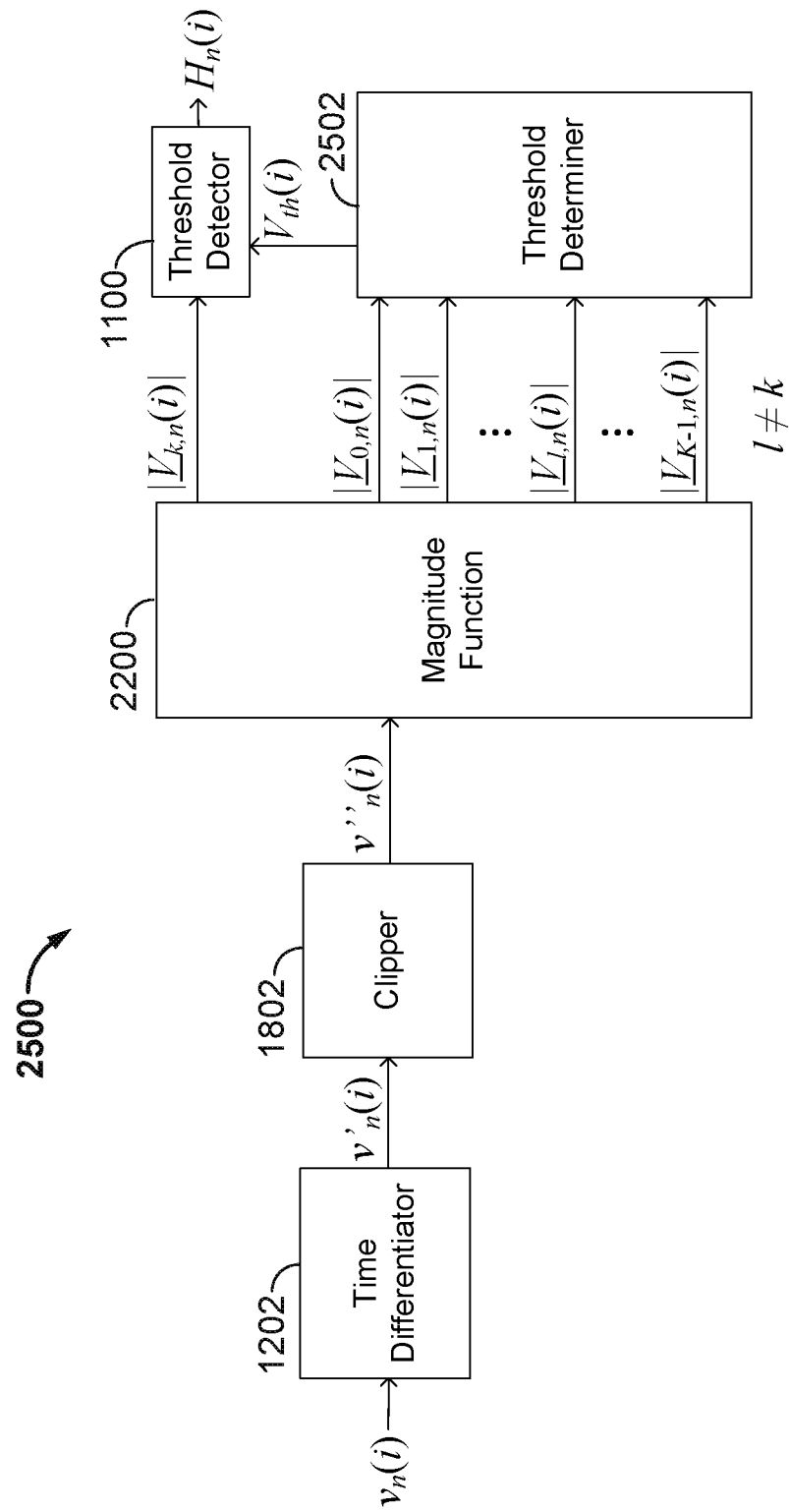
FIG. 25 is a functional block diagram of a sliding DFT detector based on a frequency differential approach, in accordance with an exemplary implementation.

In some aspects, the magnitudes $|\underline{V}_{k,n}(i)|$ of the plurality K of DFT outputs $\underline{V}_{k,n}(i)$ as produced at each time step i by block 220 may be used for determining presence of a true foreign object. FIG. 25 is a functional block diagram illustrating an exemplary implementation including a time differentiator 1202, non-linearity 1802, DFT, magnitude function 2200, and threshold detector 1100 in cascade. In this implementation, the output $|\underline{V}_{k,n}(i)|$ is operationally connected to the threshold detector 1100, while the remaining (K−1) outputs $|\underline{V}_{l,n}(i)|$, $l \in [0, 1, \ldots K-1]$, $l \neq k$ of block 2200 are operationally connected to a threshold determination function 2502 (e.g., implemented as a circuit) configured for automatically determining a detection threshold $V_{th}(i)$ as used by threshold detector 1100. In some implementations, the threshold $V_{th}(i)$ is some function of an average value of outputs $|\underline{V}_{l,n}(i)|$, $l \in [0, 1, \ldots K-1]$, $l \neq k$. In other implementations, it is some function of a median value or another percentile of the (K−1) outputs $|\underline{V}_{l,n}(i)|$, $l \in [0, 1, \ldots K-1]$ (excluding l=k) as discussed in more detail in connection with FIG. 27. The FOD system may determine presence of a foreign object and trigger an alarm, if at least one of the plurality N of the outputs $H_n(i)$, $n \in [0, 1, \ldots N-1]$ equals one.

In some aspects, this automatic detection threshold determination approach may also be considered as a frequency differential detection, discriminating at least one first frequency output against at least one second frequency output, where the at least one first frequency output may correspond to the frequency of the magnetic field exposure modulation.

Figure 26:
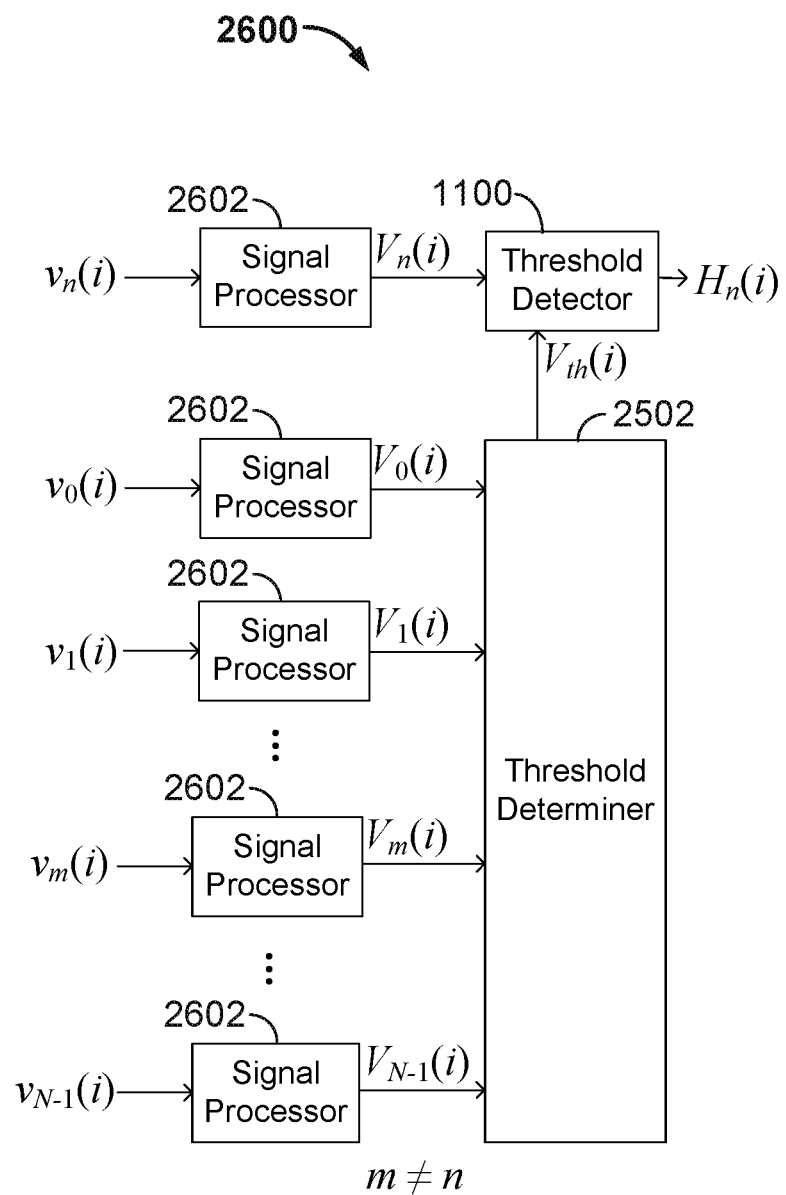
FIG. 26 is a functional block diagram of a plurality of generic IR sensing detectors based on a sensor (e.g. space) differential approach, in accordance with an exemplary implementation.

In some further aspects, presence of a foreign object may be determined based on a plurality N of IR sensor outputs using any of the detection schemes as previously described and illustrated by FIGS. 11 to 25. An exemplary implementation of a plurality of generic multiple IR sensing detector is illustrated by the functional block diagram 2600 of FIG. 26. The block diagram 2600 shows a plurality N of blocks 2602 (e.g., signal processor implemented as circuits) having inputs $v_n(i)$ operationally connected to associated outputs of the plurality of IR sensors (e.g. of IR camera 402). It shows output $v_n(i)$ of the n-the block 2602 operationally connected to the threshold detector 1100 having logical output $H_n(i)$. Further, it shows all (N−1) outputs $V_m(i)$, $m \neq n$ operationally connected to a detection threshold determination function 2502 as previously described in connection with FIG. 25, producing a threshold value $V_{th}(i)$ for each time step i as it may be required by the threshold detector 1100.

In some implementations, block 2602 may be void (input equals output) or it may include any of a time differentiator 1202, non-linearity 1802, correlator 1702, staggered correlator 2000, narrowband filter detector 2100 (excluding threshold detector 1100), sliding DFT 2120 and 2240, etc. as a single function or in combination.

In some implementations, a detection hypothesis $H_n(i)$ is determined for each of the plurality N of IR sensors by alternating the role of the n-th IR sensor in a round robin fashion, as follows: $n = 0, 1, 2, 3, \ldots N-1$. The FOD system may determine presence of a foreign object and trigger an alarm, if at least one of the plurality N of logical outputs $H_n(i)$, $n \in [0, 1, \ldots N-1]$ equals one.

In some aspects, this multiple IR sensor detection approach may also be considered a sensor differential detection, discriminating at least one first output indicative for the output of at least one IR sensor against at least one second concurrent output indicative for at least one second IR sensor, where the at least one first sensor output may correspond to the IR sensor viewing the foreign object. In some implementations, e.g., using an IR camera 402, 1 the multiple IR sensor detection approach may be also referred to as space differential detection e.g., as opposed to time-differential detection.

Figure 27:
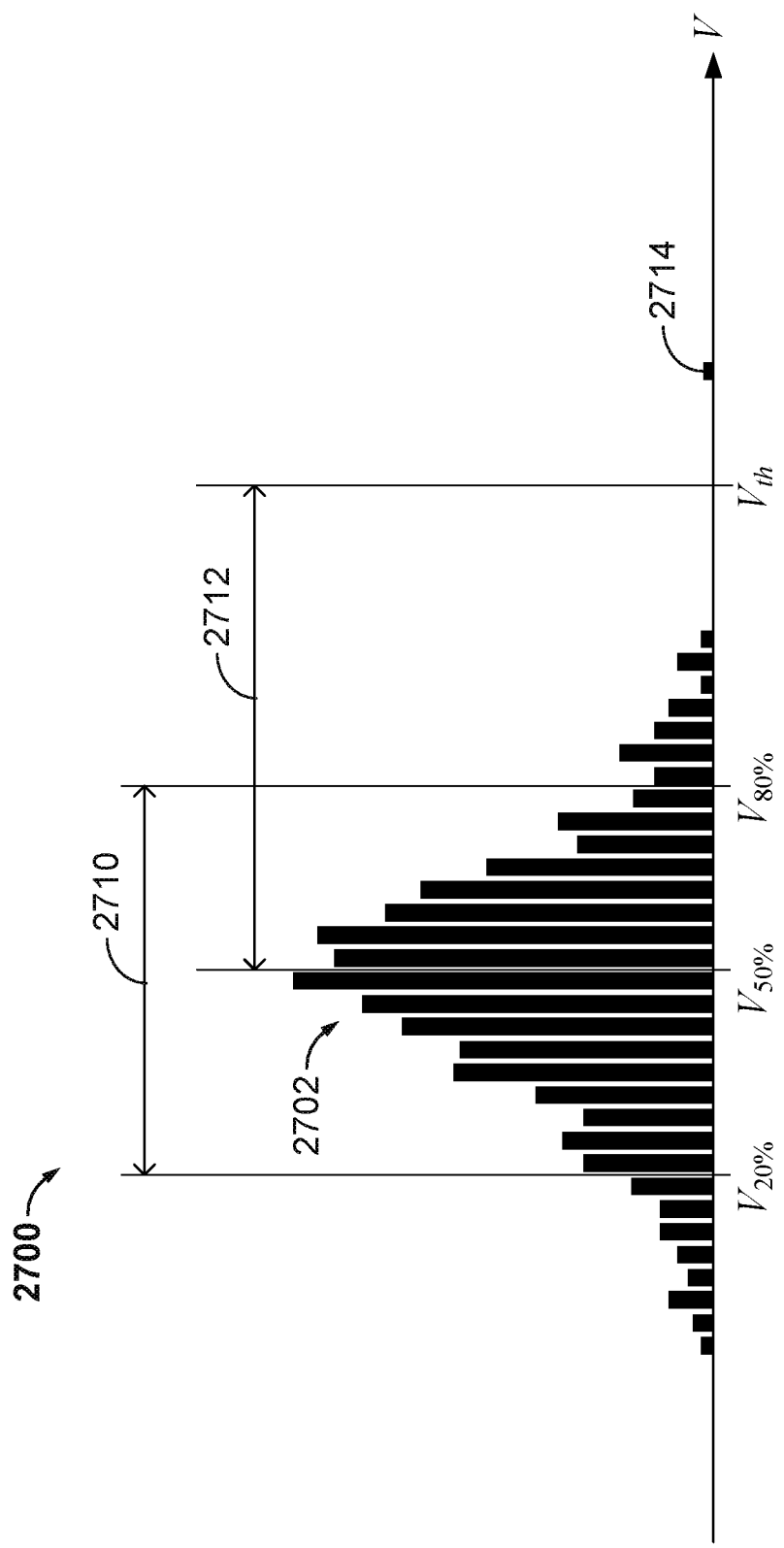
FIG. 27 is a diagram illustrating the procedure of determining a detection threshold based on a histogram, in accordance with an exemplary implementation.

FIG. 27 is a diagram 2700 illustrating the procedure of determining a detection threshold $V_{th}$ based on a histogram. FIG. 27 displays an exemplary histogram 2702 as obtained for a plurality of output levels V. In some implementations, these output levels V may be indicative for the outputs of a plurality of IR sensors. In some other implementations, they may be indicative for the outputs of a plurality of detection functions including at least one of a time differentiator 1202, a correlator 1702, or sliding DFT and magnitude function 2200, etc. as described above in connection with FIGS. 11 to 26. The diagram 2700 also indicates a $20^{th}$-, $50_{th}$- and $80^{th}$-percentile (vertical lines) of the histogram 2702 as well as the detection threshold $V_{th}$ as it may result from the histogram 2702. Further, it indicates a difference 2710 between the $20^{th}$- and $80^{th}$-percentile, which may be referred to as the spread of the histogram, the difference 2712 between the detection threshold $V_{th}$ and the $50^{th}$-percentile, as well as an outlier above the detection threshold $V_{th}$ that may represent an output from a detector viewing a true foreign object (e.g., object 1004). In some exemplary implementations, the detection threshold determination function may determine a detection threshold $V_{th}$ as follows:

1. produce a histogram 2702 e.g. based on a plurality of detector function outputs
2. determine the $20^{th}$-, $50^{th}$- and $80^{th}$-percentile (vertical lines) of the histogram 2702
3. determine the spread 2710 of the histogram 2710
4. determine difference 2712 by multiplying the spread 2710 with a factor (e.g., a system parameter)
5. determine detection threshold $V_{th}$ by adding difference 2712 to the value of the $50^{th}$-percentile In some other aspects, the wireless charging system 300 may successively increase an average level of the inductive power transfer magnetic field exposure during a process of detection, e.g., as a precautionary measure. In implementations applying level variations, e.g., for determining a correlation as previously described, the average level may refer to the short term average over a limited number of level variations. The successive increase may be stopped as soon as the FOD system has determined presence of a foreign object or an upper limit is reached. Such level increase may be useful, e.g., during a process of correlation or narrowband filtering as previously described, which may last over a prolonged time. In some implementations, the level increase is accomplished gradually. In other implementations, it is performed step wise.

In a further aspect, an IR-sensing FOD system may be degraded by movements, for example, for IR sensors (e.g., IR camera 402) mounted on the electric vehicle 112. Even in parked position, an electric vehicle 112 may perform some micro-movements (slow vibrations), e.g., due to wind, loading of the vehicle, persons located inside the vehicle, etc. These movements may degrade a detection process that integrates IR sensor outputs over a prolonged time, e.g., a process of correlation or narrowband filtering using an intermittent magnetic field exposure. This may impact foreign objects with a solid angle smaller or in the order of an IR sensor's optical resolution as previously discussed. Certain movements, e.g., rotational movements, may cause blurring of an IR image, e.g., as resulting from a prolonged correlation process. Therefore, in some implementations, the FOD system may employ a stabilization of the thermal image (e.g., image 1000) as it may be produced by a plurality of IR sensors, e.g., IR camera 402. In some implementations, thermal image stabilization is achieved by mechanically (physically) stabilizing the IR sensors (e.g., through mechanical compensation for movements of the vehicle). In other implementations, thermal image stabilization is achieved electronically and artificially by correcting thermal image frames (e.g., raw video data) as output, e.g., by IR camera 402, such that jitter in sequences of image frames due to camera movements are compensated for. This correction process may result in some loss of data in the edge zones of an IR image, e.g., image 1000. In some implementations relying on mechanical and/or electronic stabilization, thermal image stabilization may be controlled by a sensitive inertial measuring unit (IMU) including at least one gyroscope. In some other implementation, it is controlled by tracking a pilot IR source located remote from the IR sensors (e.g. IR camera 402). In yet other implementations, it is controlled by using ancillary optical sensors, e.g., an optical camera sensitive in the visible light and/or near IR range mounted on the same platform as the IR sensor used for FOD. The image of the ancillary optical sensors may serve as reference to compensate for movements in sequences of image frames as used for an IR sensing FOD.

In yet a further aspect, the FOD system may use the various detection schemes as previously discussed in connection with FIGS. 11 to 26 in combination. In some implementations, the FOD system may employ a detection scheme based on a time-differential and space differential detection approach. In other implementations, the FOD system combines a time-differential, correlation and a space differential detection approach.

In some implementations, outputs of a plurality of detectors, each associated to an IR sensor of a plurality of IR sensors, are evaluated using an expert system, e.g., based on neural networks or similar techniques that may be trained. The neural network may be configured and trained in a manner to maximize a detection probability of true foreign objects (e.g., objects 1004, 1012, 1010) and minimize a false detection probability e.g. due to false objects (e.g., objects 1006, 1008).

In some implementations, the FOD system may be also configured and trained to detect living objects as part of a living object protection system. Living objects may include human extremities (e.g., a hand, a foot) and animals e.g. entering the predetermined space when the wireless charging system 300 is wirelessly transferring power and/or generates a magnetic field above a critical level for purposes of detecting foreign objects.

Figure 28:
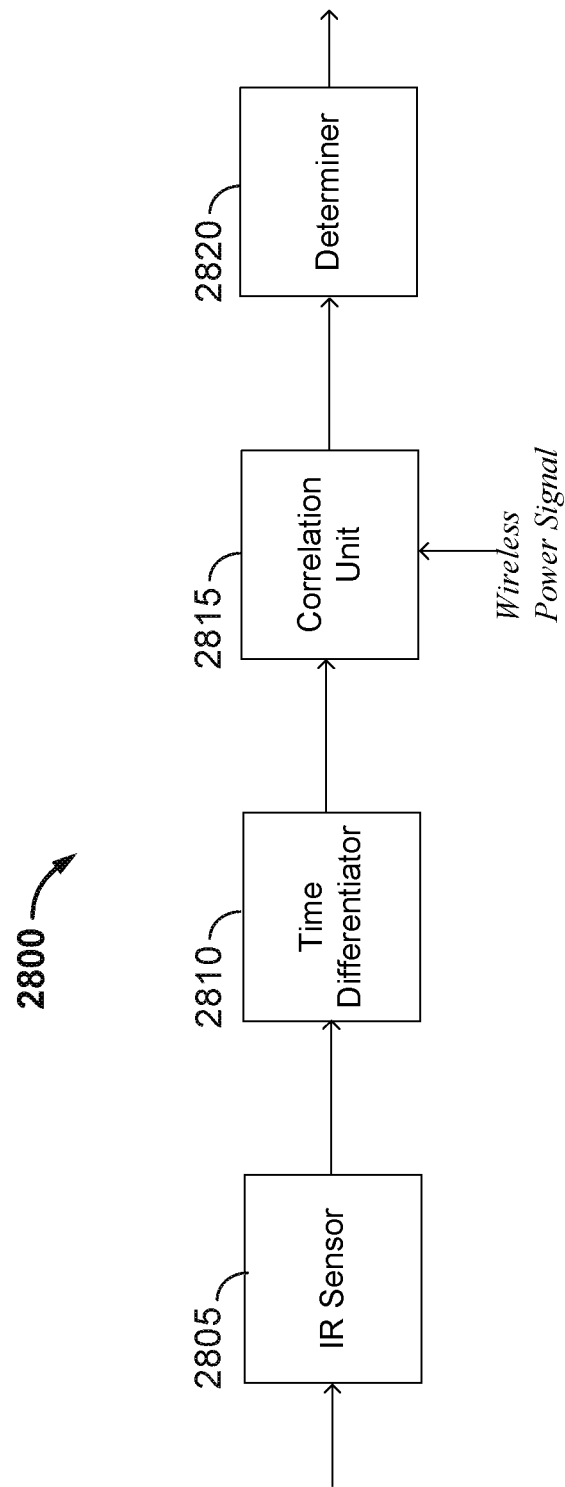
FIG. 28 illustrates a functional block diagram of an object detector, in accordance with certain aspects

FIG. 28 illustrates a functional block diagram of an object detector 2800, in accordance with certain aspects. As shown, object detector 2800 may correspond to any of the aspects for detecting foreign objects described herein that utilize time differentiation and correlation of a time-differentiated signal to an alternating magnetic field with a varying level, as described herein.

For example, object detector as shown includes an IR sensor 2805 (e.g., part of an array of IR sensors in an IR camera), configured to generate an output signal indicative of or based on a temperature detected by the IR sensor 2805 (e.g., of a foreign object in a wireless charging system). The IR sensor 2805 may be of any type, such as those described herein with respect to different aspects.

The output of the IR sensor 2805 is coupled to an input of a time differentiator 2810 (e.g., time differentiator 1202) configured to differentiate the output signal from the IR sensor 2805 with respect to time and generate an output signal indicative of the change in temperature detected by the IR sensor 2805 over a time period (e.g., between a first time and a second time). For example, the output signal may be indicative of a rate of change in temperature detected by the IR sensors 2805. The time differentiator 2805 may be of any type, such as those described herein with respect to different aspects.

The output of the time differentiator 2810 is coupled to an input of a correlation unit 2815 (e.g., correlator 1702, narrowband filter detector 2100, etc.) configured to correlate the signal indicative of the change in temperature (e.g., time-differentiated thermal signal) to a wireless power field (e.g., alternating magnetic field with a varying exposure level, varying exposure level magnetic field, etc.). For example, the wireless power field may be generated by a wireless charging system (e.g., power transfer element, wireless power transmitter, etc.). As described, an exposure level of the wireless power field may be varied. The correlation unit 2815 may be configured to correlate the change in the exposure level of the wireless power field to the change in temperature as detected by the IR sensor 2805. For example, the correlation unit 2815 may correlate the signals in the time domain, such as using a correlator 1702. For example, the correlation unit 2815 may generate an output indicative of whether a first value of the time-differentiated thermal signal at a first time when the varying exposure level magnetic field is at a first level and a second value of the time-differentiated thermal signal at a second time when the varying exposure level magnetic field is at a second level higher than the first level correlate with the first level and second level, respectively, such that the second value is greater than the first value. In some aspects, the correlation unit 2815 indicates whether a temperature increase in an area is correlated to or corresponds to when an exposure level of the magnetic field is increased. For example, the temperature or change in temperature at a first time when the exposure level is low is compared to the temperature or change in temperature at a first time when the exposure level is high. If the temperature or change in temperature is greater when the exposure level is high than when the exposure level is low, a foreign object may be present. In another example, the correlation unit 2815 may correlate the signals in the frequency domain (e.g., by correlating rates of change/frequency of the signals), such as using narrowband filter detector 2100. For example, the correlation unit 2815 may generate an output indicative of a comparison (e.g., correspondence) of a frequency of the time-differentiated thermal signal to a frequency of change in exposure level of the varying exposure level magnetic field, where a substantially matching frequency indicates a correlation and that a foreign object may be present. The correlation unit 2815 may be of any type, such as those described herein with respect to different aspects.

The output of the correlation unit 2815 may be input into a determiner 2820 (e.g., threshold detector 1100) configured to determine if the correlated output from correlation unit 2815 indicates a foreign object is detected and generate an output indicative of whether a foreign object is detected. The determiner 2820 may be of any type, such as those described herein with respect to different aspects. In certain aspects, the output of determiner 2820 is used to control a wireless power field (e.g., a power transfer element, wireless power transmitter, etc.). In particular, in certain aspects, if the output of determiner 2820 indicates no foreign object is detected, the wireless power field stays on, and the output of determiner 2820 indicates a foreign object is detected, the wireless power field is turned off. In certain aspects, object detector 2800 may include additional components, such as a non-linearity (e.g., clipper) as discussed herein in accordance with certain aspects.

Figure 29:
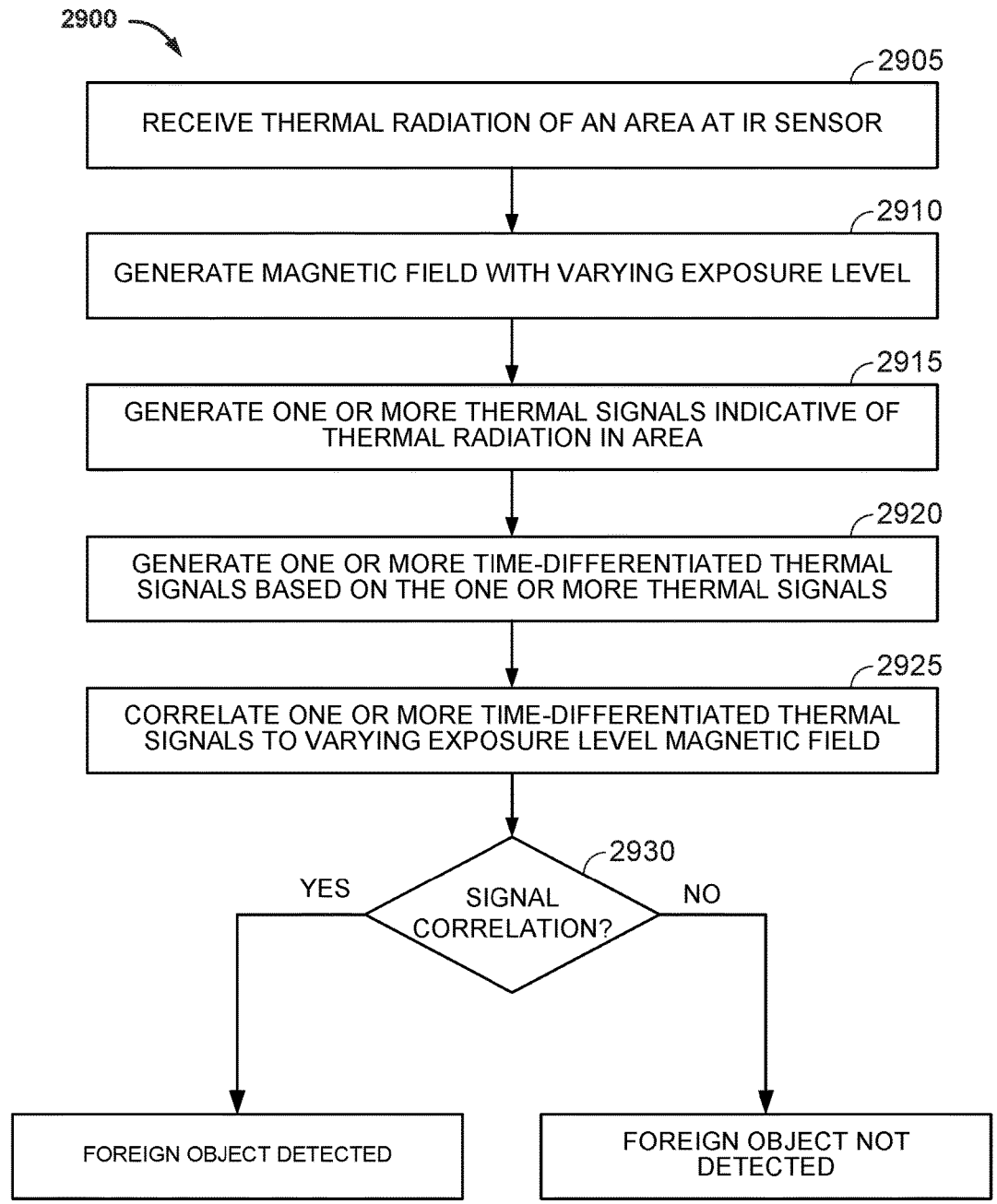
FIG. 29 illustrates example operations for detecting a foreign object, in accordance with certain aspects of the present disclosure.

FIG. 29 illustrates example operations 2900 for detecting a foreign object, in accordance with certain aspects of the present disclosure. In certain aspects, some of operations 2900 may be performed by one of the detectors (e.g., detector 1700, 1800, 1900, 2000, 2100, 2200, 2300, 2500, 2600, 2800, etc.).

At 2905, one or more IR sensors (e.g., IR sensor 2805) receive as input thermal radiation (e.g., IR signals) radiated from an area (e.g., between power transfer elements, between a wireless power transmitter and a wireless power receiver, etc.). In certain aspects, the area may include one or more foreign objects.

At 2910, a magnetic field is generated in the area with a varying level (e.g., a varying exposure level wireless power field, varying exposure level magnetic field, etc.). For example, in certain aspects, the magnetic field is an alternating magnetic field (e.g., generated by a power transfer element, such as power transfer element 304 or 316). In certain aspects, the level of the magnetic field may be varied (e.g., by a controller, such as controller 342 or 344) between a high level and a low level (and optionally to other levels) in time. In certain aspects, the variation of the level of the magnetic field may be according to a particular rate, frequency, or at regular time periods.

At 2915, the one or more IR sensors each generate an output signal corresponding to the detected thermal parameters (e.g., temperature) in the area. In certain aspects, the output(s) of the one or more IR sensors (referred to as one or more thermal signals) may be a discrete time signal (e.g., corresponding to one or more image frames), or a continuous time signal.

At 2920, the one or more thermal signals may be time differentiated using one or more time differentiators (e.g., time differentiator 1202 or time differentiator 2810) as discussed herein to generate one or more time-differentiated thermal signals.

At 2925, the one or more time-differentiated thermal signals are correlated to the varying exposure level magnetic field using one or more correlation units (e.g., correlator 1702, narrowband filter detector 2100, or correlation unit 2815) as described herein. For example, the one or more correlation units may determine whether a component (e.g., amplitude, frequency, sign, etc.) in any of the one or more time differentiated thermal signals relates to or correlates to variations in the levels of the magnetic field, as discussed herein. For example, each correlation unit (e.g., alone or in conjunction with a determiner (e.g., threshold detector 1100 or determiner 2820)) may generate an indication of whether the corresponding time-differentiated thermal signal includes a component that corresponds to variations in the levels of the magnetic field.

At 2930, it is determined (e.g., by determiner 2820 or correlation unit 2815) if any of the one or more correlation units indicate that the corresponding time-differentiated thermal signal includes a component that corresponds to variations in the levels of the magnetic field. If none of the correlation units (or a threshold number, percentage, etc. of correlation units indicating is not satisfied) indicate that the corresponding time-differentiated thermal signal includes a component that corresponds to variations in the levels of the magnetic field, a foreign object may be considered not detected at 2935, and the process may end or restart to perform further object detection. For example, the magnetic field may continue operating normally. If at 2930, it is determined any (or a particular number, percentage, etc.) of correlation units indicate that the corresponding time-differentiated thermal signal includes a component that corresponds to variations in the levels of the magnetic field, a foreign object may be considered detected at 2940 and appropriate action taken (e.g., powering off the magnetic field).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and method steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

The various illustrative blocks, modules, and circuits described in connection with the implementations disclosed herein may be implemented or performed with a general purpose hardware processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose hardware processor may be a microprocessor, but in the alternative, the hardware processor may be any conventional processor, controller, microcontroller, or state machine. A hardware processor may also be implemented as a combination of computing devices, e.g., a combination of a DSP and a microprocessor, a plurality of microprocessors, one or more microprocessors in conjunction with a DSP core, or any other such configuration.

The steps of a method and functions described in connection with the implementations disclosed herein may be embodied directly in hardware, in a software module executed by a hardware processor, or in a combination of the two. If implemented in software, the functions may be stored on or transmitted as one or more instructions or code on a tangible, non-transitory, computer readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the hardware processor such that the hardware processor can read information from, and write information to, the storage medium. In the alternative, the storage medium may be integral to the hardware processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The hardware processor and the storage medium may reside in an ASIC.

For purposes of summarizing the disclosure, certain aspects, advantages and novel features s have been described herein. It is to be understood that not necessarily all such advantages may be achieved in accordance with any particular implementation.

Thus, the invention may be embodied or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. An apparatus for detecting an object, the apparatus comprising:
   at least one infrared (IR) sensor configured to output a thermal signal indicative of a temperature of an area;
   at least one time differentiator coupled to the at least one IR sensor, the at least one time-differentiator being configured to generate a time-differentiated thermal signal based on the thermal signal;
   at least one correlation unit configured to correlate the time-differentiated thermal signal to a varying exposure level magnetic field; and
   a determining unit configured to determine whether the object is present in the area based on the correlation of the time-differentiated thermal signal to the varying exposure level magnetic field.

2. The apparatus of claim 1, wherein the time-differentiated thermal signal is indicative of a change of the temperature in the area from a first time to a second time.

3. The apparatus of claim 1, wherein the at least one IR sensor comprises a plurality of IR sensors, and wherein the determining unit is configured to determine whether the object is present in the area based on whether any of a plurality of time-differentiated thermal signals corresponding to the plurality of IR sensors correlates to the varying exposure level magnetic field.

4. The apparatus of claim 1, further comprising a limiter configured to limit the time-differentiated thermal signal to an upper and lower limit.

5. The apparatus of claim 1, further comprising a circuit configured to generate a non-linearity in the time-differentiated thermal signal prior to input of the time-differentiated thermal signal to the at least one correlation unit.

6. The apparatus of claim 1, wherein the correlation unit is configured to perform the correlation in the time domain by generating an output indicative of whether a first value of the time-differentiated thermal signal at a first time correlates with a first level of the varying exposure level magnetic field at the first time and a second value of the time-differentiated thermal signal at a second time correlates with a second level of the varying exposure level magnetic field at the second time, the second level higher than the first level, such that the second value is greater than the first value.

7. The apparatus of claim 1, wherein the correlation unit is configured to perform the correlation in the frequency domain by generating an output indicative of whether a frequency of the time-differentiated thermal signal correlates to a frequency of change in exposure level of the varying exposure level magnetic field.

8. The apparatus of claim 1, wherein the correlation unit comprises a narrow band filter.

9. The apparatus of claim 1, wherein an exposure level of the varying exposure level magnetic field varies periodically.

10. The apparatus of claim 1, wherein the correlation unit is further configured to apply a time shift to one of the time-differentiated thermal signal and a signal indicative of the varying exposure level magnetic field before performing the correlation.

11. The apparatus of claim 1, wherein the time differentiator comprises at least one of: a delay line filter configured to substantially cancel out a DC component of the thermal signal or a high pass filter having a cut-off frequency lower than a frequency of variation of the varying exposure level magnetic field.

12. The apparatus of claim 1, further comprising a transmitter configured to output the varying exposure level magnetic field.

13. The apparatus of claim 1, wherein the varying exposure level magnetic field comprises a wireless power field for coupling by a wireless power receiver to transfer power from a transmitter to the wireless power receiver.

14. The apparatus of claim 1, wherein the apparatus further comprises a wireless power receive element configured to inductively couple power via the varying exposure level magnetic field.

15. A method for detecting an object, the method comprising:
   generating a time-differentiated thermal signal based on a thermal signal indicative of a temperature of an area;
   correlating the time-differentiated thermal signal to a varying exposure level magnetic field; and determining whether the object is present in the area based on the correlation of the time-differentiated thermal signal to the varying exposure level magnetic field.

16. The method of claim 15, wherein the time-differentiated thermal signal is indicative of a change of the temperature in the area from a first time to a second time.

17. The method of claim 15, wherein the thermal signal corresponds to an output of at least one infrared (IR) sensor.

18. The method of claim 15, further comprising limiting the time-differentiated signal to an upper and lower limit prior to the correlation.

19. The method of claim 15, further comprising generating a non-linearity in the time-differentiated thermal signal prior to input of the time-differentiated thermal signal to the at least one correlation unit.

20. The method of claim 15, wherein correlating the time-differentiated thermal signal to the varying exposure level magnetic field comprises generating an output indicative of whether a first value of the time-differentiated thermal signal at a first time correlates with a first level of the varying exposure level magnetic field at the first time and a second value of the time-differentiated thermal signal at a second time correlates with a second level of the varying exposure level magnetic field at the second time, the second level higher than the first level, such that the second value is greater than the first value.

21. The method of claim 15, wherein correlating the time-differentiated thermal signal to the varying exposure level magnetic field comprises performing the correlation in the frequency domain by generating an output indicative of whether a frequency of the time-differentiated thermal signal correlates to a frequency of change in exposure level of the varying exposure level magnetic field.

22. The method of claim 15, wherein an exposure level of the varying exposure level magnetic field varies periodically.

23. The method of claim 15, wherein correlating the time-differentiated thermal signal to the varying exposure level magnetic field comprises applying a time shift to one of the time-differentiated thermal signal and a signal indicative of the varying exposure level magnetic field before performing the correlation.

24. The method of claim 15, wherein generating the time-differentiated thermal signal comprises at least one of: substantially cancelling out a DC component of the thermal signal or cutting-off frequencies in the thermal signal lower than a frequency of variation of the varying exposure level magnetic field.

25. The method of claim 15, further comprising outputting the varying exposure level magnetic field.

26. The method of claim 25, wherein the varying exposure level magnetic field comprises a wireless power field for coupling by a wireless power receiver to transfer power from a transmitter to the wireless power receiver.

27. An apparatus for detecting an object, the apparatus comprising:
 means for generating a time-differentiated thermal signal based on a thermal signal indicative of a temperature of an area;
 means for correlating the time-differentiated thermal signal to a varying exposure level magnetic field; and
 means for determining whether an object is present in the area based on the correlation of the time-differentiated thermal signal to the varying exposure level magnetic field.

28. The apparatus of claim 27, further comprising means for limiting the time-differentiated signal to an upper and lower limit prior to the correlation.

29. The apparatus of claim 27, wherein means for correlating the time-differentiated thermal signal to the varying exposure level magnetic field comprises means for generating an output indicative of whether a first value of the time-differentiated thermal signal at a first time correlates with a first level of the varying exposure level magnetic field at the first time and a second value of the time-differentiated thermal signal at a second time correlates with a second level of the varying exposure level magnetic field at the second time, the second level higher than the first level, such that the second value is greater than the first value.

30. A computer readable storage medium comprising instructions that when executed by a processing device cause the processing device to perform a method for detecting an object, the method comprising:
 generating a time-differentiated thermal signal based on a thermal signal indicative of a temperature of an area;
 correlating the time-differentiated thermal signal to a varying exposure level magnetic field; and
 determining whether the object is present in the area based on the correlation of the time-differentiated thermal signal to the varying exposure level magnetic field.

* * * * *